US008781442B1

(12) United States Patent
Link, II

(10) Patent No.: US 8,781,442 B1
(45) Date of Patent: Jul. 15, 2014

(54) PERSONAL ASSISTANCE SAFETY SYSTEMS AND METHODS

(75) Inventor: Charles M. Link, II, Atlanta, GA (US)

(73) Assignee: HTI IP, LLC, Atlanta, GA (US)

( * ) Notice: Subject to any disclaimer, the term of this patent is extended or adjusted under 35 U.S.C. 154(b) by 1133 days.

(21) Appl. No.: 11/852,071

(22) Filed: Sep. 7, 2007

Related U.S. Application Data

(60) Provisional application No. 60/825,069, filed on Sep. 8, 2006.

(51) Int. Cl.
| *H04M 1/66* | (2006.01) |
| *H04W 12/00* | (2009.01) |
| *H04W 12/04* | (2009.01) |
| *H04W 12/06* | (2009.01) |
| *H04L 9/08* | (2006.01) |

(52) U.S. Cl.
CPC .............. *H04W 12/00* (2013.01); *H04W 12/04* (2013.01); *H04W 12/06* (2013.01); *H04L 9/08* (2013.01)
USPC ...................... 455/411; 455/456.3; 455/575.9; 380/270; 380/247; 370/338; 713/156

(58) Field of Classification Search
CPC ..... H04W 12/00; H04W 12/04; H04W 12/06; H04L 9/08
USPC .......... 455/575.9, 407, 456.3, 411, 410, 41.2; 380/255, 270, 247; 713/156; 370/338
See application file for complete search history.

(56) References Cited

U.S. PATENT DOCUMENTS

| 6,138,002 | A | * | 10/2000 | Alperovich et al. | .......... 455/407 |
| 7,359,511 | B2 | * | 4/2008 | Matsuzaki et al. | ............ 380/212 |
| 2003/0145336 | A1 | * | 7/2003 | Matsuzaki et al. | ............ 725/136 |
| 2005/0149744 | A1 | * | 7/2005 | Sydir et al. | .................... 713/189 |
| 2005/0289343 | A1 | * | 12/2005 | Tahan | ........................... 713/169 |
| 2006/0059096 | A1 | * | 3/2006 | Dublish et al. | ................... 705/57 |
| 2006/0155991 | A1 | * | 7/2006 | Kim et al. | ...................... 713/168 |
| 2006/0184807 | A1 | * | 8/2006 | Kocher et al. | ................. 713/194 |
| 2006/0285682 | A1 | * | 12/2006 | Sarangarajan et al. | ......... 380/28 |
| 2006/0291661 | A1 | * | 12/2006 | Ramzan et al. | ................ 380/277 |
| 2008/0052772 | A1 | * | 2/2008 | Conrado et al. | ................ 726/10 |
| 2009/0034725 | A1 | * | 2/2009 | Davies et al. | ................. 380/255 |
| 2009/0235069 | A1 | * | 9/2009 | Sonnega et al. | ............... 713/156 |
| 2010/0222081 | A1 | * | 9/2010 | Ward et al. | ................. 455/456.3 |

* cited by examiner

*Primary Examiner* — Mahendra Patel

(57) ABSTRACT

Disclosed are methods and systems related to a Personal Assistance Safety System. In one aspect, disclosed are methods and systems for vehicle communications comprising an antenna selecting unit configured to select an antenna according to an antenna selection strategy and a first antenna switch coupled to the antenna selecting unit configured to direct communications through the selected antenna.

17 Claims, 57 Drawing Sheets

PERSONAL ASSISTANCE SAFETY SYSTEMS AND METHODS

CROSS REFERENCE TO RELATED PATENT APPLICATION

This application claims priority to U.S. Provisional Application No. 60/825,069 filed Sep. 8, 2006, which is herein incorporated by reference in its entirety.

SUMMARY

Disclosed are methods and systems related to a Personal Assistance Safety System. Additional advantages will be set forth in part in the description which follows or may be learned by practice. The advantages will be realized and attained by means of the elements and combinations particularly pointed out in the appended claims. It is to be understood that both the foregoing general description and the following detailed description are exemplary and explanatory only and are not restrictive.

BRIEF DESCRIPTION OF THE DRAWINGS

The accompanying drawings, which are incorporated in and constitute a part of this specification, illustrate embodiments and together with the description, serve to explain the principles of the methods and systems disclosed.

DETAILED DESCRIPTION

Figure 1:
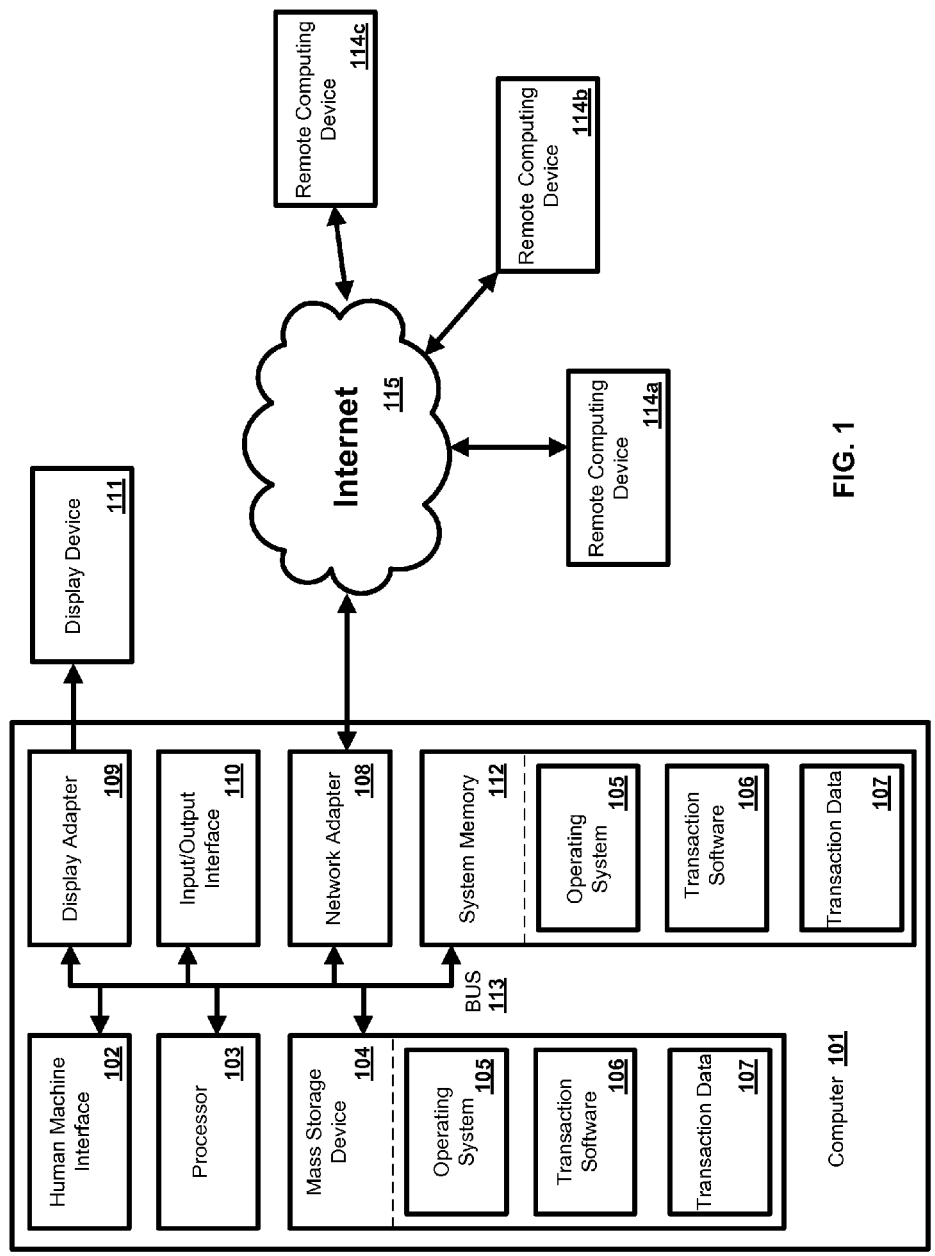
FIG. 1 is a block diagram illustrating an exemplary operating environment for performing the disclosed methods.

Before the present methods and systems are disclosed and described, it is to be understood that the methods and systems are not limited to specific components and as such may vary. It is also to be understood that the terminology used herein is for the purpose of describing particular embodiments only and is not intended to be limiting.

As used in the specification and the appended claims, the singular forms "a," "an" and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

It is also understood that there are a number of values disclosed herein, and that each value is also herein disclosed as "about" that particular value in addition to the value itself. For example, if the value "10" is disclosed, then "about 10" is also disclosed. It is also understood that when a value is disclosed that "less than or equal to" the value, "greater than or equal to the value" and possible ranges between values are also disclosed, as appropriately understood by the skilled artisan. For example, if the value "10" is disclosed the "less than or equal to 10" as well as "greater than or equal to 10" is also disclosed. It is also understood that the throughout the application, data is provided in a number of different formats, and that this data, represents endpoints and starting points, and ranges for any combination of the data points. For example, if a particular data point "10" and a particular data point 15 are disclosed, it is understood that greater than, greater than or equal to, less than, less than or equal to, and equal to 10 and 15 are considered disclosed as well as between 10 and 15. It is also understood that each unit between two particular units are also disclosed. For example, if 10 and 15 are disclosed, then 11, 12, 13, and 14 are also disclosed.

Throughout the description and claims of this specification, the word "comprise" and variations of the word, such as "comprising" and "comprises," means "including but not limited to," and is not intended to exclude, for example, other additives, components, integers or steps.

"Optional" or "optionally" means that the subsequently described event or circumstance may or may not occur, and that the description includes instances where said event or circumstance occurs and instances where it does not.

"Exemplary" means "an example of" and is not intended to convey an indication of a preferred or ideal embodiment.

Disclosed are the components to be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific embodiment or combination of embodiments of the disclosed methods.

The present methods and systems may be understood more readily by reference to the following detailed description of preferred embodiments of the methods and systems and the Examples included therein and to the Figures and their previous and following description.

What follows is a listing of Acronyms/Abbreviations used in the following description:

ABS/ESP Anti-Lock Breaking System/Electronic Stability Program
ACN Automatic Crash Notification
ADC Analog—Digital Converter
AEC Automatic Emergency Call
Ambient Temperature Temperature surrounding the component as tested in a test chamber or as installed in the vehicle.
AMR Adaptive Multi-Rate
ANI Automatic Number Identification
AP Applications Processor
APN Access Point Name
ARA Automatic Roadside Assistance
ARS Angular Rate Sensor
ATT Anti-Theft Tracking
BOM Bill of Material
BUB Back-Up-Battery
CAN Controller Area Network
Category and subcategory In this document, electronic modules, electric motors, and inductive devices are classified into categories and subcategories that determine the appropriate test requirements.
CGI Common Gateway Interface
CHAP Challenge/Handshake Authentication Protocol
CNC Cellular Network Controller
COTS Commercial off-the-Shelf
DDTC Delete Diagnostic Trouble Codes
DFMA Design for Manufacturing and Assembly
DHCP Dynamic Host Configuration Protocol
DoS Denial of Service
DR Designated Router and Dead Reckoning
DTCs Diagnostic Trouble Codes
DV Design Verification. Name of a test stage during product development used at CG (parts used for DV tests are not from production tooling).
DVP&R Design Verification Plan and Report. It is a formalized test planning and reporting tool. It itemizes all testing necessary to ensure that functional and reliability criteria along with test target requirements are defined in specific measurable terms. Refer to the Product Assurance Testing Manual for a standard template.
ECU Electronic Control Unit
EFR Enhanced Full Rate
EMC Electromagnetic Compatibility
EOL End Of Line
ESD Electrostatic Discharge
FEA Finite Element Analysis
FEM Front End Module
FR Full Rate
FRS Functional Requirements Specification. A document that specifies the functional behavior of the PASS Module.

GGSN Gateway GPRS Support Node
GMLC Gateway Mobile Location Center
GMSC Gateway Mobile Switching Center
GND Ground
GPRS GSM Packet Radio Service
GPS Global Position System
GSM Global System for Mobile Communications GSMC Global System for Mobile Communications
GTT Global Title Translation
HLR Home Location Register
HP-SMSC High-Performance Short Message Service Center
HR Half Rate
HU Head Unit
I/O Input/Output
IC Integrated Circuit
Ignition Voltage Lines The supply voltage lines to a DUT that are fed from the vehicle electrical power distribution system through the ignition switch.
Inductive Device An electromechanical device that stores energy in a magnetic field. Examples: solenoids, relays, buzzers, and electromechanical horns.
IOD Ignition Off Draw
IOD Ignition Off Current Draw
KWPLED Keyword protocol
IC Information Call
IMSI International Mobile Subscriber Identity
IP Internet Protocol
IRDU Immediate Remote Door Unlock
IVR Intelligent Voice Recognition
LC Inductor/Capacitor
LCS LoCation Services
LDO Low Drop Out
LED Light Emitting Diode
LIN Local Interconnect Network
LNA Low Noise Amplifier
MAP Mobile Application Part
MEC Manual Emergency Call
MO Mobile Originated
MOSFET Metal Oxide-Silicon Field Effect Transistor
MRA Manual Roadside Assistance
MSC Mobile Switching Center
MSISDN Mobile Station International ISDN Number
MSR Maintenance Status Reporting
MSRN Mobile Station Roaming Number
MT Mobile Terminated
MTP3 Message Transfer Part Level 3
Nonoperational A component shall be considered "Non-operational" if it is connected to a power source, but does not perform any normal operating functions during the test. The condition requires use of mating connectors during the test. This condition is similar to the one experienced by an E/E component in a parked vehicle.
NTC Negative Temperature Coefficient. Device with an NTC feature shuts off power supply or reduces certain component applications (for example, CD playing for a car radio) when the device temperature goes below a certain minimum specified operating temperature.
Operational A component shall be considered "Operational" if it performs functions as experienced during vehicle operations on a continuous basis (without any interruptions). Power source may be from the vehicle battery, ignition feed or an independent power source, as in the case of RKE—Remote Keyless Entry, or TPM Sensor—Tire Pressure Monitor Sensor, etc.
OTA Over the Air
PA Power Amplifier
PASS Personal Assistance Safety System
PCS Personal Communications System
PET Parametric Evaluation Technique
PFMEA Process Failure Mode and Effects Analysis
Power-off A component shall be considered "Power-off" when it is not electrically connected to a power source, as in the case of shipping or storage conditions. Power-off condition may require use of mating connectors during some of the tests and shall be specified clearly in the Test Parameters.
PSAP Public Safety Answering Point
PTC Positive Temperature Coefficient. Device with PTC feature shuts off power supply or reduces certain component applications (for example, CD playing for a car radio) when device temperature goes above a certain maximum specified operating temperature.
PV Production Validation—Name of a test stage during product development used at CG (parts used for PV tests are from production tooling).
PWM Pulse Width Modulator
QDR Quality Data Reporting
RADIUS Remote Authentication Dial-In User Service
RAID Redundant Array of Independent Disks
RD Remote Diagnostics
RDC Remote Diagnostics Configuration
RDL Remote Door Lock
RDU Remote Door Unlock
RF FEM RF Front End Module—Integrated module with power amplifier, TX/RX switch, TX filters, and logic and power control.
RISC Reduced Instruction Set Code
SAM Scan All Modules
SAW Surface Acoustic Wave
SCTP/M3UA Stream Control Transport Protocol/MTP3 User Adaptation
SGSN Serving GPRS Service Node
SIM Subscriber Identity Module
SIP Session Initiation Protocol
SMD Surface Mount Device
SMPP Short Message Peer-to-Peer
SMS Short Message Service
SMSC Short Message Service Center
SP4T Switch Single Pole Quad Throw Switch
SPDT Switch Single Pole Dual Throw Switch
SPI Serial Peripheral Interface
SS7 Signaling System 7
STP Signal Transfer Point
SVT Stolen Vehicle Tracking
TMSI Temporary Mobile Station Identifier
TOC Telematics Operations Center
TPU Tracking Position Update
TPU Tracking Position Update
Tsoak Soak Time. Time taken by component to reach chamber ambient temperature at high or low temperature during thermal cycling tests from the time the chamber temperature reaches corresponding high or low temperature levels.
UART Universal Asynchronous Receiver/Transmitter
UDS Unified Diagnostics Services
ULP Usage Life Profile. A software tool that assists in selecting the applicable qualification tests and test parameters for a component based on input data such as design or service life, in-vehicle component location, customer driving/usage pattern, or other environmental stresses.
USSD Unstructured Supplementary Services data
U-TDOA Uplink Time Difference of Arrival
Vibration Class Classification of vibration intensities a component will experience based on its mounting location in the vehicle.

VIC Vehicle Interface Controller
VMM Vehicle Message Matrix
VoIP Voice over Internet Protocol
VRDU Verified Remote Door Unlock I. Operational Environment A. System Components The methods and systems provided herein can be referred to as a Personal Assistance Safety & Services (PASS) system. Provided is an exemplary description of the environment in which the various PASS hardware and software components can operate.

In one aspect, provided is a system architecture for the PASS system. For example, the system architecture can comprise external equipment and/or systems that the PASS system can interface with, various exemplary components which can comprise the system, and exemplary manners in which these components can be interconnected. Also provided is a communications network, such as a wireless network, that can be used by the system and the associated networking components that can be used in the PASS system. Redundancy of PASS system components and data communications security is also covered in this chapter.

In another aspect, provided is a communications infrastructure, for example, the operation of wireless network data and voice distributed communications infrastructure in terms of the underlying, generic functions. These include, but are not limited to, network registration, network location updates, assignment of a Mobile Station International ISDN Number (MSISDN) to facilitate callbacks, voice and short message calls from and to a PASS Electronic Control Unit (ECU), and the like.

Also provided are various PASS services. For example, end-to-end services provided by the system and supporting descriptions of the exemplary sequence of transactions within each of these services. The PASS services provided include, but are not limited to automatic and manual emergency calls, manual and automatic roadside assistance, information call, remote door unlock (immediate and verified) and lock, stolen vehicle and anti-theft tracking, maintenance status reporting and remote diagnostics, and the like.

Further, one skilled in the art will appreciate that aspects of the systems and methods disclosed herein can be implemented via a general-purpose computing device in the form of a computer 101. FIG. 1 is a block diagram illustrating an exemplary operating environment for performing the disclosed methods. This exemplary operating environment is only an example of an operating environment and is not intended to suggest any limitation as to the scope of use or functionality of operating environment architecture. Neither should the operating environment be interpreted as having any dependency or requirement relating to any one or combination of components illustrated in the exemplary operating environment.

The methods and systems can be operational with numerous other general purpose or special purpose computing system environments or configurations. Examples of well known computing systems, environments, and/or configurations that can be suitable for use with the system and method comprise, but are not limited to, personal computers, server computers, laptop devices, and multiprocessor systems. Additional examples comprise set top boxes, programmable consumer electronics, network PCs, minicomputers, mainframe computers, distributed computing environments that comprise any of the above systems or devices, and the like.

In another aspect, the processing of the disclosed methods and systems can be performed by software components. The methods and systems can be described in the general context of computer instructions, such as program modules, being executed by a computer. Generally, program modules comprise routines, programs, objects, components, data structures, etc. that perform particular tasks or implement particular abstract data types. The methods and systems can also be practiced in distributed computing environments where tasks are performed by remote processing devices that are linked through a communications network. In a distributed computing environment, program modules can be located in both local and remote computer storage media including memory storage devices.

The components of the computer 101 can comprise, but are not limited to, one or more processors or processing units 103, a system memory 112, and a system bus 113 that couples various system components including the processor 103 to the system memory 112.

The system bus 113 represents one or more of several possible types of bus structures, including a memory bus or memory controller, a peripheral bus, an accelerated graphics port, and a processor or local bus using any of a variety of bus architectures. By way of example, such architectures can comprise an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, and a Peripheral Component Interconnects (PCI) bus also known as a Mezzanine bus. The bus 113, and all buses specified in this description can also be implemented over a wired or wireless network connection and each of the subsystems, including the processor 103, a mass storage device 104, an operating system 105, software 106, data 107, a network adapter (or communications interface) 108, system memory 112, an Input/Output Interface 110, a display adapter 109, a display device 111, and a human machine interface 102, can be contained within one or more remote computing devices 114a,b,c at physically separate locations, connected through buses of this form, in effect implementing a fully distributed system.

The computer 101 typically comprises a variety of computer readable media. Exemplary readable media can be any available media that is accessible by the computer 101 and comprises, for example and not meant to be limiting, both volatile and non-volatile media, removable and non-removable media. The system memory 112 comprises computer readable media in the form of volatile memory, such as random access memory (RAM), and/or non-volatile memory, such as read only memory (ROM). The system memory 112 typically contains data such as data 107 and/or program modules such as operating system 105 and software 106 that are immediately accessible to and/or are presently operated on by the processing unit 103. Data 107 can comprise any data generated in conjunction with identification of a value opportunity, conversion of a value opportunity into benefit, fee management, and benefit opportunity research.

In another aspect, the computer 101 can also comprise other removable/non-removable, volatile/non-volatile computer storage media. By way of example, FIG. 1 illustrates a mass storage device 104 which can provide non-volatile storage of computer code, computer readable instructions, data structures, program modules, and other data for the computer 101. For example and not meant to be limiting, a mass storage device 104 can be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Optionally, any number of program modules can be stored on the mass storage device 104, including by way of example, an operating system 105 and software 106. Each of the operating system 105 and software 106 (or some combination thereof) can comprise elements of the programming and the software 106. Data 107 can also be stored on the mass storage device 104. Data 107 can be stored in any of one or more databases known in the art. Examples of such databases comprise, DB2®, Microsoft® Access, Microsoft® SQL Server, Oracle®, mySQL, PostgreSQL, and the like. The databases can be centralized or distributed across multiple systems.

In another aspect, the user can enter commands and information into the computer 101 via an input device (not shown). Examples of such input devices comprise, but are not limited to, a keyboard, pointing device (e.g., a "mouse"), a microphone, a joystick, a scanner, tactile input devices such as gloves, and other body coverings, and the like These and other input devices can be connected to the processing unit 103 via a human machine interface 102 that is coupled to the system bus 113, but can be connected by other interface and bus structures, such as a parallel port, game port, an IEEE 1394 Port (also known as a Firewire port), a serial port, or a universal serial bus (USB).

In yet another aspect, a display device 111 can also be connected to the system bus 113 via an interface, such as a display adapter 109. It is contemplated that the computer 101 can have more than one display adapter 109 and the computer 101 can have more than one display device 111. For example, a display device can be a monitor, an LCD (Liquid Crystal Display), or a projector. In addition to the display device 111, other output peripheral devices can comprise components such as speakers (not shown) and a printer (not shown) which can be connected to the computer 101 via Input/Output Interface 110.

The computer 101 can operate in a networked environment using logical connections to one or more remote computing devices 114a,b,c. By way of example, a remote computing device can be a personal computer, portable computer, a server, a router, a network computer, a PASS ECU 102, a PDA, a cellular phone, a "smart" phone, a wireless communications enabled key fob, a peer device or other common network node, and so on. Logical connections between the computer 101 and a remote computing device 114a,b,c can be made via a local area network (LAN) and a general wide area network (WAN). Such network connections can be through a network adapter 108. A network adapter 108 can be implemented in both wired and wireless environments. Such networking environments are conventional and commonplace in offices, enterprise-wide computer networks, intranets, and the Internet 115.

For purposes of illustration, application programs and other executable program components such as the operating system 105 are illustrated herein as discrete blocks, although it is recognized that such programs and components reside at various times in different storage components of the computing device 101, and are executed by the data processor(s) of the computer. An implementation of software 106 can be stored on or transmitted across some form of computer readable media. Computer readable media can be any available media that can be accessed by a computer. By way of example and not meant to be limiting, computer readable media can comprise "computer storage media" and "communications media." "Computer storage media" comprise volatile and non-volatile, removable and non-removable media implemented in any method or technology for storage of information such as computer readable instructions, data structures, program modules, or other data. Exemplary computer storage media comprises, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer. In an aspect, any of the methods provided can be performed by computer executable instructions embodied on a computer readable medium.

The methods and systems can employ Artificial Intelligence techniques such as machine learning and iterative learning. Examples of such techniques include, but are not limited to, expert systems, case based reasoning, Bayesian networks, behavior based AI, neural networks, fuzzy systems, evolutionary computation (e.g. genetic algorithms), swarm intelligence (e.g. ant algorithms), and hybrid intelligent systems (e.g. Expert inference rules generated through a neural network or production rules from statistical learning).

Figure 2:
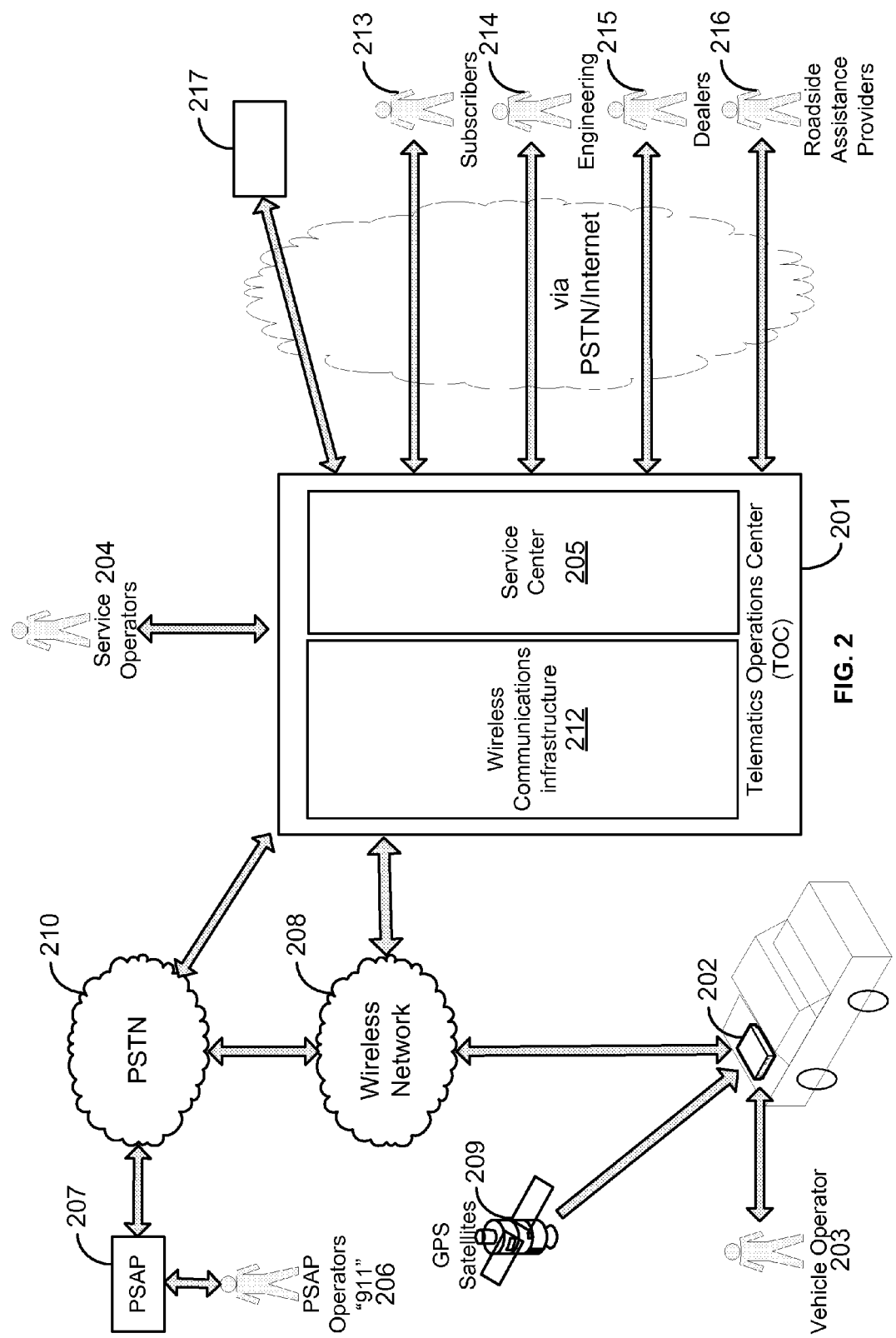
FIG. 2 illustrates an exemplary PASS system context.

An exemplary PASS system context is shown in FIG. 2. The system can comprise a Telematics Operations Center (TOC) 201 and an in-vehicle PASS Electronics Control Unit (ECU) 202.

The PASS ECU 202 can be a high-volume system frontend. It can support mobile originated (MO) and mobile terminated (MT) voice calls between a vehicle operator 203 (or occupants) and service operators 204 at the TOC Service Center 205 or PSAP operators 206 at a local Public Safety Answering Point (PSAP) 207. In another aspect, the PASS ECU 202 can also support MO and MT Short Message Service (SMS) in order to provide one or more PASS features. By way of example, the PASS ECU 202 can communicate with a vehicle operator 203, who uses the PASS buttons to request services. The vehicle operator 203 can use an in-vehicle speaker and microphone(s) for voice communications via the wireless network 208. The PASS ECU 202 can communicate with an instrument panel and/or head unit (not shown in FIG. 2), which can be used to display system and service status. The PASS ECU 202 can communicate with other in-vehicle Electronic Control Units (ECUs) (not shown in FIG. 2), including, but not limited to the following, a crash sensor for automatic collision notification, a trunk button controller for remote door unlock, an engine and transmission control unit(s) for remote diagnostics, and the like. The PASS ECU 202 can communicate with a Global Positioning System (GPS) 209, which enables the PASS ECU 202 to determine its current position. A wireless network 208, such as a Global System for Mobile Communications (GSMC), which can provide voice and data communications between the PASS ECU 202 and the TOC 201 and voice communications between the PASS ECU 202 and a local PSAP operator 206 via a Public Switched Telephone Network (PSTN) 210. The system can support MO and MT calls between a vehicle and the PSAP 207.

The TOC 201 can function as the system backend. It can provide, for example, Voice over Internet Protocol (VoIP) Call Servers 902 (shown in FIG. 9) to enable voice communication between the vehicle operator 203 and the TOC Service Operator 204, as well as the wireless communication infrastructure 212 to operate the TOC 201 as a Mobile Virtual Network Operator (MVNO) and Application Servers 901 to support value-added PASS services. The TOC 201 can use geographic redundancy for availability and disaster recovery. For example, there can be multiple TOCs located at different sites.

In one aspect, the TOC 201 can communicate with the one or more of the following exemplary external entities. A GSM wireless network 208, which can provide voice and data communications with the PASS ECU 202. One or more PASS Subscribers 213 (which may or may not be a vehicle owner), who can access the TOC 201 via either phone (voice and/or SMS) and/or Internet to request services, such as remote door unlock or stolen vehicle tracking, update service subscriptions and/or billing information, or request other customer care functions. Service operators 204, who can have voice and/or Web access to the TOC 201 in order to support the various PASS services and to provide customer care. PSAP operators 206, to whom emergency calls may be extended by the Service Operator 204, and who call the TOC 201 (via the PSTN) to request additional information following an emergency call from the vehicle. Engineering 214, which can access the TOC 201 via the Internet to access remote diagnostic services. In one aspect, diagnostics reports can be provided to Engineering 214 through Electronic Data Interchange (EDI), as is known in the art. Dealers 215, who can access the TOC 201 via the Internet to access remote diagnostic services. In another aspect, diagnostics reports can be provided to Dealers 215 through Electronic Data Interchange (EDI), as is known in the art. Roadside Assistance Providers 216, who can access the TOC 201 via the Internet to access remote diagnostic services. The Service Operator 204 can request roadside assistance in response to MO calls from the PASS ECU 202. A support service 217, can provide 911 operations support systems services to incumbent local exchange carriers, local exchange carriers, and wireless carriers. Support service 217 can be used by the TOC 201 to determine an appropriate 10 digit PSTN number for the local PSAP 207, given a vehicle's location in lat/long.

Figure 3:
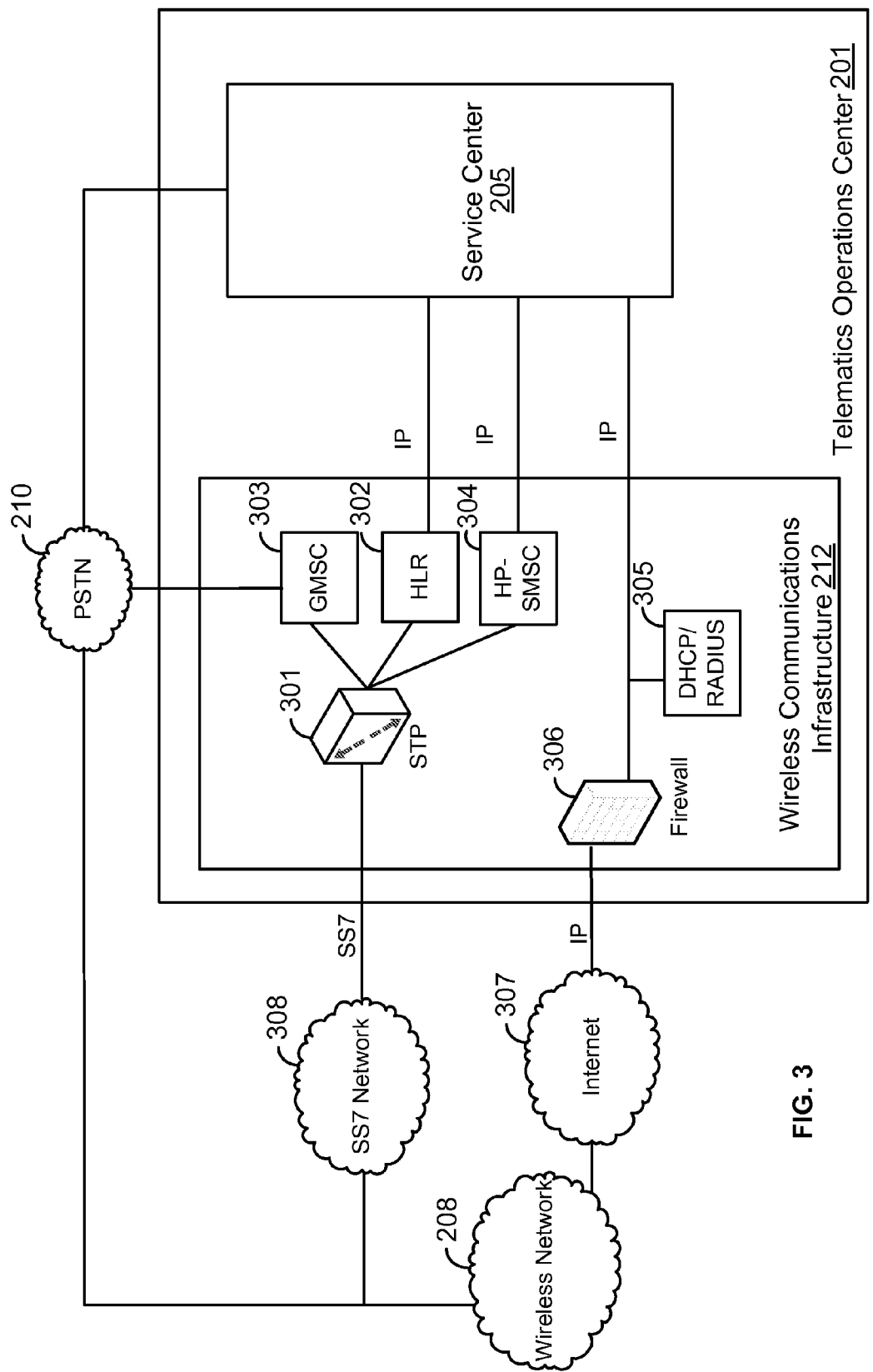
FIG. 3 illustrates an exemplary architecture of a Telematics Operations Center (TOC) Wireless Communications Infrastructure.

An exemplary architecture of the TOC 201 Wireless Communications Infrastructure 212 subsystem is shown in FIG. 3. The Wireless Communications Infrastructure 212 can operate as a packet switched network carrying signaling/data messages between the carrier and the TOC Service Center 205.

The Wireless Communications Infrastructure 212 can comprise a Signal Transfer Point (STP) 301, which can serve as a gateway router between the wireless network and the other components of the Wireless Communications Infrastructure 212. A Home Location Register (HLR) 302, can store the current location, registration/attachment status, and subscription data for each subscriber 213 (that is, PASS ECU). The HLR 302 can provide this information to the wireless network 208 to support roaming and MT voice calls and SMS messaging. A Gateway Mobile Switching Center (GMSC) 303, which supports MT voice calls from the PSTN 210 (that is, PSAP operator 206) and the TOC Service Operators 204. Whenever a call is made to a PASS ECU 202, the PSTN 210 routes the call to the GMSC 303, which further routes the call to a Mobile Switching Center (MSC) in the wireless network where the PASS ECU 202 is currently registered. A High-Performance Short Message Service Center (HP-SMSC) 304, which provides messaging capabilities between the Service Center 205 and the PASS ECUs 202. All SMS messages exchanged between the TOC 201 and the PASS ECU 202 can be processed by the HP-SMSC 304. A Remote Authentication Dial-In User Service/Dynamic Host Configuration Protocol (RADIUS/DHCP) Server 305, can provide Internet Protocol (IP) address allocation to PASS ECUs 202 and authorization and authentication for IP-based data exchanges between the TOC 201 and the PASS ECU 202. A firewall 306 between the TOC 201 and the public IP network 307, can prevent unauthorized access to the TOC 201.

By way of example, the Wireless Communications Infrastructure 212 can interface to the wireless network 208 via links to a Signaling System 7 (SS7) network 308. It also interfaces to the IP network 307, which subscribers and other PASS system users can use to access the TOC Service Center 205 for launching services like remote door unlock or other subscriber services. The IP interface also allows for IP connectivity between the PASS ECU 202 and the TOC Service Center 205 using the General Packet Radio Service (GPRS).

The Wireless Communications Infrastructure 212 enables MO voice calls from the PASS ECU 202 and MT voice calls to the PASS ECU 202. It also provides the following mechanisms to pass data between the PASS ECU 202 and the TOC 201. Short Message Service (SMS), which can be used for exchange application-level messages between the Service Center 205 and the PASS ECU 202, Unstructured Supplementary Services Data (USSD), which can be used for certain low-level data exchanges between the TOC 201 and the PASS ECU 202 including MSISDN assignment prior to a direct call to the local PSAP 207, General Packet Radio Service (GPRS), which can be used for data exchanges between the Service Center 205 and the PASS ECU 202, including diagnostic reports, configuration updates, and software downlink load.

SMS and USSD messages can be exchanged between the HP-SMSC 304 and HLR 302 and the wireless network 208 over the SS7 Mobile Application Part (MAP). GPRS transfer can be based on UDP/IP. IP address assignment can be performed by the RADIUS/DHCP Server 305 after authenticating the PASS ECU 202.

An exemplary Wireless Communications Infrastructure 212 is shown in FIG. 3. What follows is a more detailed description of components that can comprise the Wireless Communications Infrastructure 212.

The Signal Transfer Point (STP) 301 can serve as a gateway router between the wireless network 208 and the other components of the Wireless Communications Infrastructure 212. The STP 301 can route SS7 traffic between the wireless network 208 and the HLR 302, HP-SMSC 304, and GMSC 303. The STP 301 can interface to the SS7 network 308 over standard SS7 links over T1 lines. The STP 301 can provide Global Title Translation (GTT) routing and Message Transfer Part Level 3 (MTP3) routing, as well as reliability to the SS7 network 308. The STP 301 can route messages between SS7 nodes by examining the destination point codes, called numbers, location areas, and other identifiers.

Figure 4:
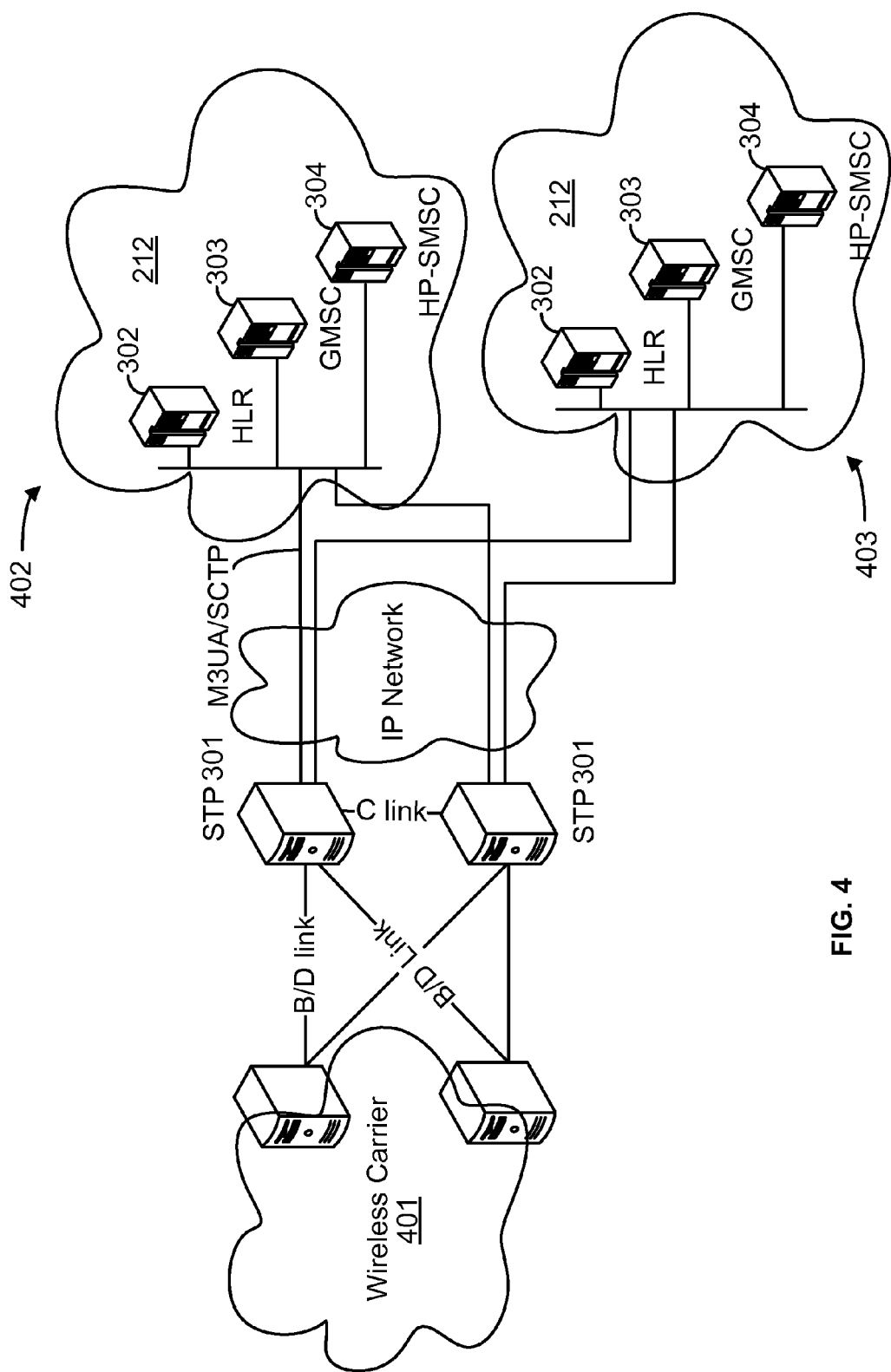
FIG. 4 illustrates a mated-pair configuration Signal Transfer Points (STPs)

As shown in FIG. 4, the STP 301 can perform GTT, which can be used for MAP signaling traffic between a wireless carrier 401 and the TOC 201, as well as between the GMSC 303, HLR 302, and HP-SMSC 304. The STP 301 can also support Stream Control Transport Protocol/MTP3 User Adaptation (SCTP/M3UA) layers for IP-based signaling endpoints such as the HLR 302, HP-SMSC 304, and GMSC 303. Each STP 301 can have one or more SCTP associations to the signaling endpoint.

A fault in an STP 301 can completely isolate an SS7 node from other networks and thus the STP 301 can be a highly critical node. STPs 301 can be deployed in a mated-pair configuration as shown in FIG. 4 to provide needed availability. The TOC 201 can employ redundant STPs 301 at separate sites 402 and 403 operating in load-sharing mode. In this configuration, the STPs 301 employ a C-link interface between them as is known in the art.

STPs 301 can also prevent unwanted traffic from entering or exiting the TOC 201. This is important to prevent Denial of Service (DoS) attacks or when incorrect configuration results in infinite loops. Filtering rules can be configured by a network manager 905 (described below with regard to FIG. 9).

Figure 5:
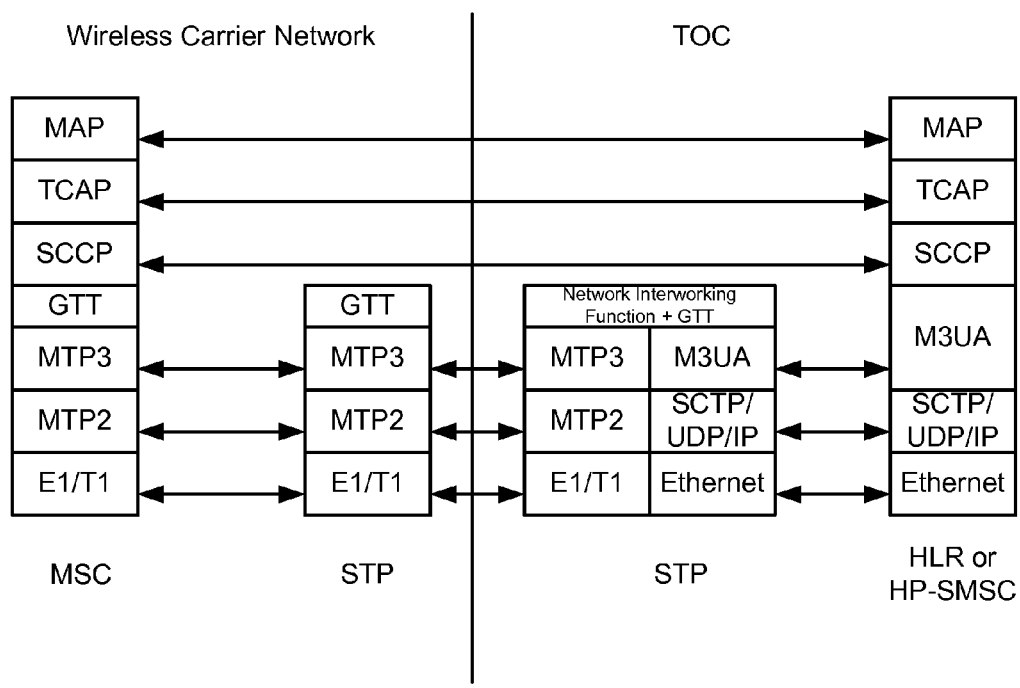
FIG. 5 illustrates protocol layers and interworking when SS7 messages are transported between a circuit switched and IP networks.

FIG. 5 illustrates protocol layers and interworking when SS7 messages are transported between a circuit switched and IP networks. The STP 301 can act as an interworking point between a wireless carrier's traditional network and internal IP-based TOC network. Industry standard protocols can be used for this purpose, such as SCTP and M3UA. Internal communication between SS7 nodes in the PASS system, such as between the GMSC 303 and HLR 302, can also take place over SCTP/M3UA.

The Gateway Mobile Switching Center (GMSC) 303 can serve as a gateway from the PSTN 210 to the wireless mobile network 208. For MT calls to a PASS ECU 202, the PSTN 210 can route the call to the GMSC 303, and the GMSC 303 can query the HLR 302 for the subscriber's current location and route the call accordingly.

When a TOC Service Operator 204 initiates a MT call, the TOC's phone number can be used as the destination address, and the GMSC 303 can perform the following method. Use the calling party's number, or Automatic Number Identification (ANI) to verify that the incoming call is from an authorized Service Operator 204. Provide an IVR function to prompt the operator for the PASS ECU's 202 permanently assigned International Mobile Subscriber Identity (IMSI). Query the HLR 302 for the PASS ECU's 202 current MSC address using the IMSI. Route the call to the visited MSC, which will route the call to the PASS ECU 202 in the last registered location area.

When a PSAP operator 206 initiates a MT call (i.e., a callback in response to a cleared emergency call), the PASS ECU's 202 temporarily assigned MSISDN can be used as the destination address, and the GMSC 303 can perform the following method. Query the HLR 302 for the PASS ECU's 202 current MSC address using the MSISDN. Route the call to the visited MSC, which will route the call to the PASS ECU 202 in the last registered location area.

The GMSC 303 can interface to the PSTN 210 via trunk lines serving phone numbers assigned to the TOC 201. The GMSC 303 can also interface to the HLR 302 and network management 905 (described below with regard to FIG. 8).

The High-Performance Short Message Service Center (HP-SMSC) 304 can provide Short Message Service (SMS) capabilities between the PASS ECU 202 and the Service Center 205 at the TOC 201 for the exchange of application-level messages and data. Standard "consumer" SMSCs are generally not acceptable for mission-critical data communications, such as Automatic Crash Notification. The disclosed HP-SMSC 304 is therefore an enhanced network element.

For consumer level SMS, each mobile terminal is generally served by a single SMSC. In some cases, one SMSC may be used for MO messages and another for MT messages, and different SMSCs may be used for the delivery of different message classes. In all cases, however, these elements are "store and forward" elements that are not geared towards high speed immediate delivery of messages. If a message is not delivered immediately, it is queued for automatic retry. It is the combination of this retry algorithm and the messaging load that delay message delivery in the consumer level implementation of SMS.

Standard consumer level SMS involves a host of network elements that are not necessarily optimized for rapid and reliable delivery of mission-critical messages. The underlying network is certainly as robust for SMS as it is for voice or any other technology. The basic GSM network consists of a host of network elements, which diverge at a certain point to support voice and data messages. The basic network elements for voice calling are generally considered the HLR (Home Location Register) and the MSC (Mobile Switching Center). Additional elements include the BSC (Base Site Controller), Cell Site, and sometimes the GMSC (Gateway MSC).

At the time a wireless device (handset or otherwise) powers up, it registers with the local cell site that relays information back through the BSC to a serving MSC. The MSC and adjunct visitor location register (VLR) can send a GSM MAP message "Update Location" to the HLR. In a large network various methods are used to route the messages back to the proper HLR, but recognize that the SS7 network contains many routing mechanisms in the STPs (Signal Transfer Points) to route messages to one of several hundred HLRs. This message notifies the HLR as to the presence and location of the wireless device and kicks off a sequence of "Insert Subscriber Data" messages that provide the VLR with the operating parameters for that mobile device.

Upon receipt of an incoming call, an MSC queries the HLR for the handset availability using the GSM MAP message "SRI" (Send Routing Information). The HLR either has knowledge of wireless device presence or it doesn't. A similar message is sent from an SMSC (Short Message Service Center). The SRIS (Send Routing Information for Short Message).

Messages originated from a mobile device are sent to a single SMSC. The SMSC address is shown in the handset as an E-164 number which, in the U.S. is a 1+ number. Translation tables in the STPs route GSM MAP messages (including Forward Short Message [FSM]) to network nodes identified by point-code/subsystem using this E-164 number. One number translates to one point-code/subsystem.

In the consumer level SMS service, generally one SMSC serves a particular customer. Sometimes, the customer is served by one SMSC for mobile originate messages (MO) and another for mobile terminate (MT). In certain instances, different message classes are delivered by different SMSCs, but fundamentally, these elements are "store and forward" elements and are not geared towards high speed immediate delivery of messages. If a message is not delivered immediately, it is queued for automatic retry. It is this retry algorithm and load that clog the SMS delivery in consumer SMS messages. They are simply not configured for instant delivery 100% of the time. Any mobile terminate message that fails would equate to a failed voice call. Unfortunately the consumer level retry algorithm does not permit immediate retries. If a voice call fails, then the forward short message would equally fail on the normal GSM signaling channel.

Figure 6:
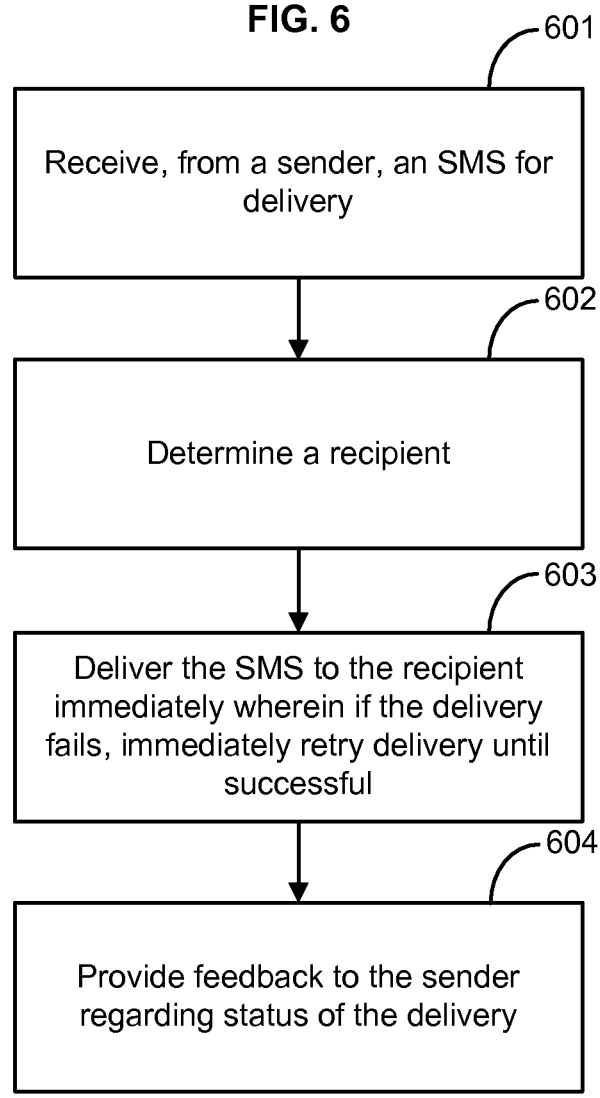
FIG. 6 illustrates methods for high performance Short Message Service (SMS) communication.

In one aspect, illustrated in FIG. 6, provided are methods for high performance Short Message Service (SMS) communication comprising receiving, from a sender, an SMS for delivery at 601, determining a recipient at 602, delivering the SMS to the recipient immediately wherein if the delivery fails, immediately retry delivery until successful at 603 and providing feedback to the sender regarding status of the delivery at 604. Receiving, from a sender, a SMS for delivery can comprise receiving a SMS from a telematics operations center. Determining a recipient can comprise determining an IMSI for a recipient. Delivering the SMS can comprise sending a MAP request to an HLR for routing information for the recipient.

The methods can further comprise receiving an MSC associated with the recipient and an SGSN address associated with the recipient. The methods can further comprise delivering the SMS over a GPRS network utilizing the SGSN address. If the delivery over the GPRS network fails, the methods can deliver the SMS over a GSM network utilizing the MSC associated with the recipient.

The TOC 201 can utilize multiple special HP-SMSCs 304 geared to high speed instant delivery. For MT messages that are originated at the Service Center 205, these HP-SMSCs 304 can deliver messages instantly and provide immediate feedback (e.g., as to network presence) to the Service Center 205. The HP-SMSCs 304 do not place a message into a queue for delivery "whenever." The originating Application Server 901 (described below with regard to FIG. 9) can determine if an immediate retry is required. Alternatively, the Application Server 901 (described below with regard to FIG. 9) can elect to queue the message in the HP-SMSC 304 for future delivery, such as for lower-priority configuration updates. When appropriate, the Application Server 901 (described below with regard to FIG. 9) can set the Alert Service Center flag in the HLR 302, so that the standard network mechanisms for retry triggered by PASS ECU 202 registration can be used. In this case, the HP-SMSC 304 forwards queued messages immediately to minimize battery drain when the PASS ECU 202 checks for incoming messages sent while it was in sleep mode.

Note that the TOC 201 can use GSM/GPRS, instead of the basic GSM mechanism, for delivery of SMS messages whenever possible. SMS over GPRS has a much higher speed delivery than normal SMS over GSM. Because of consumer handset limitations (many do not support SMS over GPRS) and standard SMSC limitations, virtually all consumer SMS messages are delivered over the GSM signaling channel. The PASS ECU 202 and the TOC 201 can use GPRS delivery, which can therefore be used if GPRS is available at the vehicle's current location. If GPRS is not available, or for some reason fails, the PASS ECU 202 can automatically fall back to standard SMS over GSM, again directly to the TOC's HP-SMSCs 304.

MO messages are directed by the E-164 address configured in a typical handset. The PASS ECU 202 can have multiple E-164 addresses configured, and the PASS ECU 202 can randomly select an E-164 address so as to load balance MO messages to the redundant TOC's HP-SMSCs 304. The PASS ECU 202 can receive immediate feedback with the results of the message delivery to the HP-SMSC 304 and can retry another E-164 address if not successful.

Figure 7:
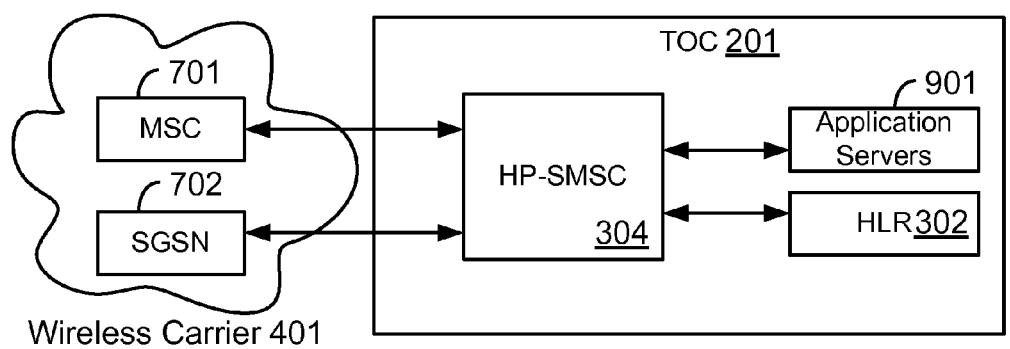
FIG. 7 illustrates High-Performance Short Message Service Center (HP-SMSC) interactions with elements of a wireless network.

As shown in FIG. 7, the HP-SMSC 304 can interface to one or more of the following elements in the wireless network 208. A visited MSC 701, for the exchange of SMS messages between the PASS ECU 202 and the TOC 201 using SMS over GSM. The Serving GPRS Service Node (SGSN) 702, for the exchange of SMS messages between the PASS ECU 202 and the TOC 201 using SMS over GPRS. The HP-SMSC 304 can interface with one or more of the following PASS components in the TOC 201. The HLR 302, for querying subscriber status and location information for MT messaging, using MAP procedures. The Application Server 901, (described below with regard to FIG. 9) for the exchange of MO and MT SMS messages using the Short Message Peer-to-Peer (SMPP) protocol. Network Management 905, (described below with regard to FIG. 9), which can used to configure and monitor the HLR 302.

The Home Location Register (HLR) 302 can store the current location, registration/attachment status, and subscription data for each PASS ECU 202. It can provide this information to other network nodes upon request, for example, by using the MAP protocol. The PASS HLR 302 can also comprise a USSD gateway function, which can serve as an intermediate platform between the HLR 302 and the TOC Application Server 901 (described below with regard to FIG. 9) whenever USSD messages are exchanged.

Regular HLR 302 functions can comprise one or more of the following, location management services, subscriber management, fault and recovery services, USSD relay services, supplementary service management, roaming number, call routing services, and the like.

Additional PASS specific functions of the HLR 302 can comprise one or more of the following MSISDN generation, supporting Application Server 901 (described below with regard to FIG. 9) for querying subscriber 213 information based on IMSI and MSISDN, and the like.

Figure 8:
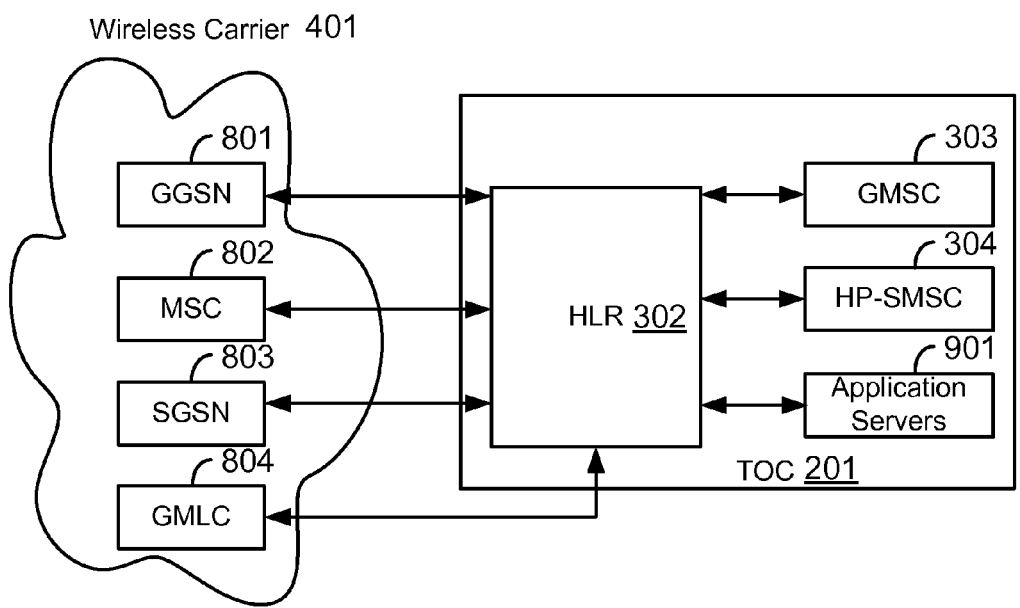
FIG. 8 illustrates Home Location Register (HLR) interactions with elements of a wireless network.

A shown in FIG. 8, the HLR 302 can interface to one or more of the following elements in the wireless network 208. Gateway GPRS Support Node (GGSN) 801, which can serve as the gateway between the GPRS wireless data network and the IP network to provide network access between the PASS ECU 202 and the TOC 201. The visited MSC 802 at which the PASS ECU 202 is currently registered. The SGSN 803, which provides registration, session, mobility management, and authentication for the PASS ECU 202. The Gateway Mobile Location Center (GMLC) 804, which queries the HLR 302 to determine a PASS ECU's 202 current MSC address for LoCation Services (LCS).

The HLR 302 can interface with one or more of the following PASS components in the TOC 201. The GMSC 303, which queries the HLR 302 for the current (i.e., visited) MSC address of the PASS ECU 202 to support MT voice calls (i.e., whenever a Service Operator 204 or PSAP operator 206 needs to call the PASS ECU 202). The HP-SMSC 304, which queries the HLR 302 for the current (i.e., visited) MSC address of the PASS ECU 202 to support MT SMS. The Application Server 901 (described below with regard to FIG. 9), which may query the HLR 302 to determine the current registration status and location information for a PASS ECU 202. Network Management 905 (described below with regard to FIG. 9), which can be used to configure and monitor the HLR 302. The HLR 302 at the redundant TOC (not shown in the figure). HLR-HLR communication can be used to update the peer HLR when any changes are made to subscriber 213 information, such as a result of a location update or MSISDN assignment.

Figure 9:
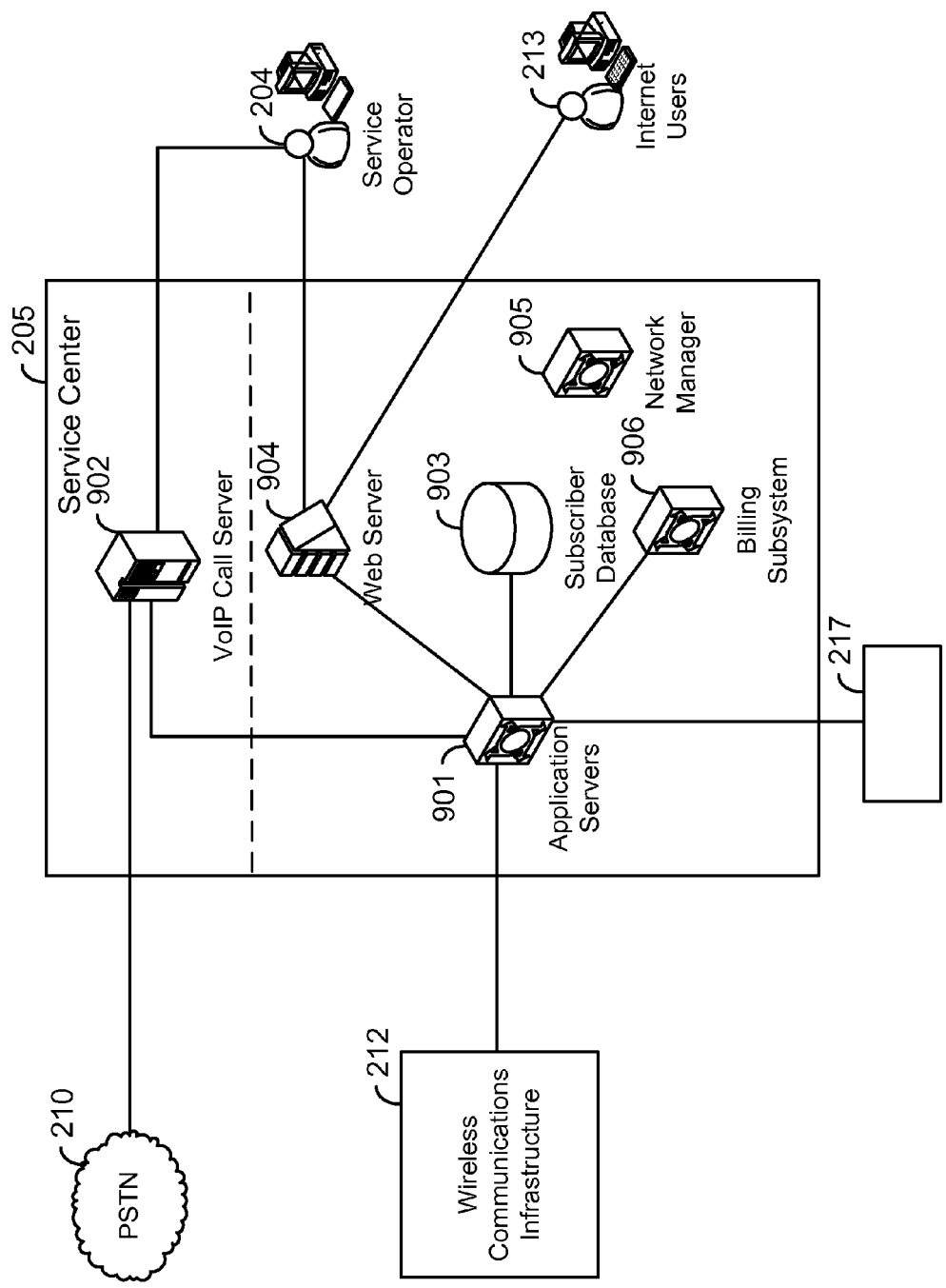
FIG. 9 illustrates an exemplary TOC Service Center.

An exemplary TOC Service Center 205 subsystem is shown in FIG. 9. It can comprise one or more of the following components. Application Server 901, which can provide business logic to implement PASS features using the voice and data communications capabilities provided by the PASS ECU 202 and Wireless Communications Infrastructure 212. The Application Server 901 can access the support service 217 to determine a 10-digit PSTN number for the local PSAP 207, given a vehicle's Global Positioning System (GPS) 209 position. A Voice over IP-based (VoIP-based) Call Server 902, which can provide routing of incoming calls to the appropriate Service Operator 204 based on call origination, type of service, and operator availability. The VoIP Call Server 902 can also provide for 3-way calling for emergency calls and roadside assistance. A Subscriber Database 903, which can be used to maintain all subscriber 213 information in a centralized database. A web server 904, which can provide for Internet access to the PASS applications by subscribers 213, Engineering personnel 214, Dealers 215, and roadside assistance providers 216. A network manager 905, which can provide overall management of the TOC 201, including the Wireless Communications Infrastructure 212, as well as the Service Center 205. A billing subsystem 906, which can be used to record system usage and provide subscriber 213 billing services.

The Application Server 901 can host the PASS service logic as well as service interaction logic. The Application Server 901 can receive service-related messages from the PASS ECU 202 and service operators 204, manages services based on priorities, and keep the Subscriber Database 903 updated with information received from the PASS ECU 202.

The VoIP Call Server 902 can be used to handle and distribute calls from the PASS ECU 202 to the service operators 204. Call distribution logic in the VoIP Call Server 902 can ensure priority call handling for emergency calls. The VoIP Call Server 902 can also include Interactive Voice Response (IVR) for services like Roadside Assistance and Information Call for improved customer service and efficient utilization of the TOC Service Operators 204.

The network manager 905 can be responsible for configuring each of the TOC 201 components (including the Wireless Communications Infrastructure 212 components), collecting alarms from different sources, and monitoring performance parameters reported for the components.

The TOC Service Center 205 is shown in FIG. 9. What follows is a more detailed description of components that can comprise the TOC Service Center 205.

The Application Server 901 can host the PASS services and provide business intelligence and logic to the system. The Application Server 901 can maintain the current context for each ongoing service transaction. Incoming messages from the PASS ECU 202 or Service Operator 204 can initiate service transactions, described below.

The Application Server 901 can support one or more of the following PASS services: Automatic and Manual Emergency Call (both direct to the PSAP 207 and indirect via the VoIP Call Server 902)—the notification from the PASS ECU 202 can initiate the service, and the Application Server 901 can provide the crash information and vehicle location information to the Service Operator 204 via the Web Server 904; Roadside Assistance (Manual and Automatic)—the Application Server 901 can provide the vehicle location information to the Service Operator 204 via the Web Server 904; Information Call (including Point of Interest download); Remote Door Unlock (Immediate and Verified)—the Application Server 901 can generate an MT message to the PASS ECU 202; to effect the door unlock, forward the message to the HP-SMSC 304, and verify that an acknowledgement was received from the PASS ECU 202; Remote Door Lock—the Application Server 901 can generate the MT message to the PASS ECU 202 to effect the door lock, forward the message to the HP-SMSC 304, and verify that an acknowledgement was received from the PASS ECU 202; Stolen Vehicle Tracking—the Application Server 901 can generate the MT message to the PASS ECU 202; to request the current position, forward the message to the HP-SMSC 304, and verify that a response was received from the PASS ECU 202; Anti-Theft Tracking-the service can be initiated when the Application Server 901 receives a notification from the PASS ECU 202, the Application Server 901 can then notify the Service Operator 204; Maintenance Status Reporting—the service can be initiated when the Application Server 901 receives a notification from the PASS ECU 202, the Application Server 901 can then notify the Service Operator 204; and Remote Diagnostics—the Application Server 901 can receive diagnostics information from the PASS ECU 202 and record it for subsequent transfer to Engineering 214 or dealers 215 via EDI.

Figure 10:
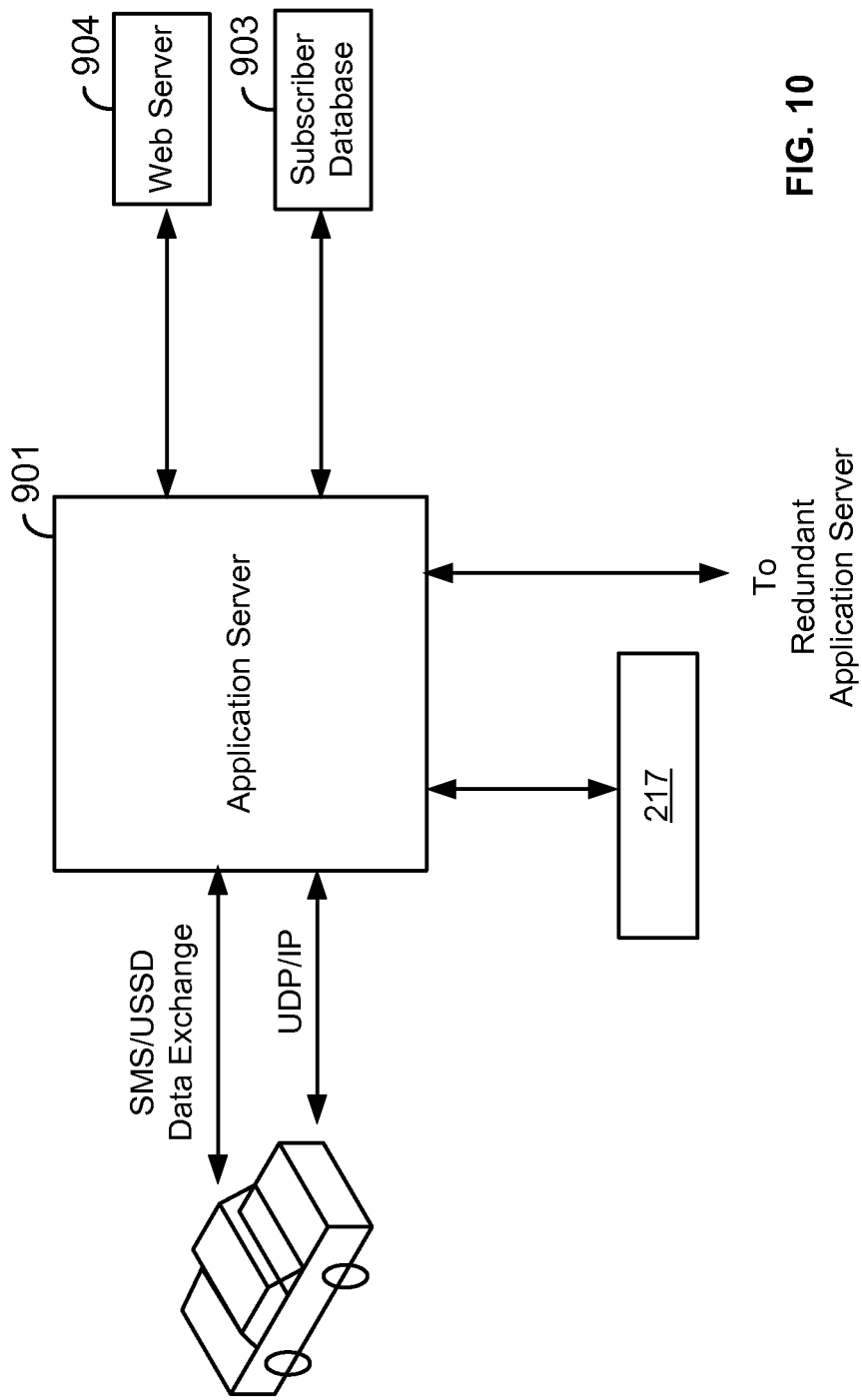
FIG. 10 illustrates Application Server interactions with components at a TOC.

As shown in FIG. 10, the Application Server 901 can interface with one or more of the following PASS components at the TOC 201: The Web Servers 904, which can serve as the gateway to the Service Operators 204; The Application Server 901 can interface to the Web Server 904 using, by way of example, Common Gateway Interface (CGI), Internet Server Application Programming Interface (ISAPI), Dynamic HyperText Markup Language (DHTML), and JavaScript; and the Subscriber Database 903, which the Application Server 901 can access to read and update subscriber 213 information. Access to the Subscriber Database 903 can be through the Application Server 901, ensuring valid and consistent subscriber 213 data. The Application Server 901 can also interface to the support service 217 to determine a 10-digit PSTN number to call for the local PSAP 207, given a vehicle's position. For high availability purposes, the Application Servers 901 can be geographically redundant, and an active server can keep a peer server in sync whenever a change in a service context takes place. Under normal conditions, each Application Server 901 can carry half of the load, since half of the PASS ECUs 202 can be configured to use one server, while the other half can be configured to use the other server (the HP-SMSC 304 can determine which Application Server 901 is used by each PASS ECU 202).

The VoIP call server 902 can be an intelligent call distribution system with TDM—IP media inter-working. This component can distribute incoming service calls from PASS ECUs 202, subscribers 213, and other customers to the active Service Operators 204 based on factors such as type of service or IVR navigation. Outgoing calls from Service Operators 204 (for example, a MT call to a PASS ECU 202) can also go through the VoIP Call Server 902.

The VoIP Call Server 902 can use the Session Initiation Protocol (SIP) for setup of VoIP sessions by Service Operators 204. SIP is a defacto industry standard protocol for setting of multimedia sessions between clients and servers. The VoIP Call Server 902 can also handle call transfers between operators 204, operator registration, and authentication. The VoIP Call Server 902 can interface with the PSTN 210 using T1/TIE lines and appears as a PBX/Switchboard to the PSTN 210.

The VoIP Call Server 902 can route outgoing calls from the Service Operators 204 to other Service Operators 204 or to the PSTN 210 (for example, to PSAP operators 206). MT voice calls can be routed to the GMSC 303 for subsequent routing based on the current registration status of the destination PASS ECU 202.

The Subscriber Database 903 can maintain a list of PASS ECUs 202, for example, identifying one or more of the corresponding VIN, IMSI, IMEI, and any other associated subscriber information. The Subscriber Database 903 can be accessed by the Application Server 901 to authenticate incoming messages and data from the wireless network 208, to support customer care and other operator-assisted PASS services, and to record transactions involving subscribers 213. Access to the Subscriber Database 903 can be through the Application Server 901 to ensure valid and consistent subscriber 213 data.

The Subscriber Database 903 can be replicated at a redundant TOC 201 site, with periodic and transaction-based updates between the two sites to replicate all changes to the subscriber 213 data resulting, for example, from provisioning procedures or service transactions.

The Web Server 904 can be a gateway between PASS users accessing the TOC 201 via the Internet and the Application Server 901. It can support Internet access by Service Operators 204 at the Service Center 205, who can access Web pages developed to support customer care and the various PASS services. The Web Server 904 can also provide access from system users, such as PASS subscribers 213, Engineering personnel 214, roadside assistance providers 216, and the like.

The Billing System 906 can provide for billing based, for example, on monthly service subscriptions or per-transaction billing. It can be closely coupled with automated provisioning services to support a high volume rollout of PASS vehicles. It can interface with the Application Server 901 for access to the Subscriber Database 903.

The Network Manager 905 can provide one or more of the following functions. Configuration management, including one or more of the following: web-accessible user interface to the SNMP agents in each TOC 201 component; device commanding and control, including desired state change operations to implement forced failover; backup copy of configuration maintained centrally; and master configuration distributed among MIBs. Fault management, including one or more of the following: host pinging to determine if a TOC 201 component is available; SNMP agent pinging to determine if a given service is available and monitor its internal state; receipt of SNMP traps from the various TOC 201 components; web-accessible trap/alarm log browser; and operator 204 acknowledgment of alarms. Performance management, including one or more of the following: configuration of thresholds for various statistics; periodic automated statistics collection and threshold analysis. Security management, including one or more of the following: operator 204 access control, which can be granted on a per host basis for two main functions—read-only and read-write; operator 204 access control for cross-platform applications (for example, alarm browser) can be granted on a per-application basis; and operator 204 rights can be maintained in a persistent repository, for example and LDAP repository.

The Network Manager 905 can support event management, data collection, and service monitoring. Data can be persistently stored in an embedded relational database system. The TOC 201 components to be monitored can be configured at the Network Manager 905. Data can be collected for example, via SNMP V2's GET-BULK interface, if available on the agent; otherwise data can be collected in pieces via SNMP V1's GET. Customizable reports can be generated. Aggregating graph tools can be used to produce trending performance graphs. Thresholds for any performance data can be established such that threshold-crossing traps can be generated by the Network Manager 905. Network Manager 905 applications can be accessible via the Web.

B. System Availability

In one aspect, the overall availability of the PASS system can be governed by the availability of various components and the interconnections between them. Emergency services can require higher system availability than other services. Some of the components in the system can form the infrastructure common to all services (such as the SS7 network 308 or the Subscriber Database 903). These components can support the higher-availability requirements of the emergency services.

Two exemplary levels of redundancy can be defined as follows: Subcomponent-level redundancy can be provided by redundant modules within a component, such as duplicating network modules, power supplies, or control modules; and Component-level redundancy can be provided by physically duplicating the component. By duplicating the component at a separate site, a disaster recovery capability is also provided in addition to high availability. The redundant components can be configured to work in either an active-passive or load-sharing mode. For load-sharing, each component must be able to take over the processing load of the other component in the pair. Component interfaces can be designed so that failure of one component does not require switchover of the other components at that site. By way of example, a 40% sizing rule would allow each component to take over the full load with 20% processing capacity remaining for margin.

In one aspect, the STPs 301 can determine the availability of the services provided by the Wireless Communications Infrastructure 212, because they can form a packet switching network between the various components at the two TOC 201 sites. Mated pair STPs 301 with a C-link between them can be used to provide a highly available SS7 network 308. Network management messages as defined at MTP3 can be used to reconfigure routes and paths depending on the availability and congestion state of the network.

Figure 11:
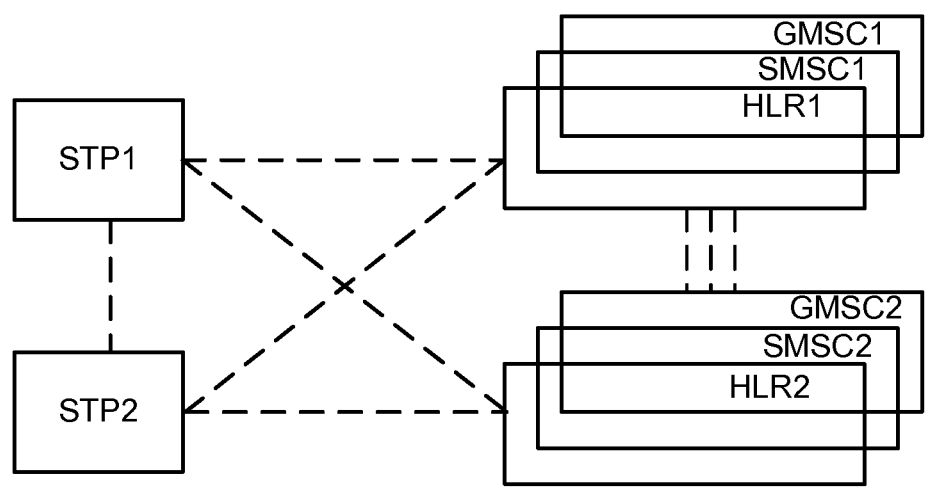
FIG. 11 illustrates how load sharing between redundant TOCs can be implemented.

FIG. 11 illustrates how load sharing between redundant TOCs 201 can be implemented. In load sharing mode, the redundant components can share the same provisioned data; however, the STP 301 GTT can be configured to route messages based on the IMSIs. For example, the STPs 301 can be configured to use HLR1 as the primary HLR for odd numbered IMSIs, with HLR2 as the backup, and to use HLR2 as the primary HLR for even numbered IMSIs. Assuming an equal allocation of even and odd numbered IMSIs, HLR1 and HLR2 will be equally loaded on average.

In the event of a component failure, the STPs 301 can come to know of its unavailability using M3UA procedures. The STPs 301 can then mark that node as unavailable and failover to the backup node. Only transactions in progress will be impacted. In a controlled shutdown of one TOC 201, the SCCP can coordinate handover of all SS7 traffic to the components at the other TOC 201. In the event of a failed component, only transactions in progress will be impacted.

In one aspect, local faults in the a database such as disk failures/corruption can be handled by using, for example, a Level 5 Redundant Array of Independent Disks (RAID), which use multiple drives in combination for fault tolerance (as well as improved performance). Further availability of the database can be ensured by replicating the database at a geographically separate location which is kept synchronized with the active database.

In another aspect, geographic redundancy can be used to ensure a high availability for the Application Server 901. The active Application Server 901 can handle service transactions and update a passive standby server as transaction checkpoints are reached. The passive standby server is ready to take over the service in case of a switchover. If the active server goes down, the formerly passive server can take over role of the active server. Transactions in progress may need to be restarted following a switchover.

In one aspect, availability of the voice infrastructure can be ensured by utilizing one or more of the following configurations: Multiple DS1/TIE lines from the PSTN 210 to prevent isolation in the event of a physical interface failure; Dedicated DS1 lines to the GMSC 303 for emergency calls, with overflow to non-emergency DS1 lines; Multiple Service Center 205 destination PSTN numbers and addresses in the PASS ECU 202 which are used while retrying; Geographical separation of VoIP Call Servers 902; and Indication to Network Manager 905 when availability of Service Operators 204 falls below a threshold especially for emergency call Service Operators 204.

C. System Security

Because the Service Center 205 and PASS ECU 202 are connected to the wireless network 208, a mobile user can send (accidentally or intentionally) an SMS message to the HP-SMSC 304 if the HP-SMSC's 304 number is known. Similarly, any Internet user can send an SMS message to the PASS ECU 202 if the Internet user knows the PASS ECU 202's assigned IMSI. Therefore, the HP-SMSC 304 and PASS ECU 202 can authenticate incoming SMS messages. The first check can be based on the sender information. The next can step involve verifying the authenticity of the SMS contents.

For example, the VIN number, GPS time (such as, higher order to a predetermined level, i.e. 15 min) can be used to generate a key, and the MD5 algorithm can be used to generate a signature. This signature can be included as part of the message. Since the VIN is known only to the vehicle and the PASS network, when combined with current GPS time, a secret key can be generated. This scheme makes replay attacks difficult since the key can be changed every 15 minutes. Even if SIM details are exposed to an attacker, unless the messages are signed with the previously mentioned scheme, the system is secure. Using this scheme authentication for a valid subscriber can fail due to 15-minute boundaries occurring between signing and verification. When this occurs, an SMS retry can solve this problem.

Figure 12:
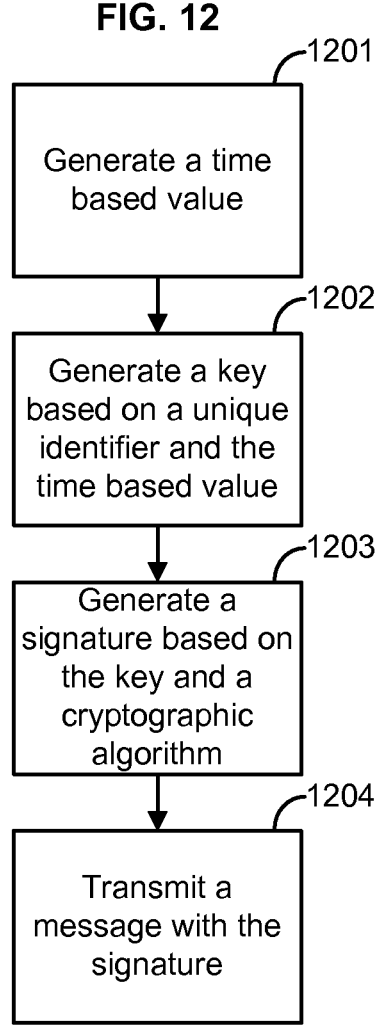
FIG. 12 illustrates an exemplary method for one-way communication authentication.

In one aspect, illustrated in FIG. 12, provided are methods for one-way communication authentication comprising generating a time based value at 1201, generating a key based on a unique identifier and the time based value at 1202, generating a signature based on the key and a cryptographic algorithm at 1203, and transmitting a message with the signature at 1204. Generating a time based value can comprise determining the time based value at a predetermined time interval. Transmitting the message with the signature can comprise transmitting a SMS message with the key. The method can further comprise repeating steps 1201-1203 once per predetermined increment of time.

The unique identifier can be, for example, an ECU serial number, a randomly assigned number, a vehicle identification number, and the like.

The time based value can be obtained from a GPS. The time based value can be rounded to a predetermined increment of time. The time based value can be any increment of time. For example, the predetermined increment of time can be five minutes, 10 minutes, 15 minutes, 20 minutes, and the like.

The predetermined time interval can be any interval of time, for example, fifteen minutes. The cryptographic algorithm can comprise, for example, one of a Message-Digest 5 (MD5) algorithm, a secure hash algorithm (SHA), a RACE Integrity Primitives Evaluation Message Digest (RIPEMD) algorithm, Cellular Authentication, Voice Privacy and Encryption (CAVE) algorithm, or a Whirlpool algorithm.

GPRS security can involve admission control and authentication of ECUs before they are assigned an IP address. This can be used since any GPRS user can otherwise attach to the PASS Access Point Name (APN), get an IP address assigned and access the PASS internal network. To prevent this type of attack, IP address assignment can be preceded by an authentication phase. For example, Challenge/Handshake Authentication Protocol (CHAP)/RADIUS combination can be used to authenticate the PASS ECU 202.

In the absence of any end-to-end security mechanism, Public/Private IP WAN networks can use IPSec as is known in the art. IPSec provides a standard, robust, and extensible mechanism for IP and upper-layer protocols (for example, UDP or TCP). In order to ensure extensibility, algorithms can be implemented via downline load to the PASS ECU 202.

Internet users of the PASS system can comprise service operators 204, roadside assistance providers 216, dealers 215, engineering 214, subscribers 213, and the like. Each of these types of users can have different access privileges. Internet users can access the facilities authorized to them using a Web browser by logging in to the PASS system with a given username and password. Once an Internet user successfully logs in to the system, the system can determine the access privileges of the user and present the options to the user accordingly.

D. Communications Operations

Provided are exemplary operational aspects of the Wireless Communication Infrastructure 212 that can provide voice and data communication between the PASS ECU 202 and the Service Center 205. One or more of the following functions can be supported by the Wireless Communication Infrastructure 212: Network Registration; Location Update; MSISDN Assignment; Mobile (or PASS ECU 202) Originated Voice Call; Mobile (or PASS ECU 202) Terminated Voice Call; Mobile (or PASS ECU 202) Originated Short Message; Mobile (or PASS ECU 202) Terminated Short Message; IP Connectivity; and the like.

In one aspect, when the PASS ECU 202 is initially activated and when it exits from sleep mode to check for incoming messages from the Service Center 205, the PASS ECU 202 can execute a GSM registration procedure to announce its availability in the network. GSM and GPRS can be registered separately or in a combined manner depending on the local network options.

Figure 13:
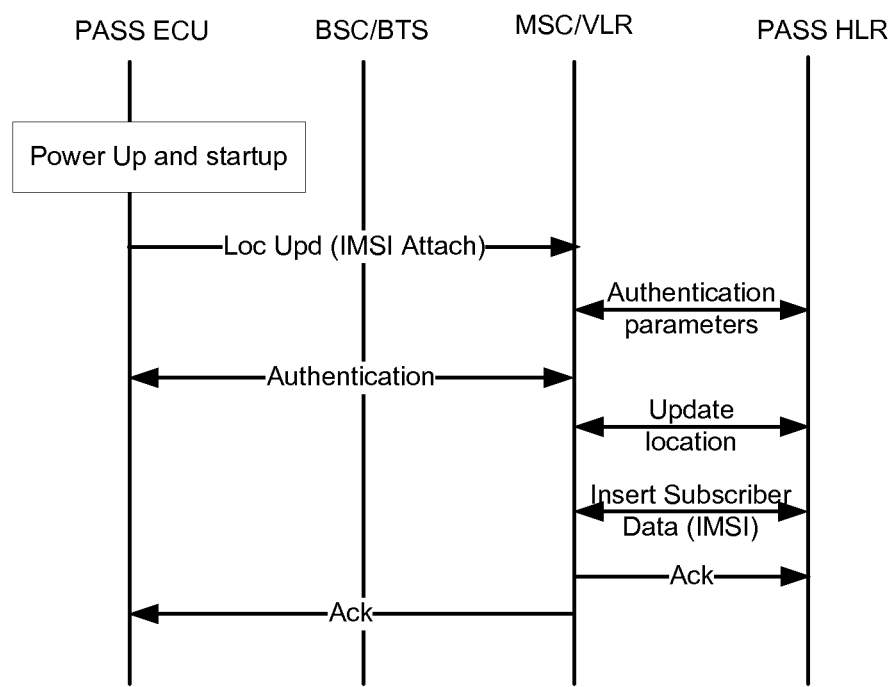
FIG. 13 illustrates an exemplary GSM-only registration method.

FIG. 13 illustrates an exemplary GSM-only registration method. The method can comprise:

1. The PASS ECU 202 can send a Location Update to the local MSC with its IMSI.
2. The MSC can send a MAP Request to the PASS HLR 302 to get the authentication parameters.
3. The MSC can authenticate the user by using a challenge/response procedure and assigns a Temporary Mobile Station Identifier (TMSI) to the PASS ECU 202.
4. On successful authentication, the MSC can update the location of the PASS ECU 202 in the PASS HLR 302.
5. The PASS HLR 302 can insert subscriber data in the MSC with the MSISDN identical to IMSI. The HLR 302 can also notify the MSC of the new registration (not shown).
6. The MSC can send an acknowledgement to the PASS ECU 202 for the location update.

This can complete the registration process. The PASS ECU 202 is now ready to receive or originate GSM traffic. If any SMS messages are pending delivery to the PASS ECU 202, the wireless network can page the PASS ECU 202 at this time. In order to minimize the battery drain in sleep mode, the MSC can respond immediately to registration if there are any pending messages. The PASS ECU 202 can continue to perform periodic location updates based on the configuration provided by the network or whenever it changes location area.

Figure 14:
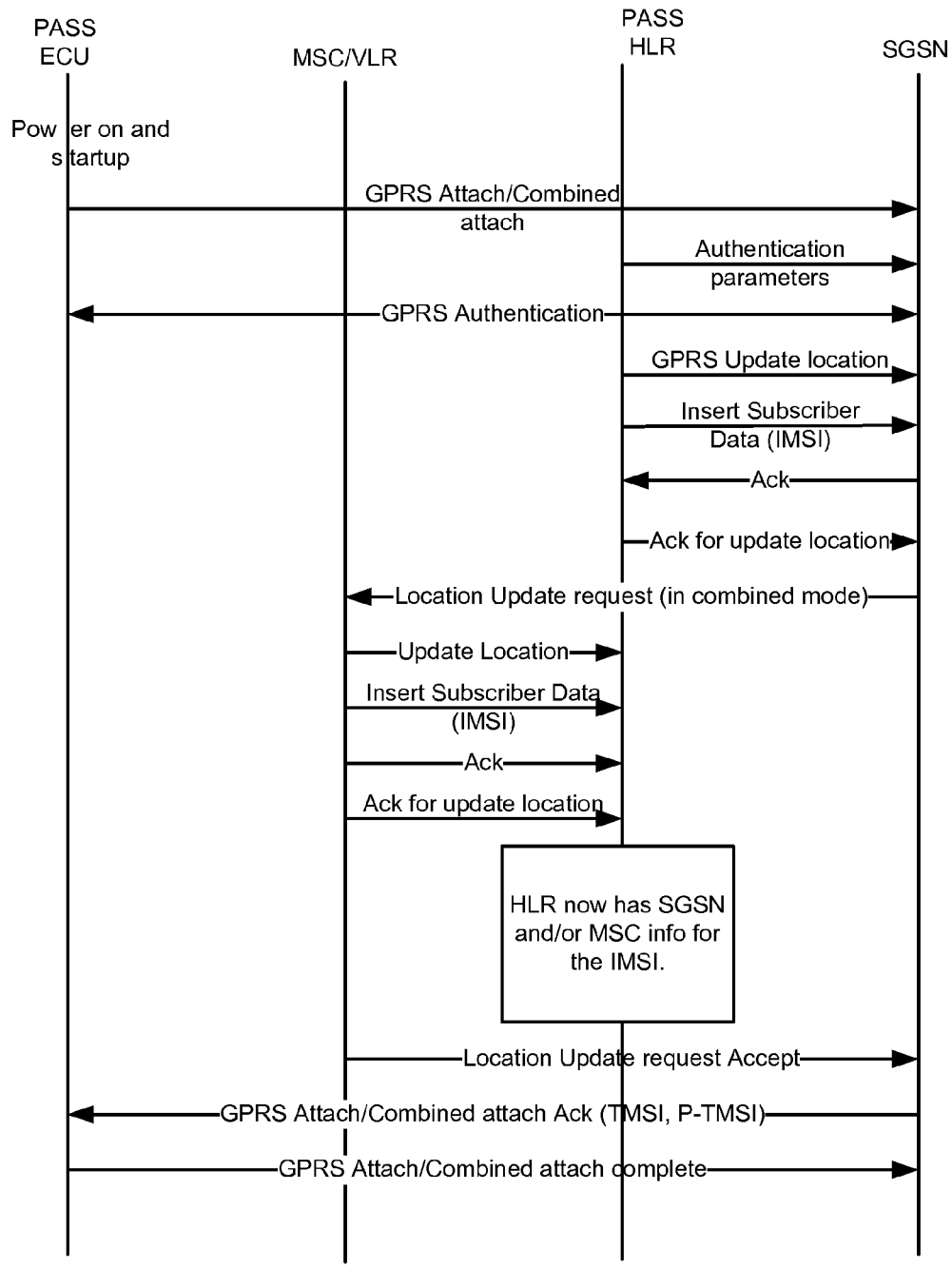
FIG. 14 illustrates an exemplary combined GSM and GPRS network registration.

FIG. 14 illustrates an exemplary combined GSM and GPRS network registration. If the network supports it, the PASS ECU 202 can perform a method for combined IMSI and GPRS attach, comprising:

1. The PASS ECU 202 can send a combined attach request to the SGSN.
2. The SGSN based on IMSI can send a MAP request to the PASS HLR 302 for authentication parameters.
3. The SGSN can perform a challenge/response based authentication with the PASS ECU 202.
4. On successful authentication, the SGSN can update the PASS HLR 302 with SGSN information.
5. The HLR 302 can insert subscriber data (for example subscription data) in the SGSN.
6. The SGSN can then forward the attach request to the MSC.
7. The MSC can allocate a TMSI for the PASS ECU 202 and sends the attach acknowledgement to the SGSN.
8. The SGSN now includes the P-TMSI and TMSI in the attach response to the PASS ECU 202.

The PASS ECU 202 is now ready to receive or originate both GSM and GPRS traffic.

In another aspect, location updates can be automatically performed by the PASS ECU 202 in one or more of the conditions discussed below. When the PASS ECU 202 is in normal mode (for example, ignition on), it can keep the GSM network updated with the latest location as the PASS ECU 202 moves from one location area to another, where a location area is a set of adjacent cells (defined by the network provider) in which the PASS ECU 202 can be paged for incoming traffic. A similar treatment can be applied to GPRS services, where the PASS ECU 202 keeps the routing area (a subset of location area) updated in the network as the PASS ECU 202 moves from one area to another.

When the PASS ECU 202 is in sleep mode, it can periodically wake up to check for any incoming messages from the Service Center 205. During this time the PASS ECU 202 can also check for the best cell to use and, if different from the current cell, can adjust its receiver to the new cell. If this new cell is in a new location area, the PASS ECU 202 can perform a location area update.

In order to stay registered in the network in low power or normal mode, the PASS ECU 202 can also perform periodic location updates. The periodicity of the location updates can be determined by network-supplied parameters.

In another aspect, provided are methods for dynamic MSISDN assignment. In a typical 911/112 call to an emergency operator 206 at the PSAP 207, the calling party number displayed on the operator's console can be used by the operator 206 to call back if the call is disconnected. In the case of a regular MO call from a mobile subscriber to 911, this number will be the MSISDN number assigned to the subscriber (and stored in the SIM). However, due to the costs associated with MSISDN assignment, in one aspect, MSISDNs will not be permanently assigned to each PASS ECU 202. This is practical because MT calls from the PSTN 210 are not generally supported.

To facilitate callback from a PSAP operator 206, the TOC 201 can temporarily assign an MSISDN number to the PASS ECU 202 when it makes an emergency call directly to the PSAP 207. This number can remain allocated to the PASS ECU 202 for a fixed time period (for example, 1 hour) before it is returned to the free pool for reuse. The total number of MSISDN numbers needed for the entire system can be determined by the rate at which emergency calls are made to the PSAP 207.

Figure 15:
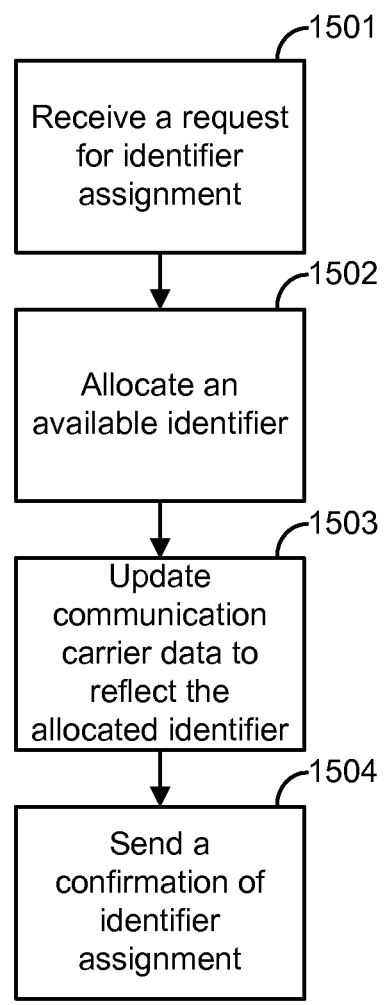
FIG. 15 illustrates an exemplary method for dynamic identifier assignment.

In one aspect, illustrated in FIG. 15, provided are methods for dynamic identifier assignment comprising receiving a request for identifier assignment at 1501, allocating an available identifier at 1502, updating communication carrier data to reflect the allocated identifier at 1503, and sending a confirmation of identifier assignment at 1504.

The request for identifier assignment can be received from a mobile vehicle telematics unit. Receiving a request for identifier assignment can comprise receiving a Unstructured Supplementary Services Data (USSD) message comprising location data, vehicle identification number (VIN) data, and International Mobile Subscriber Identity (IMSI) data.

Allocating an available identifier can comprise allocating an Mobile Station International ISDN Number (MSISDN) from a plurality of MSISDNs.

Updating communication carrier data to reflect the allocated identifier can comprise updating the communication carrier's Mobile Switching Center/Visitor Location Register (MSC/VLR) data with the allocated identifier. Updating communication carrier data to reflect the allocated identifier can comprise updating the communication carrier's Serving GPRS Service Node (SGSN). Updating communication carrier data to reflect the allocated identifier can further comprise receiving an acknowledgment that updating was successful.

Sending a confirmation of identifier assignment can comprise sending a USSD message.

The method can further comprise starting a timer after sending the confirmation. The method can further comprise releasing the assigned identifier after the timer reaches a predetermined value. The predetermined value can be an amount of time, for example, three hours.

In another aspect, provided is an apparatus for dynamic identifier assignment comprising a memory for storing a plurality of available identifiers, a transceiver configured for receiving a request for identifier assignment, a processor configured for allocating an available identifier from the plurality of available identifiers, wherein the transceiver is further configured for updating communication carrier data to reflect the allocated identifier, and sending a confirmation of identifier assignment.

The request for identifier assignment can be received from a mobile vehicle telematics unit. The request for identifier assignment can comprise a USSD message comprising location data, VIN data, and IMSI data.

The processor can be configured for allocating an MSISDN from a plurality of MSISDNs.

The transceiver can be configured for updating the communication carrier's MSC/VLR data with the allocated identifier. The transceiver can be configured for updating the communication carrier's SGSN. The transceiver can be configured for receiving an acknowledgment that updating was successful. The transceiver can be configured for sending a USSD message.

The processor can be further configured for starting a timer after sending the confirmation. The processor can be further configured releasing the assigned identifier after the timer reaches a predetermined value. The predetermined value can be any amount of time, for example, three hours.

Figure 16:
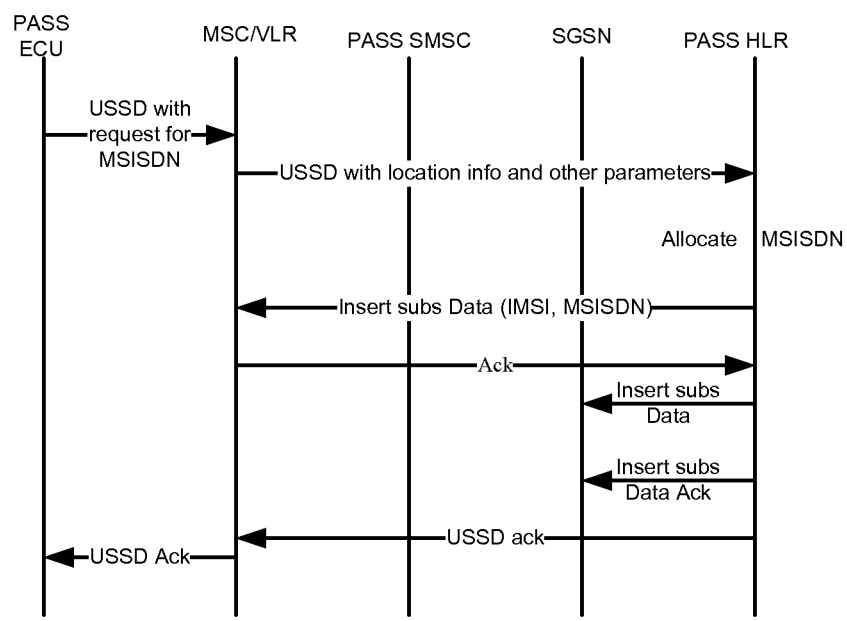
FIG. 16 illustrates an exemplary procedure for assigning an Mobile Station International ISDN Number (MSISDN)

FIG. 16 illustrates an exemplary procedure for assigning an MSISDN number to a PASS ECU 202 using USSD messaging. This method can be invoked by the PASS ECU 202 prior to making an emergency call directly to the local PSAP 207, comprising:

1. When the PASS ECU 202 decides to make a direct emergency call, it can send a USSD message to the visited MSC with location information and other parameters such as the VIN and IMSI.
2. The MSC can examine the USSD message and forwards it to the HLR 302.
3. The HLR 302 can parse the message and allocates an MSISDN from the pool of free numbers.
4. The HLR 302 can update the wireless carrier's MSC/VLR data with the allocated MSISDN by sending Insert Subs Data.
5. The HLR 302 can do the same with the wireless carrier's SGSN.
6. Once the HLR 302 has received acknowledgements from both the MSC and SGSN, it can send a USSD message back to the PASS ECU 202. The HLR 302 can also start a timer of a pre-determined duration for release of the MSISDN.

When the PASS ECU 202 makes a MO voice call, the wireless carrier can provide the allocated MSISDN number to identify the calling party. On expiration of the timer, the HLR 302 can free up the MSISDN and again update the MSC/SGSN with the IMSI (not shown), so that subsequent, non-emergency calls can use the IMSI to identify the calling party.

If the PASS ECU 202 is currently using a network which does not have a roaming agreement with the PASS network, the MSISDN assignment is not possible. In this case, the PASS ECU 202's permanently assigned IMSI can appear as the calling party identifier.

Figure 17:
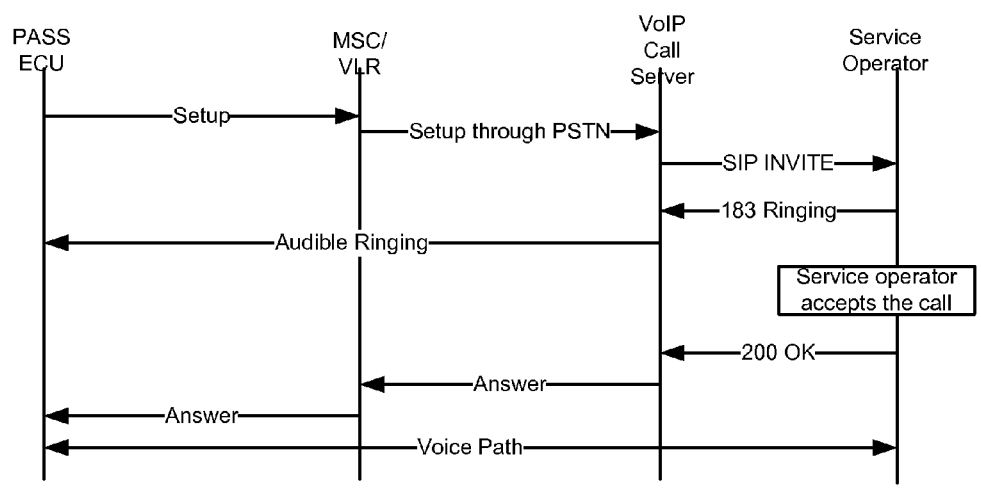
FIG. 17 illustrates an exemplary method for mobile originated voice calls.

Provided in another aspect are methods for mobile originated voice calls. In normal mode, the PASS ECU 202 can originate a voice call when a service button is pressed. The call origination procedure can be the same as for a normal GSM call. An exemplary procedure is shown in FIG. 17 (the PASS ECU 202 is assumed to be registered before the call is attempted):
1. The PASS ECU 202 can send a SETUP message to the visited MSC containing the called party number.
2. The MSC can route the call through the PSTN 210 to the VoIP Call Server 902.
3. The VoIP Call Server 902 can route the call to a free Service Operator 204 and sends a SIP INVITE message to this operator.
4. While the VoIP Call Server 902 is waiting for the Service Operator 204 to accept the call, it can provide audible ringing to the PASS ECU 202.
5. The Service Operator 204 can accept the call, and the VoIP Call Server 902 can disconnect audible ringing and send an answer signal back to the HP-SMSC 304.
6. The MSC can pass the answer signal on to the PASS ECU 202.
7. The voice path can be established between the Service Operator 204 and the PASS ECU 202.

Figure 18:
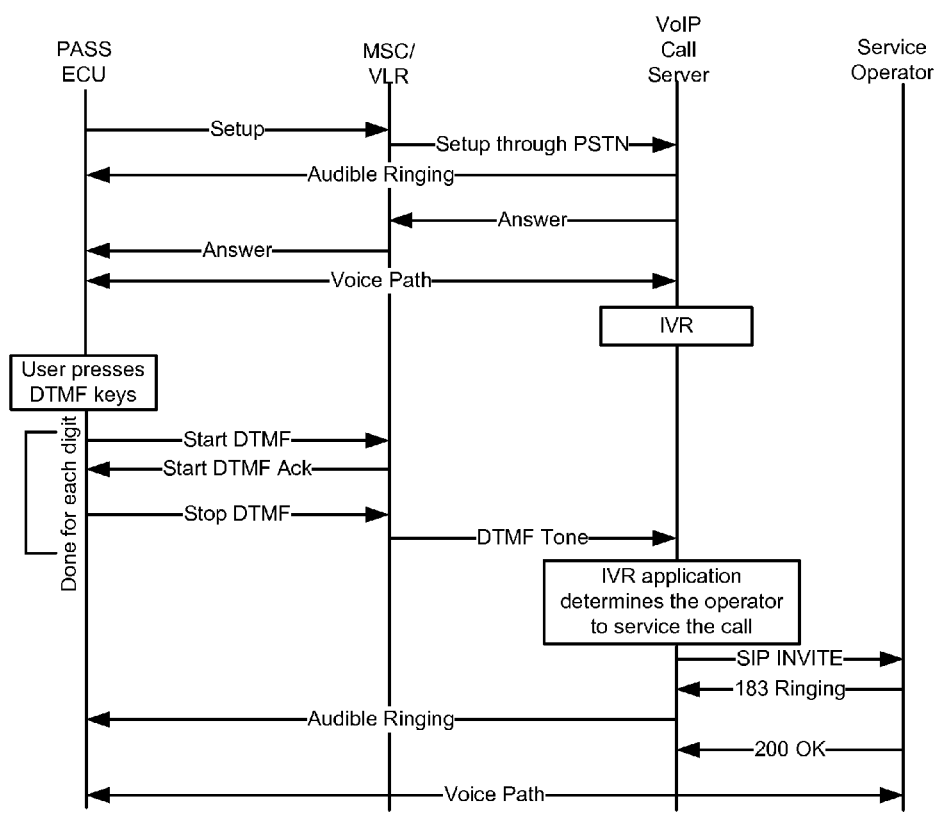
FIG. 18 illustrates an exemplary method for a Roadside Assistance call.

In some cases, such as for a Roadside Assistance call, the user may need to go through an Intelligent Voice recognition (IVR) system before being routed to a Service Operator 204. An exemplary procedure for this is shown in FIG. 18. The method can comprise:
1. The PASS ECU 202 can send a SETUP message to the visited MSC containing the called party number.
2. The MSC can route the call through the PSTN 210 to the VoIP Call Server 902.
3. The VoIP Call Server 902 can route the incoming non-emergency call to an IVR. The IVR answers the call and prompts the user to choose between different available services using the in-vehicle DTMF keypad.
4. The PASS ECU 202 can send the DTMF digits to the MSC using DTAP messages, and the MSC converts them into DTMF tones, which are forwarded to the VoIP Call Server 902 and IVR.
5. The VoIP Call Server 902 can route the call to the appropriate Service Operator 204 and sends a SIP INVITE message to the Service Operator 204.

In an aspect, MT voice calls to a PASS ECU 202 can be originated by either a TOC Service Operator 204 or the PSAP operator 206. Calls from the Service Center 205 can use the IMSI number permanently assigned to the PASS ECU 202. Calls from the PSAP operator 206 can use the MSISDN temporarily assigned to the PASS ECU 202. The call can be routed to the PSTN 210, which can route the call to the GMSC 303, and the GMSC 303 can route the call to the visited MSC in the wireless network.

Figure 19:
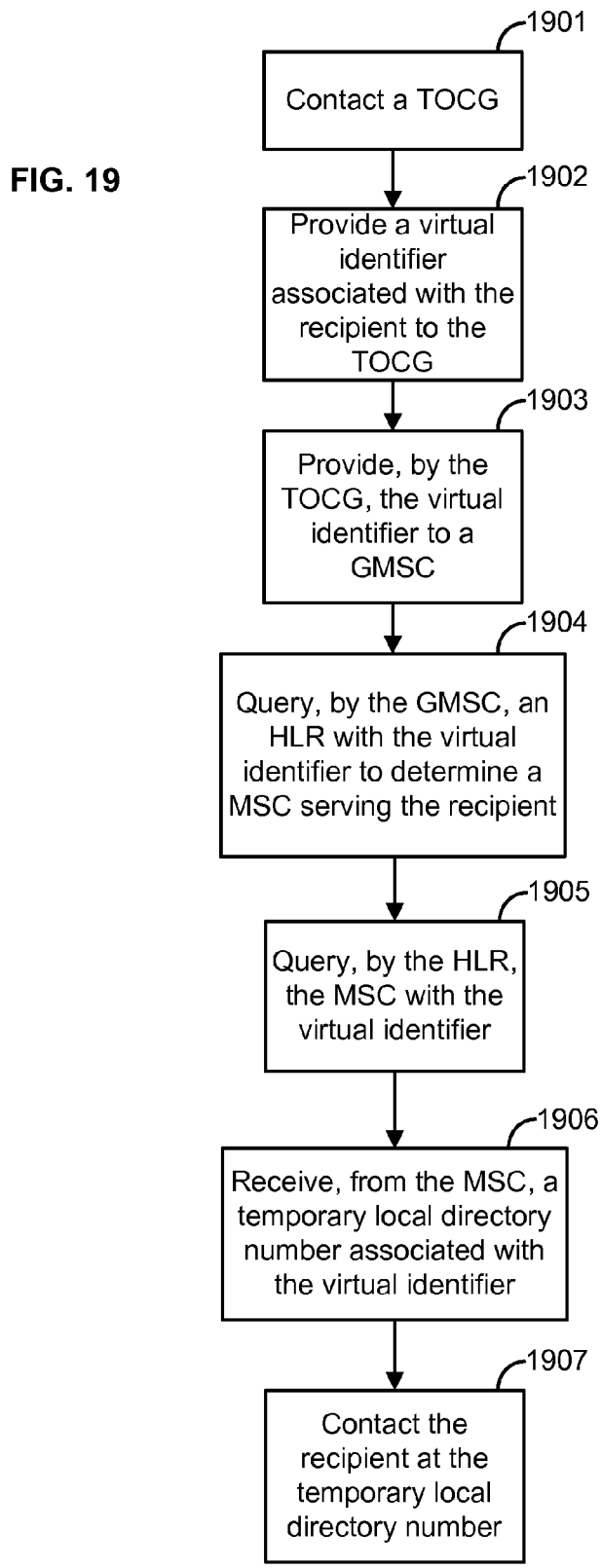
FIG. 19 illustrates an exemplary method for contacting a recipient with a virtual identifier.

In one aspect, illustrated in FIG. 19, provided are methods for contacting a recipient with a virtual identifier comprising contacting a telematics operations center gateway (TOCG) at 1901, providing a virtual identifier associated with the recipient to the TOCG at 1902, providing, by the TOCG, the virtual identifier to a gateway mobile service center (GMSC) at 1903, querying, by the GMSC, a home location register (HLR) with the virtual identifier to determine a mobile service center (MSC) serving the recipient, at 1904, querying, by the HLR, the MSC with the virtual identifier at 1905, receiving, from the MSC, a temporary local directory number associated with the virtual identifier at 1906 and contacting the recipient at the temporary local directory number at 1907.

Contacting the TOCG can comprise initiating an outbound call to a telephone number. Contacting the TOCG can comprise interacting with an interactive voice response (IVR) system. The method can further comprise validating the virtual identifier by the TOCG.

Providing the virtual identifier associated with the recipient to the TOCG can comprise providing an International Mobile Subscriber Identity (IMSI) associated with the recipient to the TOCG.

Receiving, from the MSC, a temporary local directory number associated with the virtual identifier can comprise receiving the temporary local directory number at the HLR and sending a response from the HLR to the GMSC with the temporary local directory number.

Contacting the recipient at the temporary local directory number can comprise initiating, by the GMSC an outbound call to the temporary local number.

In another aspect, provided are systems for contacting a recipient with a virtual identifier comprising a telematics operations center gateway (TOCG) configured to receive a call from a user and to receive a virtual identifier associated with the recipient, a gateway mobile service center (GMSC), coupled to the TOCG by a dedicated trunk, wherein the CMSC is configured to receive a call to the virtual identifier from the TOCG and query a home location register with the virtual identifier, a home location register (HLR), coupled to the GMSC, wherein the HLR is configured to query a mobile service center (MSC) serving the recipient and receive a temporary local directory number associated with the virtual identifier from the MSC, and wherein the GMSC is further configured to receive the temporary local directory number from the HLR and contact the recipient at the temporary local directory number.

The TOCG can be configured to be contacted through a telephone number. The TOCG can be further configured to validate the virtual identifier. The TOCG can be further configured to interact with a user via an interactive voice response (IVR) system. In one aspect, the TOCG can be a server.

The virtual identifier can be an IMSI associated with the recipient.

The GMSC can be further configured to send a Mobile Application Part (MAP) Send Routing Information (SRI) request to the HLR. The HLR can be further configured to examine a subscriber record associated with the virtual identifier, thereby identifying the MSC serving the recipient. The MSC can be further configured to receive an incoming call to the temporary local directory number from the GMSC and route the incoming call to the recipient.

Figure 20:
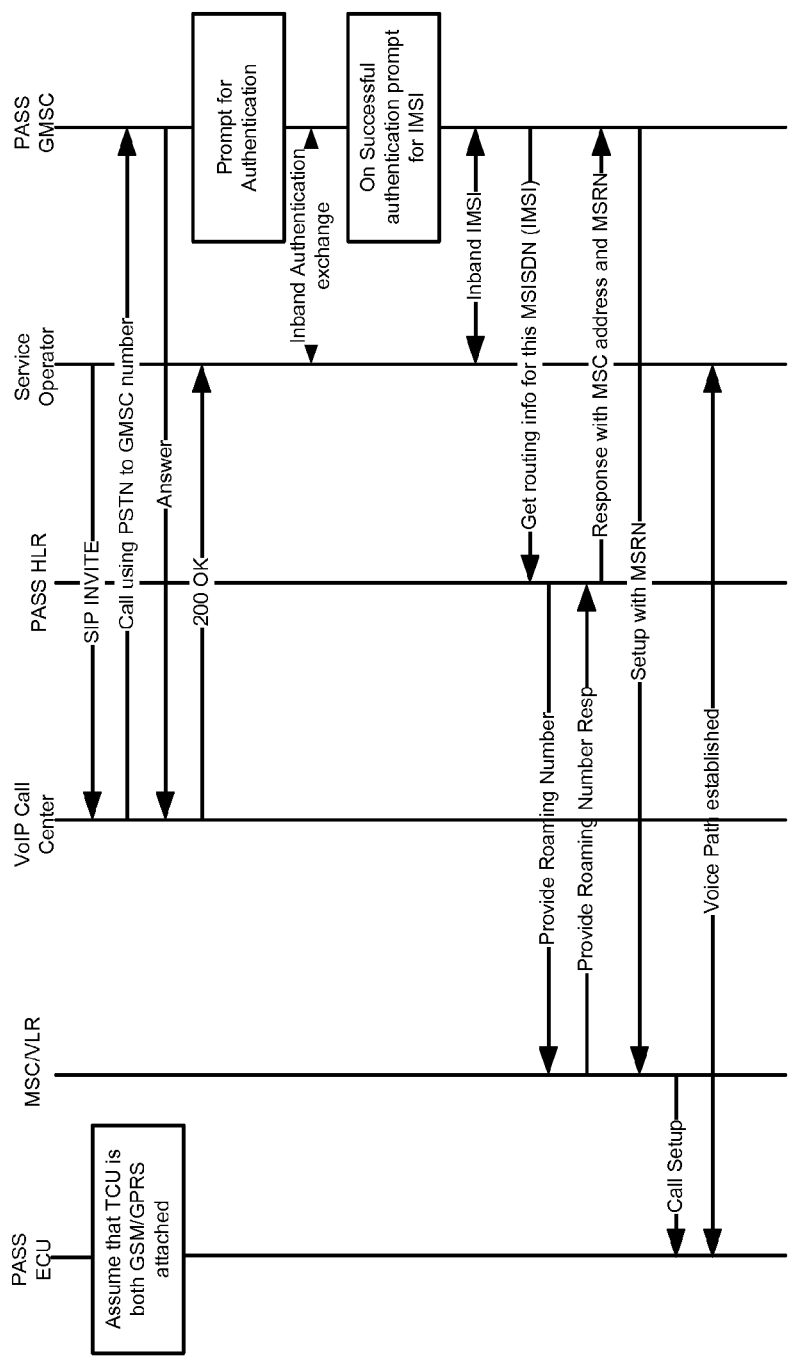
FIG. 20 illustrates an exemplary method for a mobile terminated voice call from a TOC.

An exemplary method for a MT voice call from a TOC Service Operator 204 is shown in FIG. 20:
1. The Service Operator 204 dials a well-known (for example, 800) number, and the PSTN 210 routes the call to a Telematics Operations Center Gateway (TOCG) or GMSC 303.
2. The GMSC 303 authenticates the Service Operator 204 using an IVR (similar to voice mail access).
3. On successful authentication, the GMSC 303 prompts for the number to be dialed.
4. The Service Operator 204 enters the IMSI assigned to the PASS ECU 202.
5. The GMSC 303 queries the HLR 302 for the location (that is, MSC address and MSRN) of this user.
6. The HLR 302 has the MSC address from the last location update. It sends a query to this MSC using the IMSI as the MSISDN.
7. The visited MSC provides a Mobile Station Roaming Number (MSRN) for this subscriber.

8. The HLR 302 provides this roaming number to the GMSC 303.
9. The GMSC 303 uses ISUP based signaling with the MSRN as the called number to reach the visited MSC.
10. The visited MSC does a call setup with the PASS ECU 202 based on the TMSI.

Provided in another aspect are methods for mobile originated short messages. The PASS ECU 202 can send messages to the TOC 201 using the SMS service as defined in GSM specifications. SMS messages can be sent using either GSM protocols or GPRS. GPRS provides a more radio resource efficient mechanism, however, if GPRS service is unavailable in the area, the GSM-based SMS service can be used.

Figure 21:
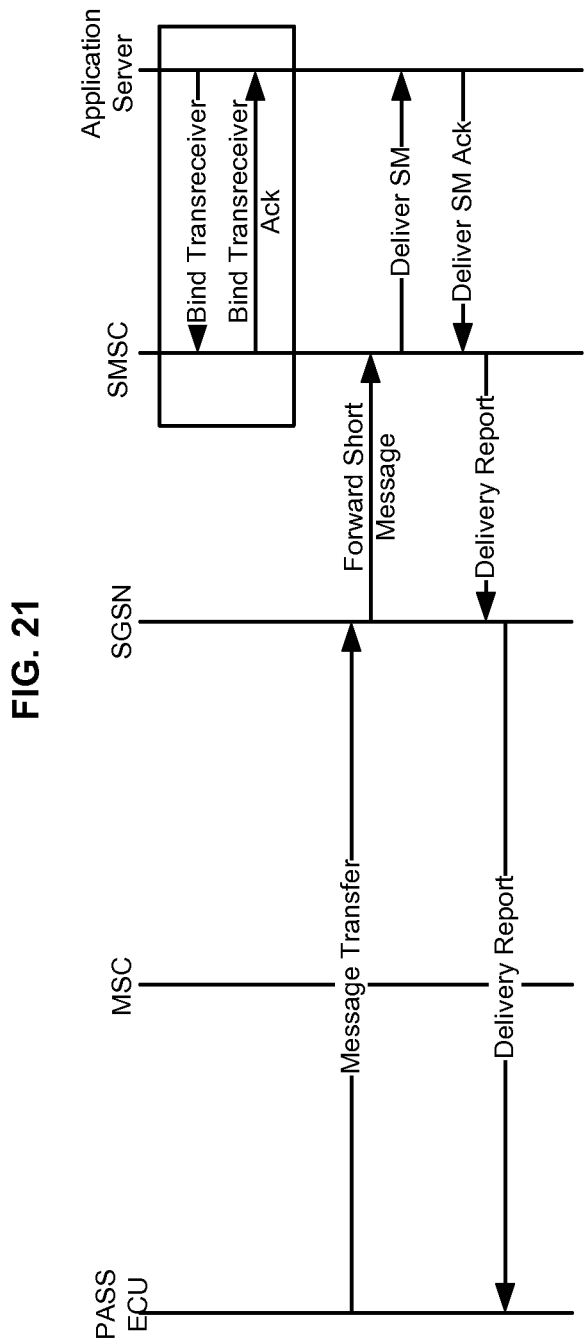
FIG. 21 illustrates an exemplary sequence of events that occur when a mobile originated SMS message is sent using GPRS.

FIG. 21 illustrates an exemplary sequence of events that occur when a MO (mobile originated) SMS message is sent using GPRS:
1. The Application Server 901 at the time of startup can bind its address to the HP-SMSC 304.
2. When the PASS ECU 202 needs to send a message it can submit it with contents, PASS SMSC address and destination address to the SGSN over the GPRS link.
3. The SGSN can forward this to the MSC address specified using the SS7 network 308.
4. The HP-SMSC 304 can deliver the message to the Application Server 901 using SMPP.
5. On receiving an acknowledgement from the Application Server 901, the HP-SMSC 304 can form a delivery report and send it to the PASS ECU 202. This delivery report can confirm to the PASS ECU 202 that the message has reached the Application Server 901.

If a voice call is in progress when the PASS ECU 202 needs to send a short message, the existing GSM traffic channel can be used to send the SMS.

If the PASS ECU 202 receives a failure report, it can choose to retry another Application Server 901 identified by a backup configured address in the MIB.

Mobile Originated (MO) SMS based on GSM is similar except that it goes through the HP-SMSC 304 instead of the SGSN. In this case, the HP-SMSC 304 address is the HP-SMSC 304 address and the destination address is that of the Application Server 901. The HP-SMSC 304 address can be a regular mobile phone address and can be stored in the PASS ECU 202. The Application Server 901 address can, however, be flexible as its significance is local to the PASS network. The Application Server 901 can register itself with the HP-SMSC 304 using its assigned address at system startup. The SMPP protocol can be used between the HP-SMSC 304 and Application Server 901.

Figure 22:
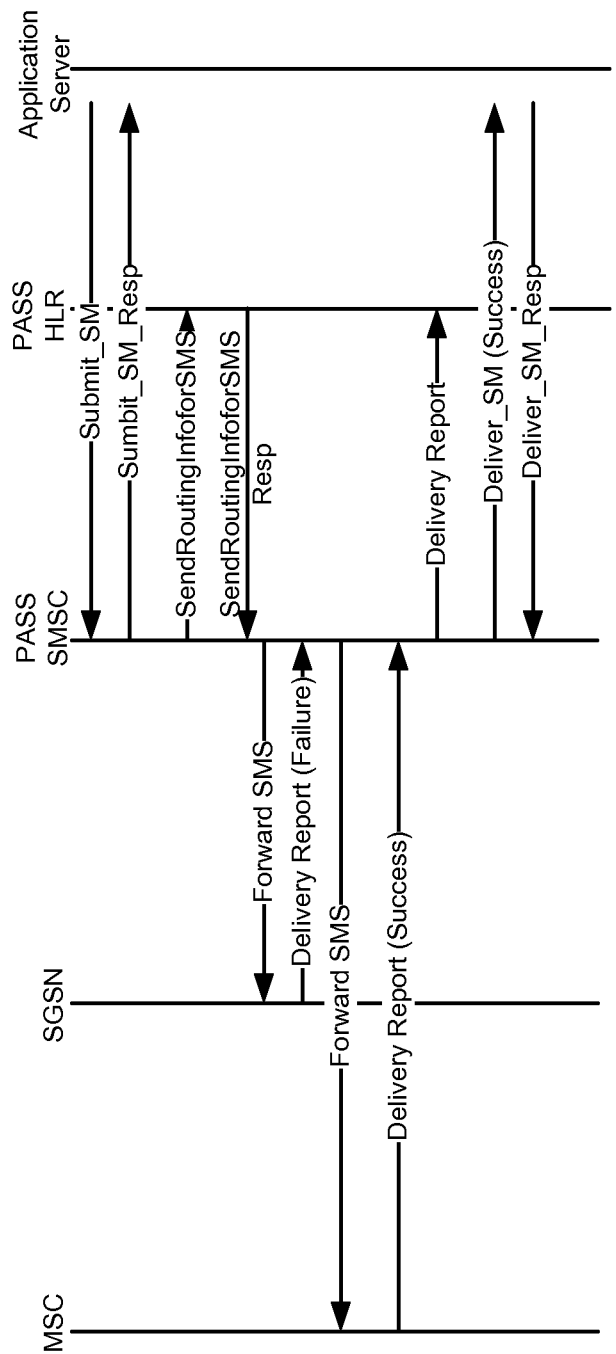
FIG. 22 illustrates an exemplary mobile terminated short message procedure.

Provided in another aspect are methods for mobile terminated short messages. As with MO SMS, mobile terminated SMS can be sent over GSM or GPRS (if the PASS ECU 202 is GPRS attached). However, with Class B devices, GPRS SMS and GSM traffic cannot be simultaneously active. It is generally configurable at the HP-SMSC 304 as to try the GPRS first or not. In this scenario, the GPRS can be the preferred option. FIG. 22 illustrates an exemplary MT short message procedure:
1. The Application Server 901 can use the SMPP protocol to submit a message to the HP-SMSC 304 for delivery to the PASS ECU 202. The PASS ECU 202's permanently assigned IMSI can be used as the destination number.
2. The HP-SMSC 304 can send a MAP request to the HLR 302 for the current routing information for the PASS ECU 202 (that is, MSC/SGSN address).
3. If the PASS ECU 202 is attached to the network, then the HLR 302 can return the MSC and, if the PASS ECU 202 is also GPRS attached, the SGSN address.
4. Assuming that the PASS ECU 202 is GPRS attached, the HP-SMSC 304 can first try the SGSN route.
5. If a voice call is in progress, the PASS ECU 202 cannot respond to packet paging requests and results in failure to send an SMS.
6. The failure report can be sent back to the HP-SMSC 304, which can then try the GSM option through the MSC. The PASS ECU 202 can receive the SMS in this case, even if a voice call is active.
7. The visited MSC can send back a successful delivery report to the HP-SMSC 304.
8. The HP-SMSC 304 can pass this delivery report back to the Application Server 901 using SMPP.

Figure 23:
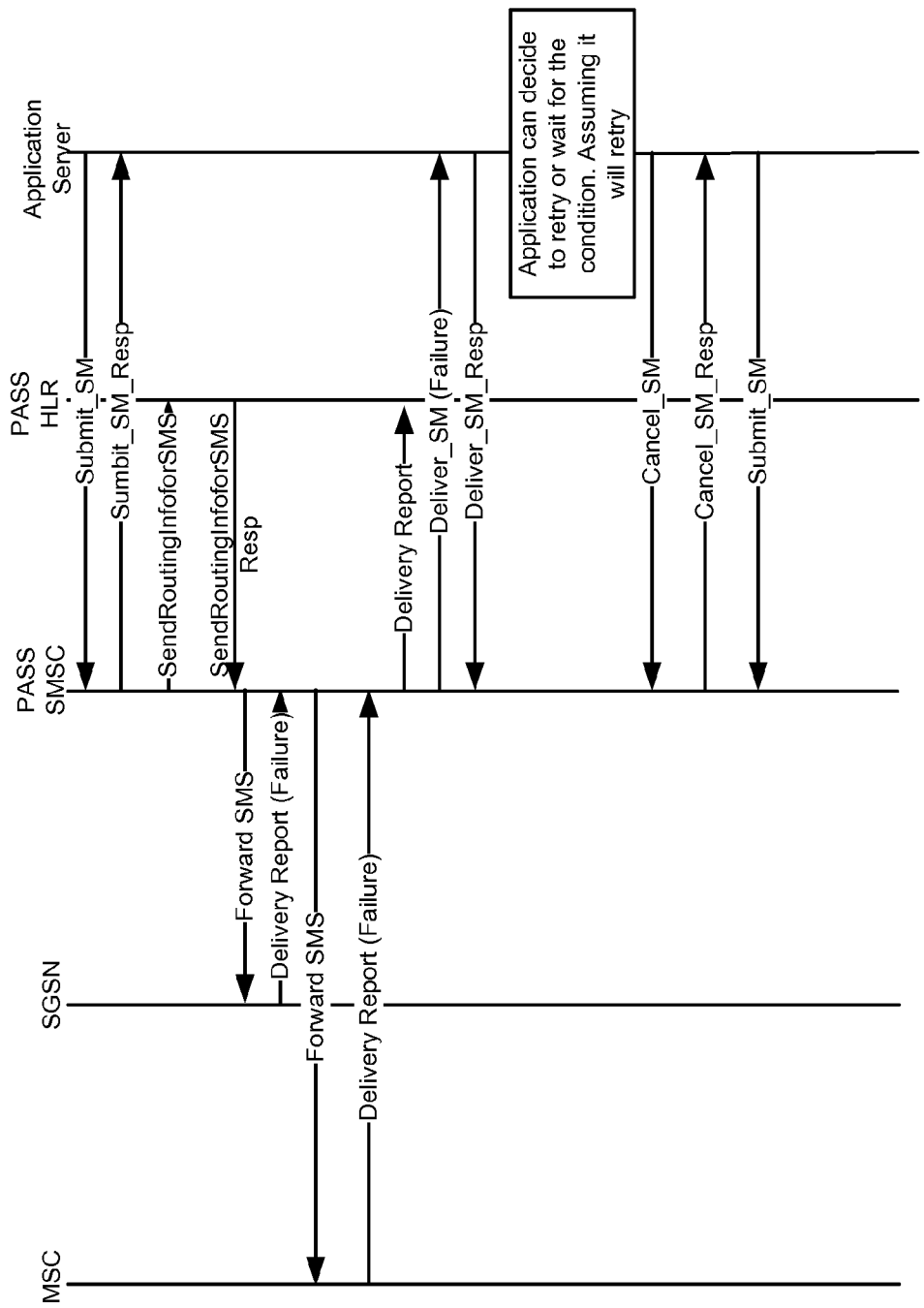
FIG. 23 illustrates Application Server control of resending an SMS.

If the MSC/SGSN fails to deliver a mobile terminated SMS (for example when the PASS is in sleep mode), the HP-SMSC 304 can set a flag in the HLR 302 which indicates the cause of the failure as well as the SMSC address of the originator of the SMS. The HP-SMSC 304 can store the message in its internal storage. When this condition is cleared, the HLR 302 can inform the HP-SMSC 304 that the condition is clear, and the HP-SMSC 304 can try to send the SMS again. Alternatively, the Application Server 901 can also control the resending of the SMS as shown in FIG. 23. This can give the application more control over the SMS messaging. As shown in FIG. 23:
1. The Application Server 901 can receive a failure response to message submission from the HP-SMSC 304.
2. The Application Server 901 can cancel the short message in the HP-SMSC 304 using the SMPP protocol.
3. The Application Server 901 can submit the message again to the HP-SMSC 304 for delivery.

Provided in another aspect are methods for PASS IP connectivity. IP connectivity with the PASS system can offers advantage in cases of bursty traffic between the PASS ECU 202 and the TOC 201. Diagnostic reports are a good example. A diagnostic report can be large (for example, 10 KB) and if performed over SMS, will take a number of messages (160 bytes per message, or about 65 separate SMS messages).

To attach to the GPRS network, the PASS ECU 202 can provide an APN to which it wants to attach. For the PASS system, a new APN can be created. At the GGSN this APN can map to the PASS network and its profile. The profile can have parameters such as the IP addressing support mechanism and the IP address of the RADIUS server 305.

Figure 24:
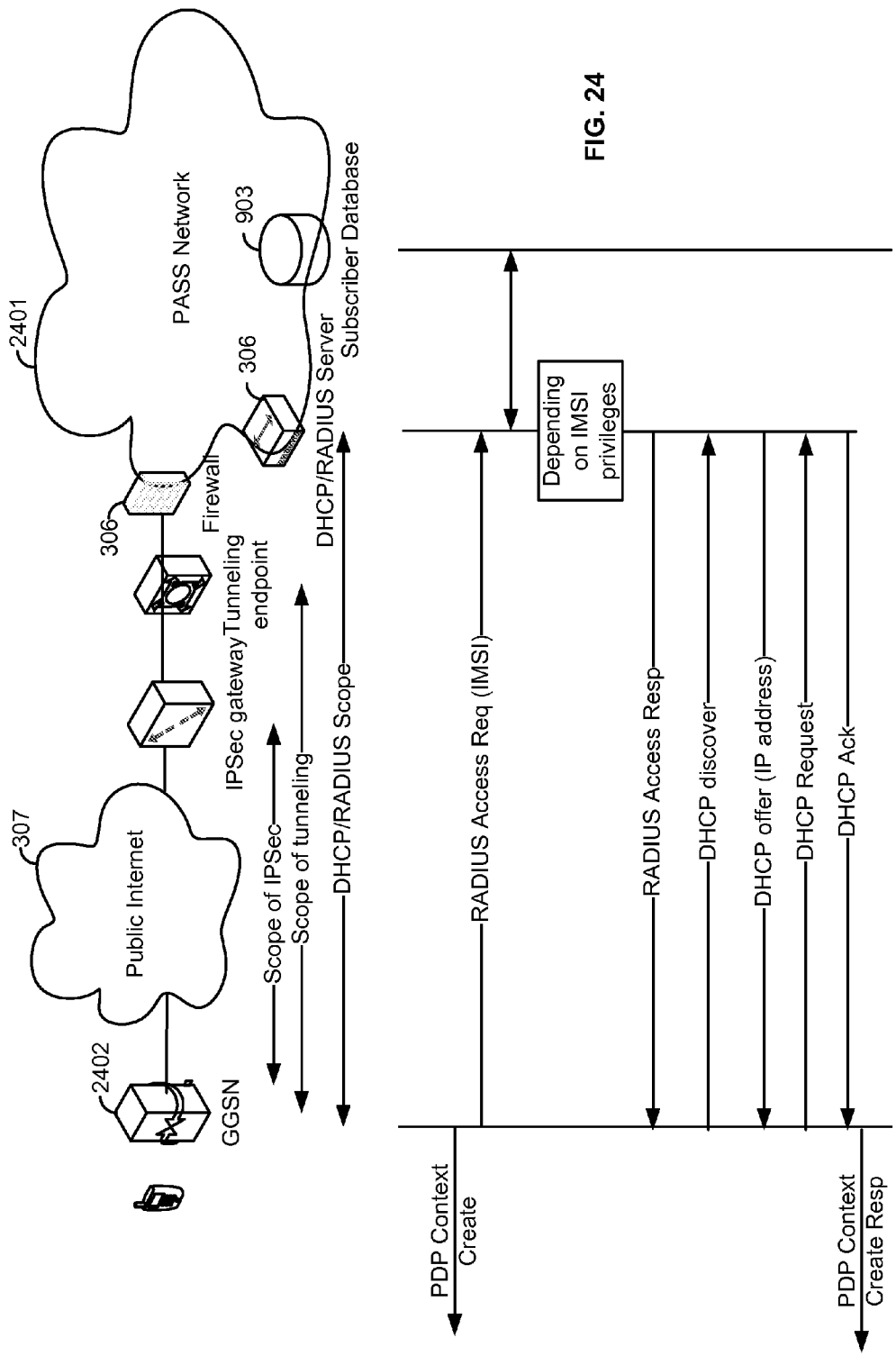
FIG. 24 illustrates exemplary methods for PASS IP connectivity.

FIG. 24 illustrates exemplary interactions within the system and can be described as follows:
1. A PASS ECU 202 can request an IP connection to the PASS network 2401. For this, PDP context activation can be performed.
2. The PDP context activation can specify the APN as well as QoS parameters associated with this connection.
3. A GGSN 2402, on receiving the PDP context creation request, can look up the APN configuration. Since the configuration points to a configured external RADIUS server 305, the GGSN 2402 can initiate a RADIUS Access Request including the IMSI via the PASS DHCP/RADIUS Server 305.
4. The DHCP/RADIUS Server 305 can check IMSI in the Subscriber Database 903 to verify that this indeed is a PASS subscriber 213. This can be performed since any GPRS user can try to attach to the APN with malicious intent and since the GGSN 2402 cannot distinguish between PASS users 213 and non-PASS users, it can send a RADIUS request to the DHCP/RADIUS Server 305, which will be rejected for non-PASS users.
5. For a PASS user 213 the RADIUS server 305 sends a RADIUS access-accept. On receiving this, the GGSN 2402 can start IP address assignment procedure from the configured DHCP server 305 in the PASS network 2401.

6. The DHCP/RADIUS Server 305 can assign an IP address to the PASS ECU 202.

7. The GGSN 2402 can send back a PDP activation-confirm to PASS ECU 202. At this time PASS ECU 202 has an IP address assigned to it and can communicate with PASS network 2401 over IP.

Figure 25:
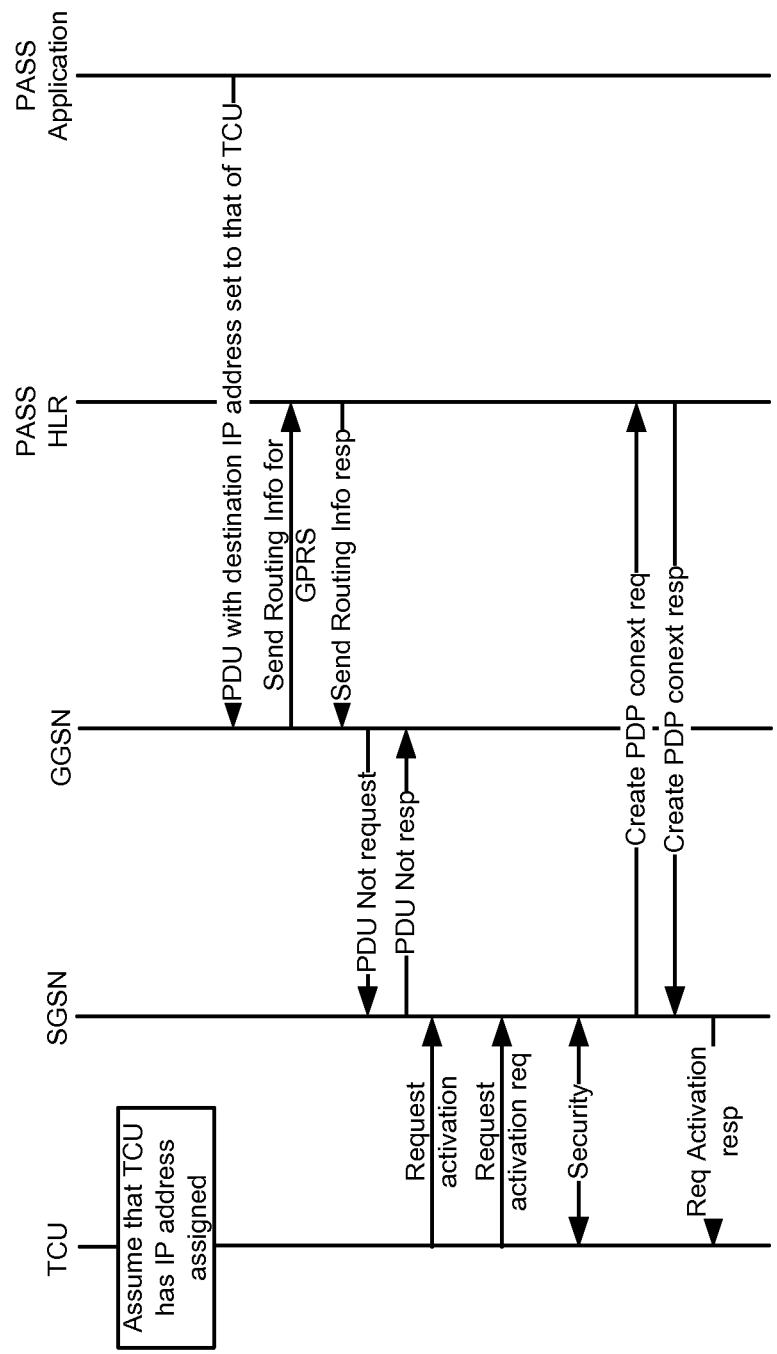
FIG. 25 illustrates a request for activation of a PDP context.

The PASS system can also initiate bursty data towards the PASS ECU 202, such as for software download. If the PASS ECU 202 is already attached to the network and has an IP address assigned, the application can request for activation of a PDP context, as illustrated in FIG. 25 and described below:

1. A PASS application needs to establish a PDP context with the PASS ECU 202.

2. The GGSN 2402 already has a PDP context active for this IP address. The GGSN 2402 can map this to IMSI and queries the HLR 302 to get the current SGSN address.

3. The PASS HLR 302 can send back the routing information with the SGSN address.

4. The GGSN 2402 can send a PDU notification request to the SGSN.

5. The SGSN knows the current cell of the PASS ECU 202 since a PDP context is active. The SGSN can send a downlink PDP context activation request.

6. The PASS ECU 202, on receiving this, can send a PDP context activation request to SGSN. The SGSN can perform security procedures with the PASS ECU 202 to confirm its identity.

7. Once security procedures have been performed, a context activation request can be sent to the GGSN 2402. The GGSN 2402 can respond with a context activation response.

8. The context activation response can be passed back to the PASS ECU 202. This enables the packet flow between the application and the PASS ECU 202.

In case the PASS ECU 202 does not have an IP address assigned to it, the application can send an SMS with an embedded command to the PASS ECU 202 to set up the PDP context. The SMS can contain the IP address and port with which the application is expecting the PASS ECU 202 to establish a flow.

Application data transfer can also be performed over USSD protocol. USSD is a session-oriented bearer defined in GSM. USSD is faster as compared to SMS since SMS is a store and forward mechanism while USSD keeps the radio connection until the dialogue session is underway.

II. PASS ECU

A. Hardware

Figure 26:
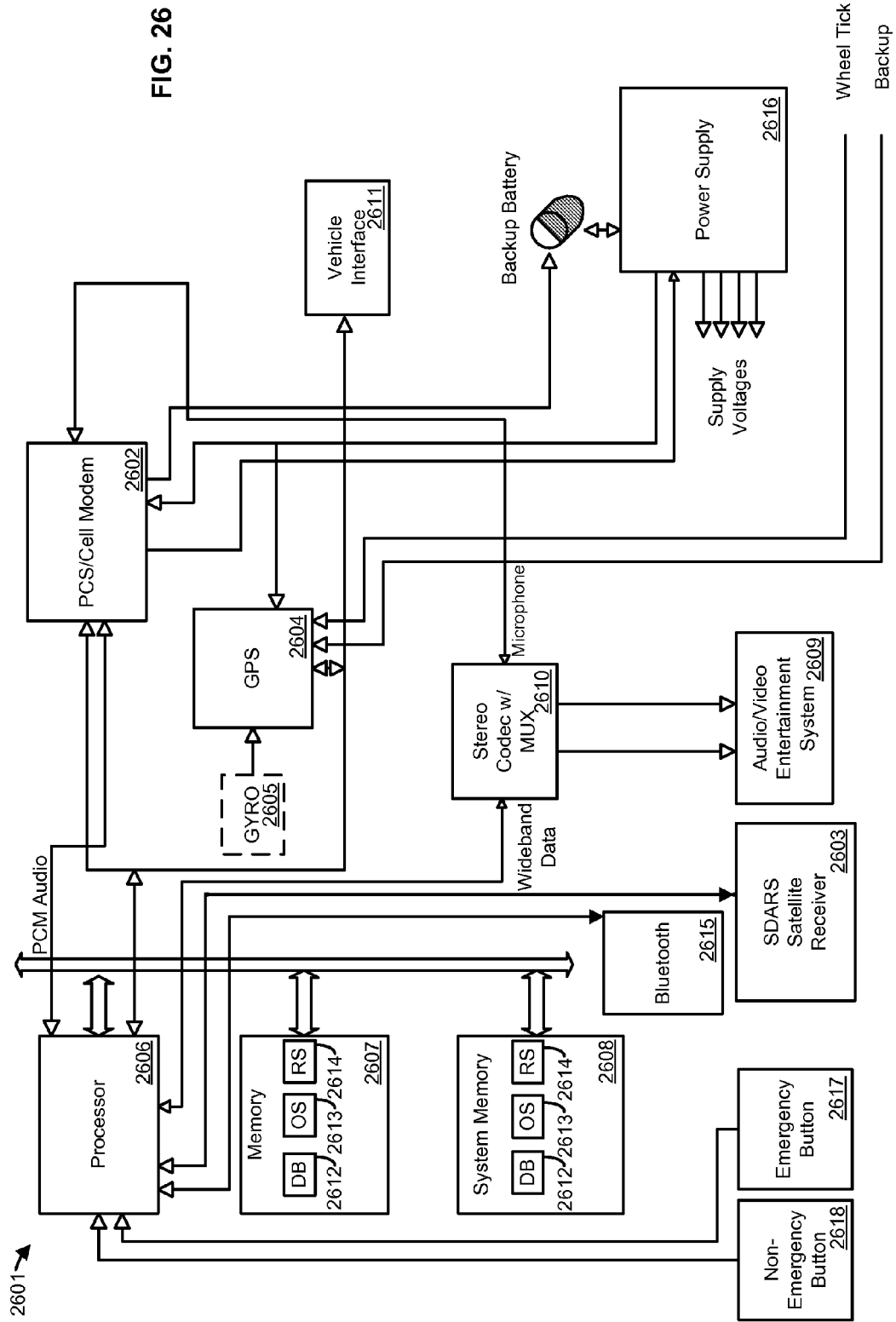
FIG. 26 illustrates an exemplary PASS apparatus.

In one aspect, provided is an apparatus comprising a telematics control unit. The apparatus can be installed in a vehicle. Such vehicles include, but are not limited to, personal and commercial automobiles, motorcycles, transport vehicles, watercraft, aircraft, and the like. For example, an entire fleet of a vehicle manufacturer's vehicles can be equipped with the apparatus. As shown in FIG. 26, the exemplary apparatus 2601, can also be referred to herein as the PASS ECU 202.

All components of the telematics unit can be contained within a single box and controlled with a single core processing subsystem or can be comprised of components distributed throughout a vehicle. Each of the components of the apparatus can be separate subsystems of the vehicle, for example, a communications component such as a SDARS, or other satellite receiver, can be coupled with an entertainment system of the vehicle.

This exemplary apparatus is only an example of an apparatus and is not intended to suggest any limitation as to the scope of use or functionality of operating architecture. Neither should the apparatus be necessarily interpreted as having any dependency or requirement relating to any one or combination of components illustrated in the exemplary apparatus. The apparatus 2601 can comprise one or more communications components. Apparatus 2601 illustrates communications components (modules) PCS/Cell Modem 2602 and SDARS receiver 2603. These components can be referred to as vehicle mounted transceivers when located in a vehicle. PCS/Cell Modem 2602 can operate on any frequency available in the country of operation, including, but not limited to, the 850/1900 MHz cellular and PCS frequency allocations. The type of communications can include, but is not limited to GPRS, EDGE, UMTS, 1xRTT or EV-DO. The PCS/Cell Modem 2602 can be a Wi-Fi or mobile WIMAX implementation that can support operation on both licensed and unlicensed wireless frequencies. The apparatus 2601 can comprise an SDARS receiver 2603 or other satellite receiver. SDARS receiver 2603 can utilize high powered satellites operating at, for example, 2.35 GHz to broadcast digital content to automobiles and some terrestrial receivers, generally demodulated for audio content, but can contain digital data streams.

PCS/Cell Modem 2602 and SDARS receiver 2603 can be used to update an onboard database 2612 contained within the apparatus 2601. Updating can be requested by the apparatus 2601, or updating can occur automatically. For example, database updates can be performed using FM subcarrier, cellular data download, other satellite technologies, Wi-Fi and the like. SDARS data downloads can provide the most flexibility and lowest cost by pulling digital data from an existing receiver that exists for entertainment purposes. An SDARS data stream is not a channelized implementation (like AM or FM radio) but a broadband implementation that provides a single data stream that is separated into useful and applicable components.

GPS receiver 2604 can receive position information from a constellation of satellites operated by the U.S. Department of Defense. Alternately, the GPS receiver 2604 can be a GLONASS receiver operated by the Russian Federation Ministry of Defense, or any other positioning device capable of providing accurate location information (for example, LORAN, inertial navigation, and the like). GPS receiver 2604 can contain additional logic, either software, hardware or both to receive the Wide Area Augmentation System (WAAS) signals, operated by the Federal Aviation Administration, to correct dithering errors and provide the most accurate location possible. Overall accuracy of the positioning equipment subsystem containing WAAS is generally in the two meter range. Optionally, the apparatus 2601 can comprise a MEMS gyro 2605 for measuring angular rates and wheel tick inputs for determining the exact position based on dead-reckoning techniques. This functionality is useful for determining accurate locations in metropolitan urban canyons, heavily tree-lined streets and tunnels.

One or more processors 2606 can control the various components of the apparatus 2601. Processor 2606 can be coupled to removable/non-removable, volatile/non-volatile computer storage media. By way of example, FIG. 26 illustrates memory 2607, coupled to the processor 2606, which can provide non-volatile storage of computer code, computer readable instructions, data structures, program modules, and other data for the computer 2601. For example and not meant to be limiting, memory 2607 can be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

The processing of the disclosed systems and methods can be performed by software components. The disclosed system and method can be described in the general context of computer-executable instructions, such as program modules, being executed by one or more computers or other devices. Generally, program modules comprise computer code, routines, programs, objects, components, data structures, etc. that perform particular tasks or implement particular abstract data types. The disclosed method can also be practiced in grid-based and distributed computing environments where tasks are performed by remote processing devices that are linked through a communications network. In a distributed computing environment, program modules can be located in both local and remote computer storage media including memory storage devices.

The methods and systems can employ Artificial Intelligence techniques such as machine learning and iterative learning. Examples of such techniques include, but are not limited to, expert systems, case based reasoning, Bayesian networks, behavior based AI, neural networks, fuzzy systems, evolutionary computation (e.g. genetic algorithms), swarm intelligence (e.g. ant algorithms), and hybrid intelligent systems (e.g. Expert inference rules generated through a neural network or production rules from statistical learning).

Any number of program modules can be stored on the memory 2607, including by way of example, an operating system 2613 and reporting software 2614. Each of the operating system 2613 and reporting software 2614 (or some combination thereof) can comprise elements of the programming and the reporting software 2614. Data can also be stored on the memory 2607 in database 2612. Database 2612 can be any of one or more databases known in the art. Examples of such databases comprise, DB2®, Microsoft® Access, Microsoft® SQL Server, Oracle®, mySQL, PostgreSQL, and the like. The database 2612 can be centralized or distributed across multiple systems.

By way of example, the operating system 2613 can be a Linux (Unix-like) operating system. One feature of Linux is that it includes a set of "C" programming language functions referred to as, "NDBM". NDBM is an API for maintaining key/content pairs in a database which allows for quick access to relatively static information. NDBM functions use a simple hashing function to allow a programmer to store keys and data in data tables and rapidly retrieve them based upon the assigned key. A major consideration for an NDBM database is that it only stores simple data elements (bytes) and requires unique keys to address each entry in the database. NDBM functions provide a solution that is among the fastest and most scalable for small processors.

It is recognized that such programs and components reside at various times in different storage components of the apparatus 2601, and are executed by the processor 2606 of the apparatus 2601. An implementation of reporting software 2614 can be stored on or transmitted across some form of computer readable media. Computer readable media can be any available media that can be accessed by a computer. By way of example and not meant to be limiting, computer readable media can comprise "computer storage media" and "communications media." "Computer storage media" comprise volatile and non-volatile, removable and non-removable media implemented in any method or technology for storage of information such as computer readable instructions, data structures, program modules, or other data. Exemplary computer storage media comprises, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

FIG. 26 illustrates system memory 2608, coupled to the processor 2606, which can comprise computer readable media in the form of volatile memory, such as random access memory (RAM, SDRAM, and the like), and/or non-volatile memory, such as read only memory (ROM). The system memory 2608 typically contains data and/or program modules such as operating system 2613 and reporting software 2614 that are immediately accessible to and/or are presently operated on by the processor 2606. The operating system 2613 can comprise a specialized task dispatcher, slicing available bandwidth among the necessary tasks at hand, including communications management, position determination and management, entertainment radio management, SDARS data demodulation and assessment, power control, and vehicle communications.

The processor 2606 can control additional components within the apparatus 2601 to allow for ease of integration into vehicle systems. The processor 2606 can control power to the components within the apparatus 2601, for example, shutting off GPS receiver 2604 and SDARS receiver 2603 when the vehicle is inactive, and alternately shutting off the PCS/Cell Modem 2602 to conserve the vehicle battery when the vehicle is stationary for long periods of inactivity. The processor 2606 can also control an audio/video entertainment subsystem 2609 and comprise a stereo codec and multiplexer 2610 for providing entertainment audio and video to the vehicle occupants, for providing wireless communications audio (PCS/Cell phone audio), speech recognition from the driver compartment for manipulating the SDARS receiver 2603 and PCS/Cell Modem 2602 phone dialing, and text to speech and pre-recorded audio for vehicle status annunciation.

The apparatus 2601 can interface and monitor various vehicle systems and sensors to determine vehicle conditions. Apparatus 2601 can interface with a vehicle through one or more vehicle interfaces 2611. The vehicle interface 2611 can include, but is not limited to, OBD (On Board Diagnostics) port, OBD-II port, CAN (Controller Area Network Low Speed 250 Kbps & High Speed 500 Kbps) port, and the like. ISO-9141, KWP2000 (Key Word Protocol), J1850 PWM (Pulse-Width Modulation), J1850 VPWM (Variable Pulse-Width Modulation), and the like. The vehicle interface 2611, allows the apparatus 2601 to receive data indicative of vehicle performance, such as vehicle trouble codes, operating temperatures, operating pressures, speed, fuel air mixtures, oil quality, oil and coolant temperatures, wiper and light usage, mileage, break pad conditions, and any data obtained from any discrete sensor that contributes to the operation of the vehicle engine and drive-train computer. Additionally CAN interfacing can eliminate individual dedicated inputs to determine brake usage, backup status, and it can allow reading of onboard sensors in certain vehicle stability control modules providing gyro outputs, steering wheel position, accelerometer forces and the like for determining driving characteristics. The apparatus 2601 can interface directly with a vehicle subsystem or a sensor, such as an accelerometer, gyroscope, airbag deployment computer, and the like.

Communication with a vehicle driver can be through an infotainment (radio) head (not shown) or other display device (not shown). More than one display device can be used.

Examples of display devices include, but are not limited to, a monitor, an LCD (Liquid Crystal Display), a projector, and the like.

The apparatus 2601 can receive power from power supply 2616. The power supply can have many unique features necessary for correct operation within the automotive environment. One mode is to supple a small amount of power (typically less than 100 microamps) to at least one master controller that can control all the other power buses inside of the PASS ECU 202. In an exemplary system, a low power low dropout linear regulator supplies this power to PCS/Cellular modem 2602. This provides the static power to maintain internal functions so that it can await external user push-button inputs or await CAN activity via vehicle interface 2611. Upon receipt of an external stimulus via either a manual push button or CAN activity, the processor contained within the PCS/Cellular modem 2602 can control the power supply 2616 to activate other functions within the PASS ECU 202, such as GPS 2604/GYRO 2605, Processor 2606/Memory 2607 and 2608, SDARS receiver 2603, audio/video entertainment system 2609, audio codec mux 2610, and any other peripheral within the PASS ECU 202 that does not require standby power.

In an exemplary system, there can be a plurality of power supply states. One state can be a state of full power and operation, selected when the vehicle is operating. Another state can be a full power relying on battery backup. It can be desirable to turn off the GPS and any other non-communication related subsystem while operating on the back-up batteries. Another state can be when the vehicle has been shut off recently, perhaps within the last 30 days, and the system maintains communications with a two-way wireless network for various auxiliary services like remote door unlocking and location determination messages. After the recent shut down period, it is desirable to conserve the vehicle battery by turning off almost all power except the absolute minimum in order to maintain system time of day clocks and other functions, waiting to be awakened on CAN activity. Additional power states are contemplated, such as a low power wakeup to check for network messages, but these are nonessential features to the operation of the PASS ECU 202.

Normal operation can comprise, for example, the PCS/Cellular modem 2602 waiting for an emergency pushbutton key-press or CAN activity. Once either is detected, the PCS/Cellular modem 2602 can awaken and enable the power supply 2616 as required. Shutdown can be similar wherein a first level shutdown turns off everything except the PCS/Cellular modem 2602, for example. The PCS/Cellular modem 2602 can maintain wireless network contact during this state of operation. The PASS ECU 202 can operate normally in the state when the vehicle is turned off. If the vehicle is off for an extended period of time, perhaps over a vacation etc., the PCS/Cellular modem 2602 can be dropped to a very low power state where it no longer maintains contact with the wireless network.

Additionally, in FIG. 26, subsystems can include a BlueTooth transceiver 2615 can be provided to interface with occupant supplied devices such as phones, headsets, and music players. Emergency button 2617 can be coupled to the processor 2606. The emergency button 2617 can be located in a vehicle cockpit and activated an occupant of the vehicle. Activation of the emergency button 2617 can cause processor 2606 to initiate a voice and data connection from the vehicle to a remote call center. Data such as GPS location and occupant personal information can be transmitted to the call center. The voice connection permits two way voice communication between a vehicle occupant and a call center operator.

The call center operator can have local emergency responders dispatched to the vehicle based on the data received. In another embodiment, the connections are made from the vehicle to an emergency responder center.

One or more non-emergency buttons 2618 can be coupled to the processor 2606. One or more non-emergency buttons 2618 can be located in a vehicle cockpit and activated an occupant of the vehicle. Activation of the one or more non-emergency buttons 2618 can cause processor 2606 to initiate a voice and data connection from the vehicle to a remote call center. Data such as GPS location and occupant personal information can be transmitted to the call center. The voice connection permits two way voice communication between a vehicle occupant and a call center operator. The call center operator can provide location based services to the vehicle occupant based on the data received and the vehicle occupant's desires. For example, a button can provide a vehicle occupant with a link to roadside assistance services such as towing, spare tire changing, refueling, and the like. In another embodiment, a button can provide a vehicle occupant with concierge-type services, such as local restaurants, their locations, and contact information; local service providers their locations, and contact information; travel related information such as flight and train schedules; and the like.

For any voice communication made through the PASS ECU 202, text-to-speech algorithms can be used so as to convey predetermined messages in addition to or in place of a vehicle occupant speaking. This allows for communication when the vehicle occupant is unable or unwilling to communicate vocally.

PASS ECU 202 can communicate with one or more computers, either through direct wireless communication and/or through a network such as the Internet. One skilled in the art will appreciate that what follows is a functional description of an exemplary operating environment and that functions can be performed manually, by software, by hardware, or by any combination of manual, software, and hardware.

Figure 27:
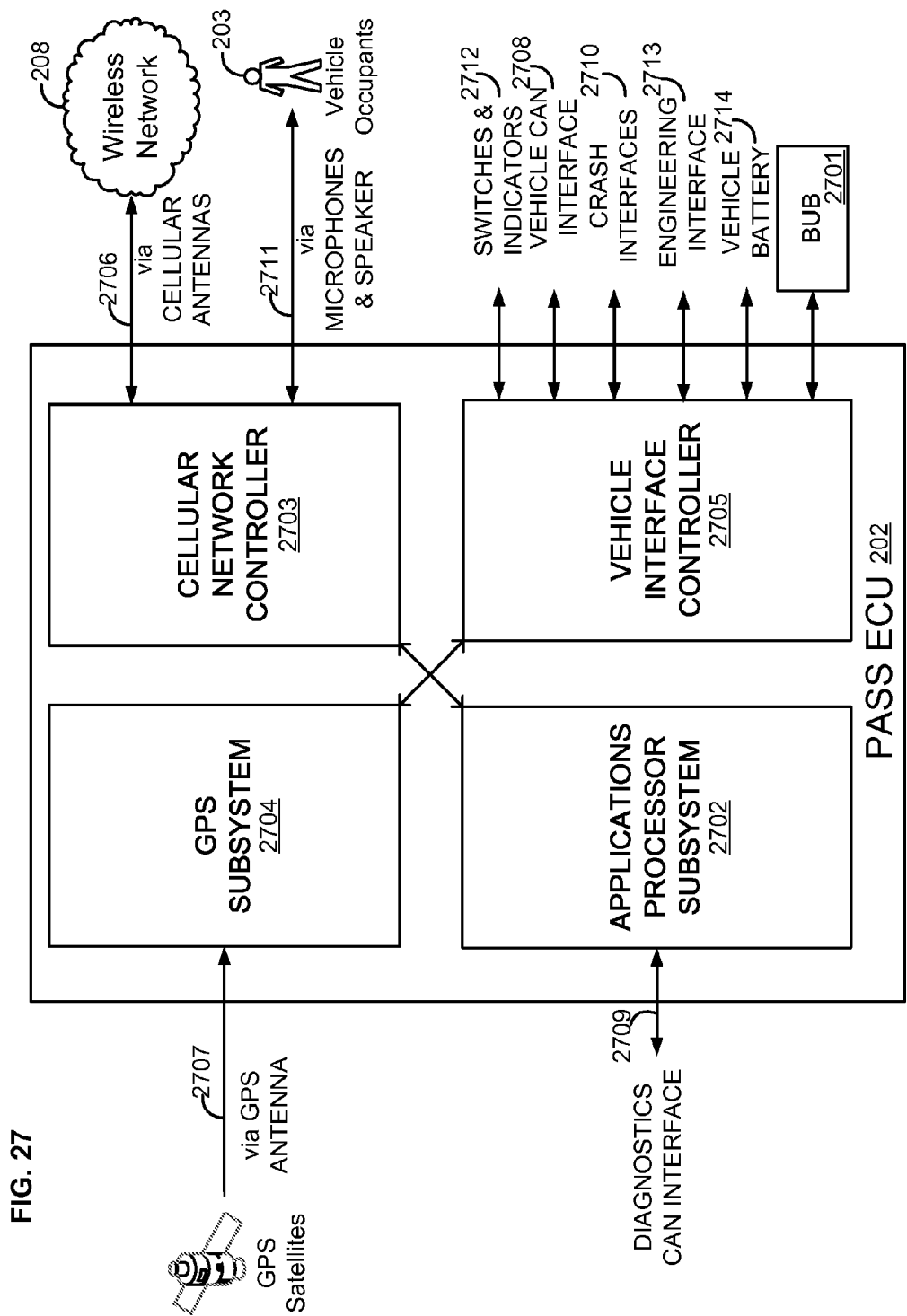
FIG. 27 illustrates an exemplary functional partitioning and interfaces of a PASS Electronic Control Unit (ECU)

In another aspect, the PASS ECU 202 and optional Back-Up Battery (BUB) unit can comprise in-vehicle components of the PASS system. FIG. 27 illustrates an exemplary functional partitioning and interfaces of the PASS ECU 202 and BUB 2701.

The PASS ECU 202 can be comprised of one or more of the following functional partitions. An Applications Processor (AP) Subsystem 2702, can be comprised of a processor, such as a Reduced Instruction Set Code (RISC) processor, a memory subsystem, a diagnostics CAN interface 2709, power management, and clocking circuits. The AP Subsystem 2702 can provide monitoring and control interfaces to control subsystems. Interrupt and handshaking signals can be provided to control the reset and run operation of the AP Subsystem 2702. A Cellular Network Controller (CNC) 2703, can be comprised of the elements necessary to provide access to a cellular network. The CNC 2703 can support one or more of the following exemplary functions: GSM/GPRS R99, 850/1900 Mhz operation, Echo Cancellation and Suppression, Microphone Inputs, Loudspeaker Output, and Cellular Antenna Selection, and the like. A GPS Subsystem 2704, can be comprised of the elements necessary to provide a high sensitivity GPS receiver, as well as dead reckoning logic, for PASS ECU 202 location based services. A Vehicle Interface Controller (VIC) 2705, can be comprised of the elements necessary to provide control and monitoring of one or more of the following exemplary vehicle interface functions: Switches/Indicators and Control 2712, Vehicle CAN Interface 2708, crash interfaces 2710, vehicle battery 2714, Power Mode Management, and Engineering and Instrumentation Interface 2713.

The PASS ECU 202 can comprise one or more of the following interfaces: Cellular Antenna(s) 2706, GPS Antenna 2707, Vehicle CAN 2708, Diagnostics CAN 2709, Crash Data 2710, Microphone(s) and Loudspeaker 2711, Switches/Indicators and Controls 2712, Engineering and Instrumentation 2713, Vehicle Battery 2714, and Back-Up Battery 2701.

The PASS Back-Up Battery 2701 can be an optional component of the system that interfaces directly to the PASS ECU 202 and provides power for selected emergency services in the event of a loss of primary vehicle battery.

Figure 28:
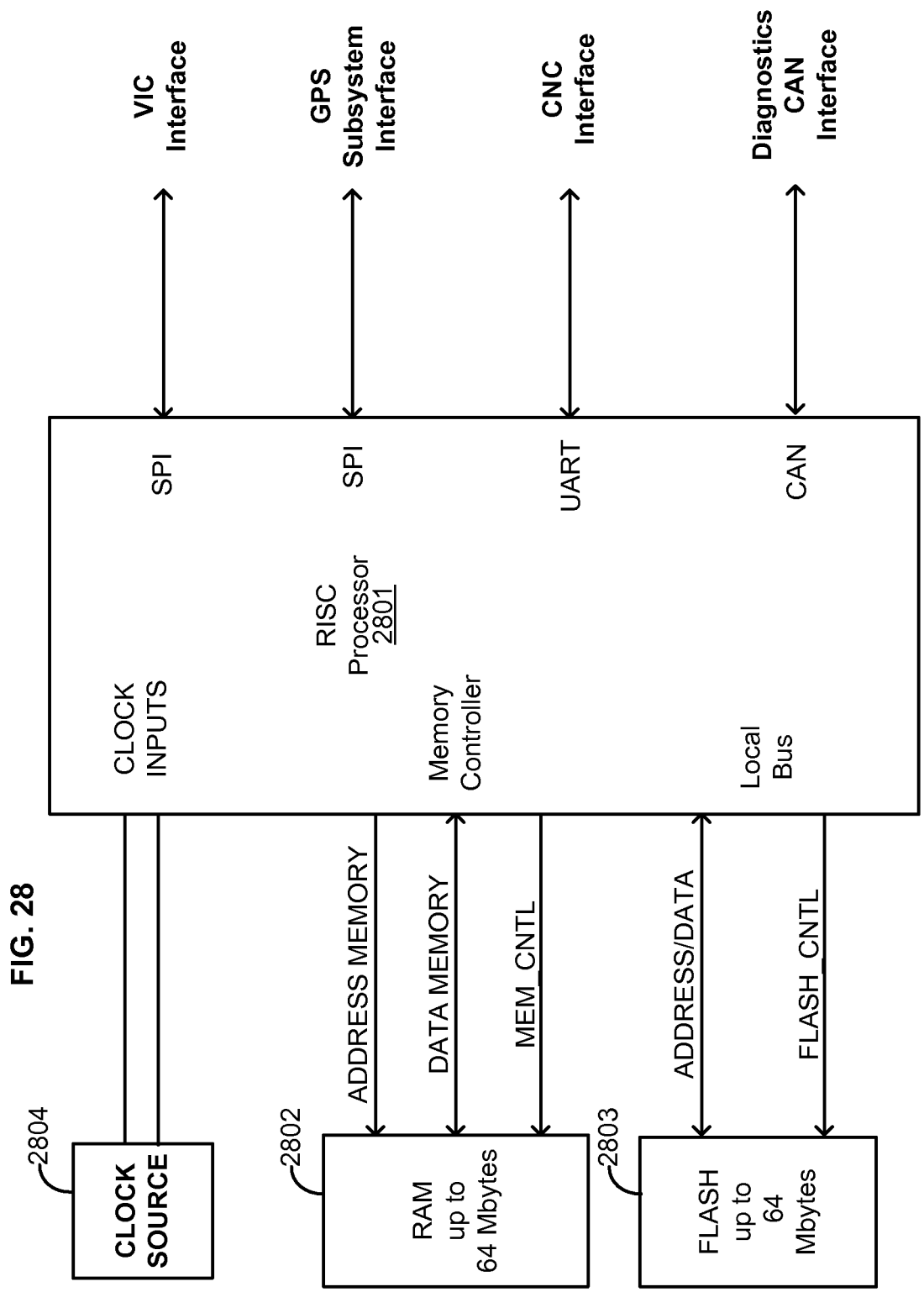
FIG. 28 is a block level description of exemplary Application Processor functional elements.

Illustrated in FIG. 28 is a block level description of exemplary AP Subsystem 2702 functional elements. FIG. 28 shows the relationships and interconnection of these elements.

The AP Subsystem 2702 can integrate a high performance processor and system peripheral functions. Exemplary functional elements and interfaces include, but are not limited to: a processor 2801, RAM 2802, flash memory 2803, GPS Subsystem Interface, Vehicle Interface Controller (VIC) Interface, Cellular Network Controller Interface, Diagnostics CAN Interface, and a Clock Source 2804.

The AP Subsystem 2702 can incorporate a processor that can comprise one or more of the following peripheral control functions RAM Memory Controller, Flash Memory Controller, Serial Peripheral Interfaces (SPI), UART Controller, CAN Controller, Interrupt Controller, and the like.

The processor 2801 can comprise a memory controller that can support both volatile RAM and nonvolatile Flash external memory devices. The interface can support any amount of memory, for example, 64 Mbytes of RAM and 64 Mbytes of Flash memory.

An industry-standard SPI can provide for control and data exchange between the AP Subsystem 2702 and the Global Positioning System (GPS) Subsystem 2704. An industry-standard SPI can provide for control and data exchange between the AP Subsystem 2702 and the VIC 2705.

The Applications Processor 2702 can comprise an interface for Diagnostics (CAN-D) that can operate, for example, at 500 K Baud. The PASS ECU 202 can utilize the CAN-D bus to perform remote diagnostics using, for example, Keyword Protocol (KWP) and Unified Diagnostics Services (UDS) diagnostic protocols.

A CNC Interface, such as a Universal Asynchronous Receiver/Transmitter (UART) interface, can provide control and data communications between the AP Subsystem 2702 and the CNC 2703. The CNC can be comprised of the elements necessary to provide access to a cellular network with one or more of the following functions: GSM/GPRS; Coding Schemes CS-1 to CS-4; GPRS Multi-slot Classes 1-12, Class B and C; SMS; USSD; Dual-band operation 850 MHz Power Class 4 (33 dBm), 1900 MHz Power Class 1 (30 dBm); 3GPP Release 99 Compliant; Quad Audio Codec (FR/HR/EFR/AMR); Echo Cancellation and Suppression; Noise Suppression; Audio Amplifier for Direct Speaker Connection; Multiple Microphone Inputs; Antenna Selection; and the like.

Figure 29:
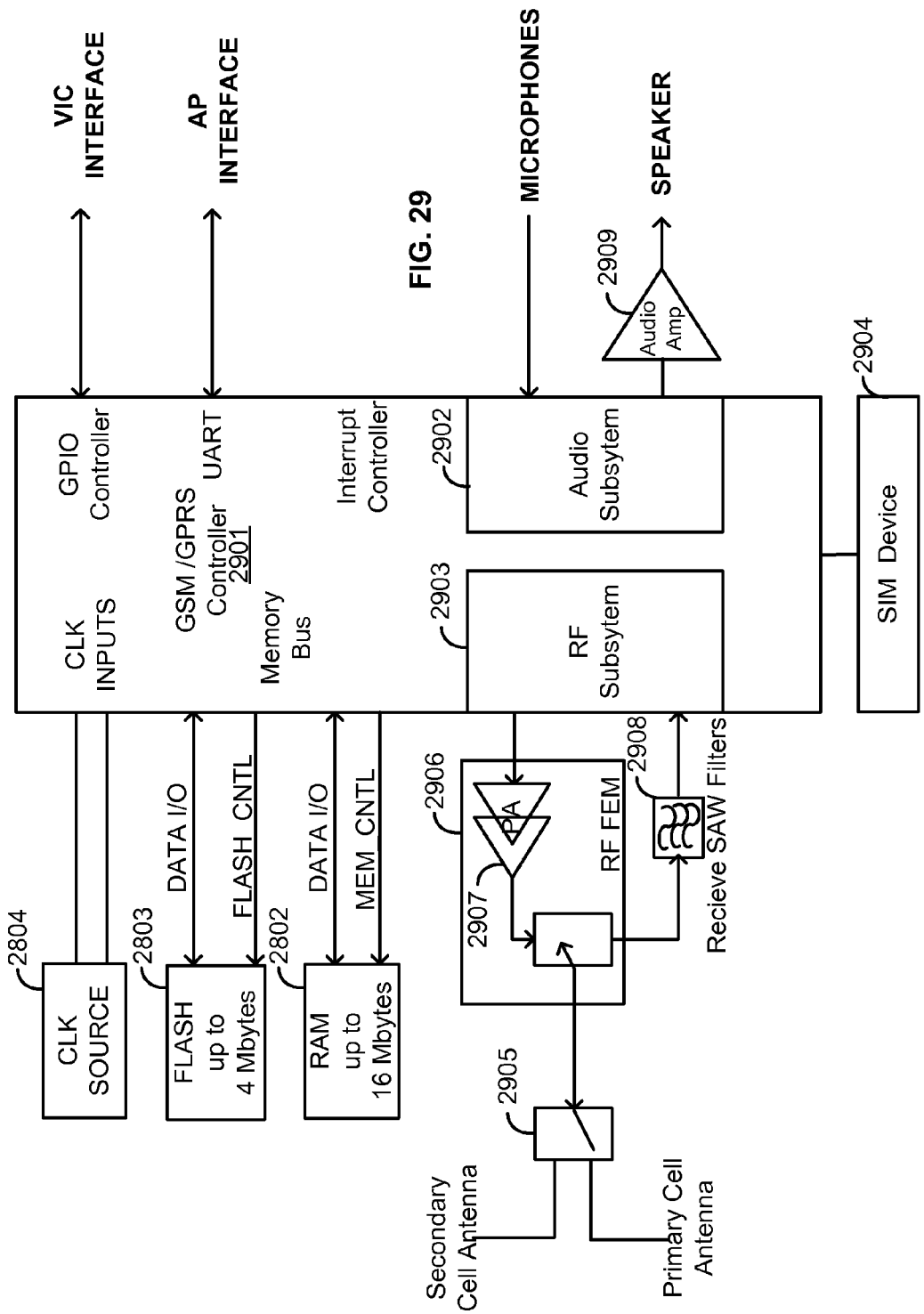
FIG. 29 is a block level description of exemplary Cellular Network Controller functional elements.

Illustrated in FIG. 29 is a block level description of exemplary CNC 2703 functional elements. FIG. 29 shows the relationships and interconnection of these elements.

GSM/GPRS controller 2901 can integrate, for example, a baseband processing subsystem (not shown), an audio subsystem 2902, a power management unit (not shown), and an RF transceiver 2903 in a single chip device in support of a dual-band GSM network interface.

The GSM/GPRS controller 2901 can comprise, for example, a memory controller that supports both volatile RAM 2802 and nonvolatile Flash 2803 external memory devices.

A Subscriber Information Module (SIM) device (or chip) 2904 is an SMD package device that can interface with the GSM/GPRS Controller 2901 through, for example, a dedicated Smart Card Interface Module. The SIM device 2904 can support the security characteristics and memory requirements necessary to support GSM standards.

A UART interface can provide control and data communications between the AP Subsystem 2702 and the CNC 2703.

A signal interface between the CNC 2703 and the VIC 2705 can provide, for example, for control of the power mode of the CNC 2703 and for signaling of message-detected states from the CNC 2703 to the VIC 2705 during Sleep/Polling operation. The signal interface can be dedicated.

A Cellular Interface in the PASS ECU 202 system can comprise one or more antenna inputs and an RF Switch 2905 to select between the antennas. Some vehicles comprise one or more built in antennas. The PASS ECU 202 system can determine which antenna to use and implement the determination with the RF Switch 2905.

In one aspect, the PASS ECU 202 can be connected to at least one antenna at any given point in time. Some vehicles provide an option to interface with an external phone, while some do not provide this option. If there is an external phone system, PASS ECU 202 can share the primary antenna with the phone through RF switch 2905. The PASS ECU 202 can control the switching of the RF switch 2905. The phone can be independent of PASS ECU 202 and can be configured to only be connected via activation of a "phone on" signal. This strategy for antenna switching can be derived based on usage of the best received signal antenna when a service is active, higher priority for Telematics services over phone usage, and information to PASS ECU 202 as to whether the phone is available in the vehicle and is powered. For example, if the phone is powered and if no Telematics services are active, PASS ECU 202 remains connected to the secondary antenna.

The PASS ECU 202 can recognize the antenna configuration installed in a vehicle and perform antenna selection based on the antenna strategy. For example, the PASS ECU 202 can read the vehicle type from the CAN bus and establish the configuration based on the pre-existing parameters for each type of vehicle to determine the antenna configuration for the vehicle.

Figure 30:
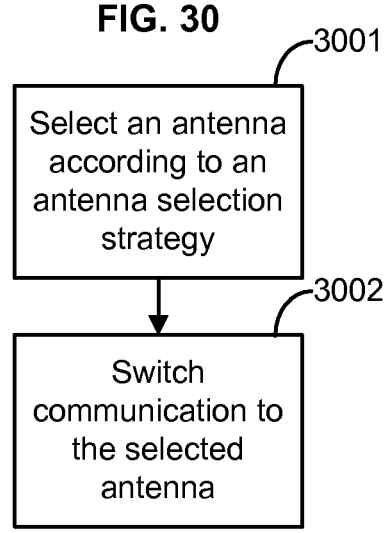
FIG. 30 illustrates an exemplary method for vehicle communications.

In one aspect, illustrated in FIG. 30, provided are methods for vehicle communications comprising selecting an antenna according to an antenna selection strategy at 3001 and switching communication to the selected antenna at 3002. Selecting an antenna according to an antenna selection strategy can comprise selecting one of a plurality of antennas that comprises a best received signal based on signal strength. Selecting an antenna according to an antenna selection strategy can comprise selecting between a primary antenna and a secondary antenna.

The methods can further comprise sharing the primary antenna with an in-vehicle phone. The methods can further comprise disconnecting the in-vehicle phone to utilize the primary antenna to provide an emergency telematics service. The methods can further comprise switching to the secondary antenna if the in-vehicle phone is in use. Switching communication to the selected antenna can comprise an RF switch.

Figure 31:
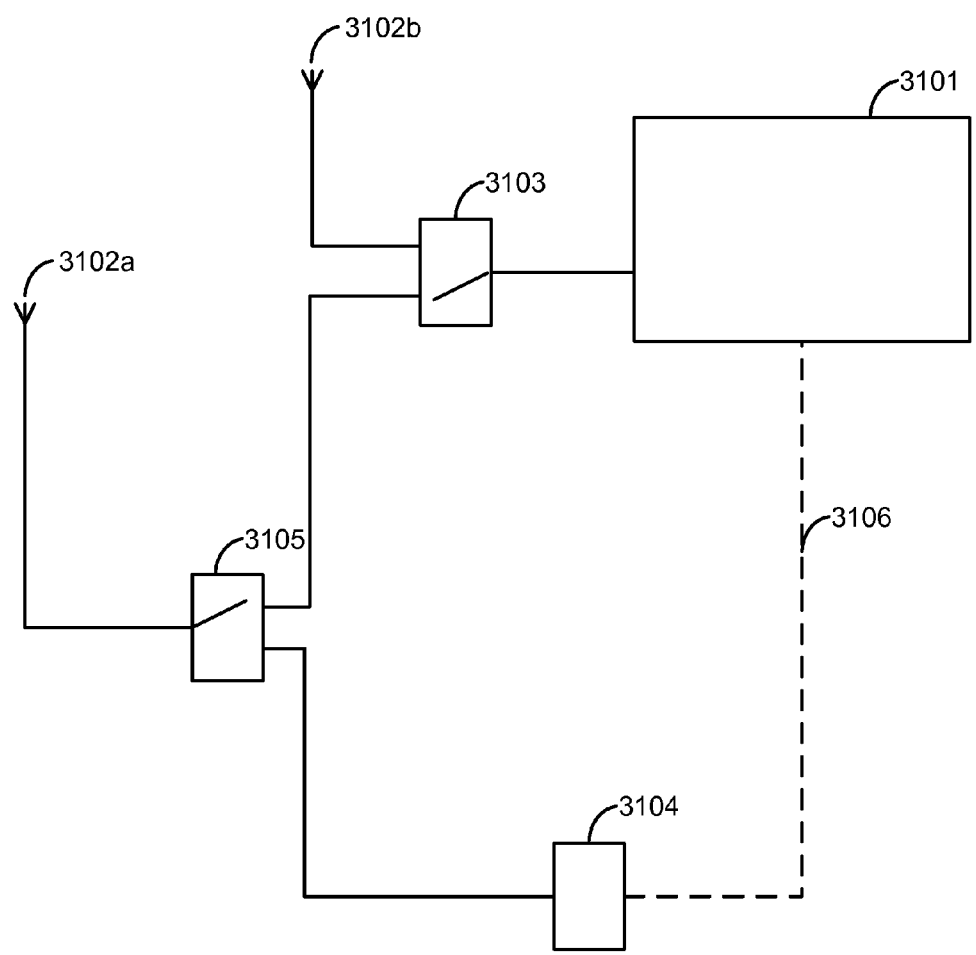
FIG. 31 illustrates an exemplary apparatus for vehicle communications utilizing an antenna selecting unit.

In another aspect, illustrated in FIG. 31, provided is an apparatus for vehicle communications comprising an antenna selecting unit 3101 configured to select an antenna (3102a,b) according to an antenna selection strategy and an antenna switch 3103 coupled to the antenna selecting unit configured to direct communications through the selected antenna 3102a,b. The antenna selecting unit can be configured to select one of a plurality of antennas that comprises a best received signal based on signal strength. The antenna selecting unit can be configured to select between a primary antenna 3102a and a secondary antenna 3102b.

The primary antenna 3102a can be shared with an in-vehicle phone 3104. An antenna switch 3105 can be configured to disconnect the in-vehicle phone 3104 to utilize the primary antenna 3102a to provide an emergency telematics service. The antenna switch 3103 can be configured to utilize the secondary antenna 3102b if the in-vehicle phone 3104 is in use. In-vehicle phone 3104 use can be detected through connection 3106. The antenna switch 3103 and 3105 can comprise an RF switch.

Returning to FIG. 29, the RF Front End Module (FEM) 2906 can be an integrated module that has, for example, a TX/RX Switch (not shown), TX filters (not shown), Power Amplifiers (PAs) 2907 for GSM 850 MHz and 1900 MHz frequencies and Power control circuitry (not shown). TX/RX switch can be a Single Pole Quad Throw Switch (SP4T) switch that incorporates, for example, two receive paths and two transmit paths. Logic circuitry can be responsible for selection of operating mode (TX/RX) of the FEM 2906 and enabling the right PA 2907 for the required band of transmission. A function of the power control circuit can be to control the output power of the PAs 2907 by controlling duty cycles.

External Surface Acoustic Wave (SAW) filters 2908 can be used in the RX path to interface with internal Low Noise Amplifiers (LNAs) (not shown). For example, two discrete SAW filters 2908 can be utilized to cover the GSM 850 MHz and 1900 MHz system.

In one aspect, the PASS ECU 202 can provide one or more microphone inputs. For example, the PASS ECU 202 can provide four microphone inputs. In another aspect, only two of the microphone inputs can be used, depending on the vehicle type. Equal power mix of both microphones can be implemented. Circuitry can also be provided to enable/disable individual microphone.

The PASS ECU 202 can provide an audio amplifier 2909 (such as a 1.5 Watt audio amplifier). The audio amplifier 2909 can drive speakers, such as 4-10 ohm speakers.

In another aspect, the PASS ECU 202 can provide fault detection for the audio output interface. For example, the PASS ECU 202 can check the discrete connection to a single speaker system and generate failure codes if the connection is open. A voltage sensing principle can be utilized for fault detection. EMC protection can be implemented, for example, by using discrete LC filters or Ferrite Bead filters.

Figure 32:
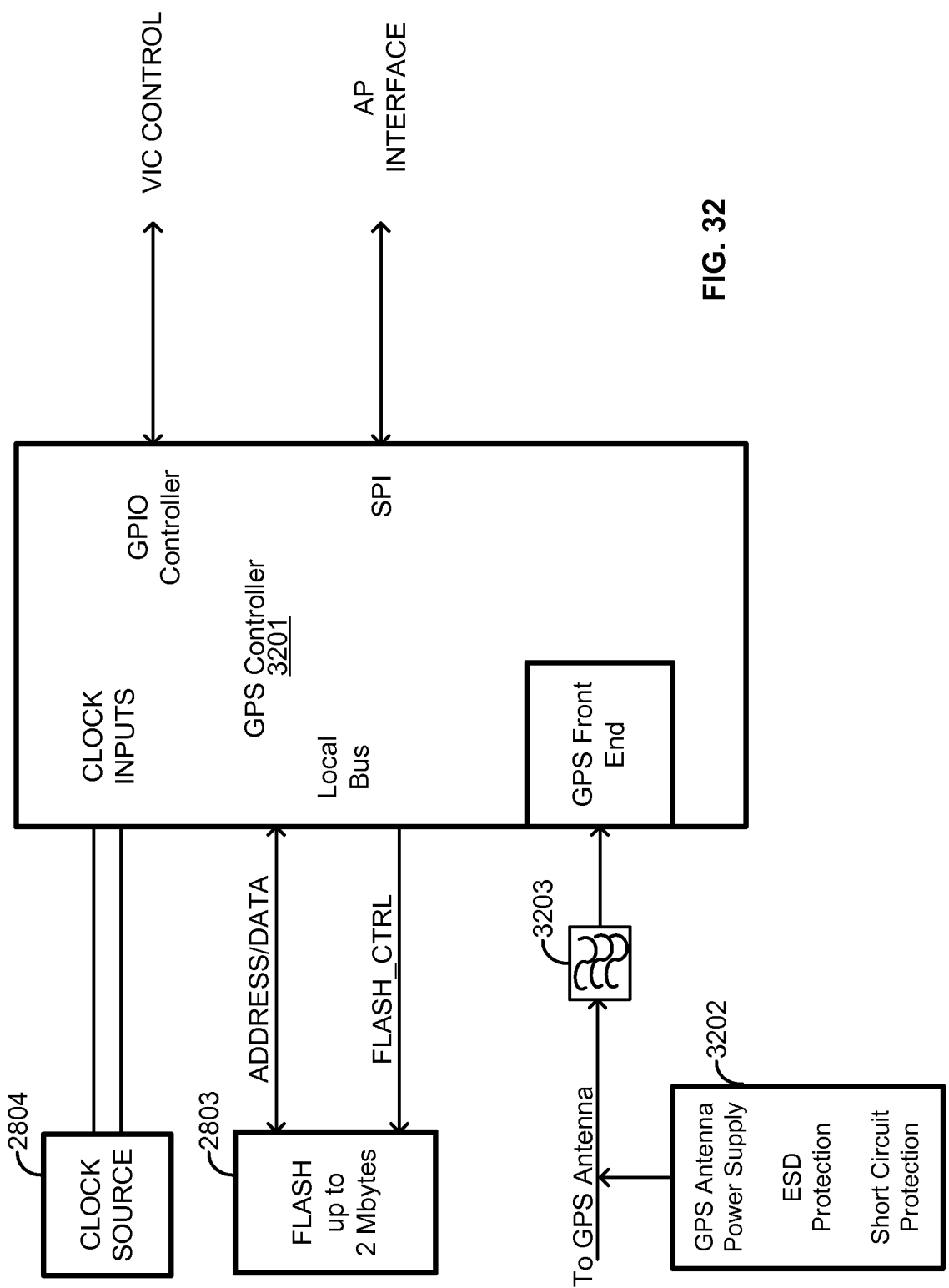
FIG. 32 is a block level description of exemplary GPS Subsystem functional elements.

Illustrated in FIG. 32 is a block level description of exemplary GPS Subsystem 2704 functional elements. FIG. 32 shows the relationships and interconnection of these elements.

The GPS Subsystem 2704 can comprise elements necessary to provide a high-sensitivity GPS receiver for real-time navigation for the PASS ECU 202. For example, the GPS Subsystem 2704 can provide one or more of the following features: high sensitivity receiver; acquisition down to −158 dBm for improved urban canyon operation; rapid time to fix; and Dead Reckoning (DR), differential wheel estimation—closely coupled GPS/DR filter algorithm, support for optional angular rate sensor inputs.

The GPS Subsystem 2704 can comprise a high-sensitivity GPS receiver and an RISC processor (GPS controller 2704) that supports a DR software function. The DR function can be dynamically configured to support differential wheel speed, odometer, and Angular Rate Sensor (ARS) inputs in all combinations. The GPS controller 3201 can comprise a memory controller that supports, for example, nonvolatile Flash memory 2803.

A GPS antenna (not shown) can utilize dc power on signal line to power an internal low noise amplifier (LNA). The PASS ECU 202 can interface to the GPS antenna of the vehicle. Collocation of the GPS and cellular antennas requires that the antennas and the GPS receiver front end together provide the required isolation to prevent de-sense of the GPS receiver during cellular transmissions.

A multiplex circuit 3202 can be implemented to combine the dc power and the GPS signal. The LNA dc power supply can comprise Electrostatic Discharge (ESD) protection diode and attach to the signal line by a RF choke inductor.

Vehicles can be equipped with one or more GPS antennas. The GPS antenna can be used by the PASS ECU 202 to provide vehicle position information and can be directly connected to the PASS ECU 202 or via an external GPS splitter in case the vehicle has an additional navigation system.

A GPS SAW filter 3203 (for example, centered at 1575.42 MHz) can be used for rejecting out-of-band signals, preventing entry into the GPS receiver. The cellular signals can be attenuated by the whole receiver chain, which can comprise the antenna, LNA filter, and the SAW filter 3203 with specially designed matching circuits. An industry standard SPI interface can provide for control and data exchange between the AP Subsystem 2702 and the GPS Subsystem 2704. A signal interface between the GPS Subsystem 2704 and the VIC 2705 can provide for control of the power mode of the GPS Subsystem.

The GPS controller 3201 can be configured with an optional Angular Rate Sensor (ARS) (not shown) to Dead Reckoning (DR) navigation in vehicles without ABS/ESP differential wheel speed data. The ARS can be attached to a VIC ADC. The VIC 2705 can formulate angular rate messages and forward them to the AP 2702, which in turn can forward the messages to the GPS Controller 3201 for processing.

Figure 33:
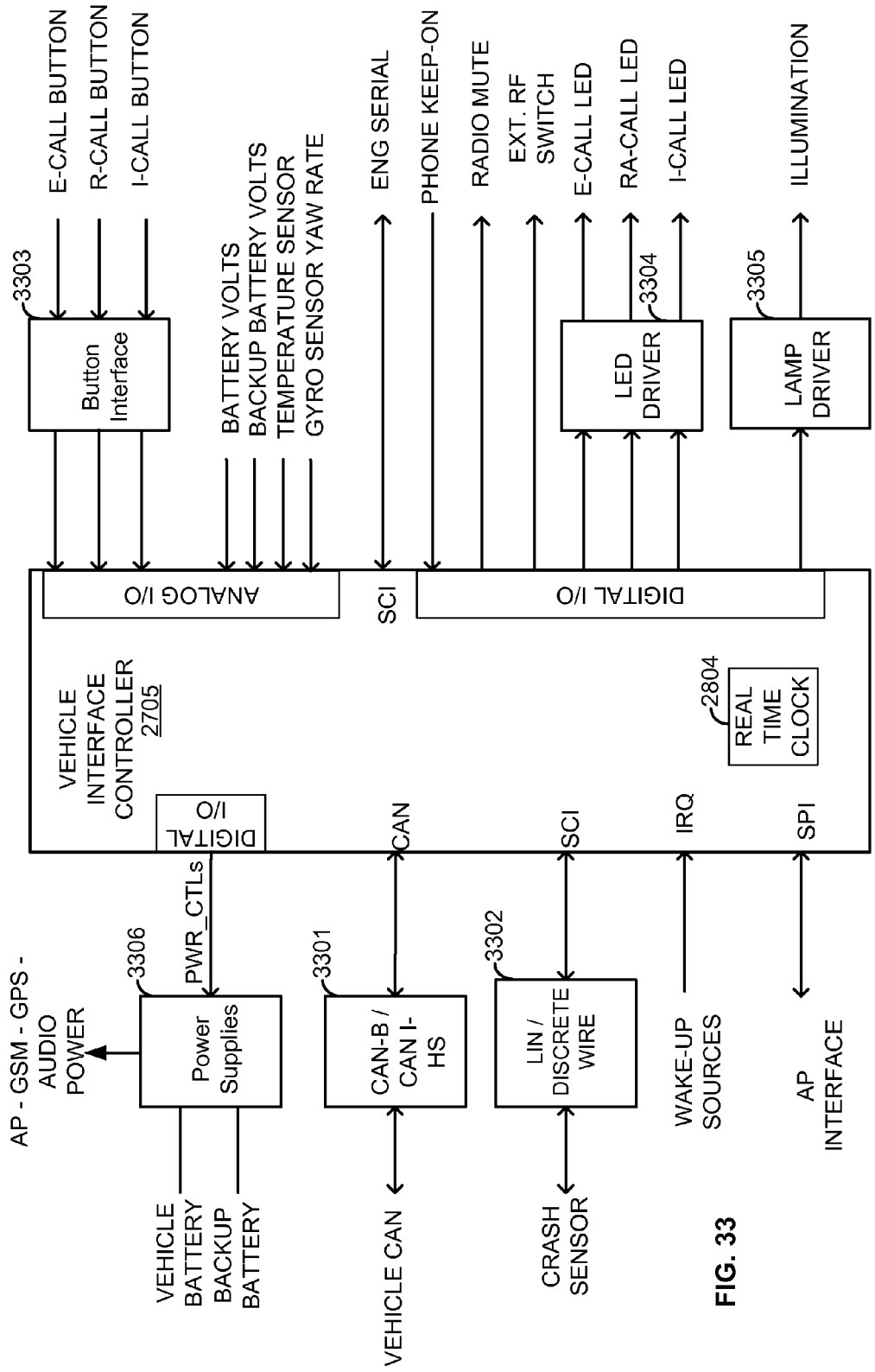
FIG. 33 illustrates an exemplary Vehicle Interface Controller (VIC)

In one aspect, provided is a VIC 2705, illustrated in FIG. 33. The VIC 2705 can comprise a microcontroller that can manage vehicle interfaces such as the vehicle bus interface for CAN-B (or I HS), and LIN. The VIC 2705 can pass vehicle signal data between the AP 2702 of the PASS ECU 202 and other vehicle ECU's using, for example, standard Vector signal drivers as is known in the art. The VIC 2705 can participate in vehicle network management, utilizing the standard Vector Network Management drivers. Network management functions such as loss of communications, bus wake glitch detection, and bus off-handling can also be performed. The VIC 2705 can implement standard diagnostic layers and can provide a subset of the required diagnostic services in addition to providing a diagnostic conduit to the AP 2702. The VIC 2705 can maintain cumulative timers to measure the total time the unit operated in each power mode for use in reliability analysis.

The PASS ECU Vehicle CAN interfaces 3301 can comprise, for example, one or more of a CAN-B (83.3 K Baud), a CAN I HS (125 K Baud), and the like. The interface can operate in non-dominant mode and can include terminations for the interface type. For example, the PASS ECU 202 can use applicable CAN-B (or CAN I HS) bus and CAN-D bus Vehicle Message Matrix (VMM) and/or Kmatrix to determine bus message requirements. The PASS ECU 202 can have common software on all vehicle lines with different VMMs or Kmatrices. The PASS ECU 202 can store unique CAN bus message ID tables for each unique VMM or Kmatrix, and then overwrite the default message ID table within the compiled DBC files.

Figure 34:
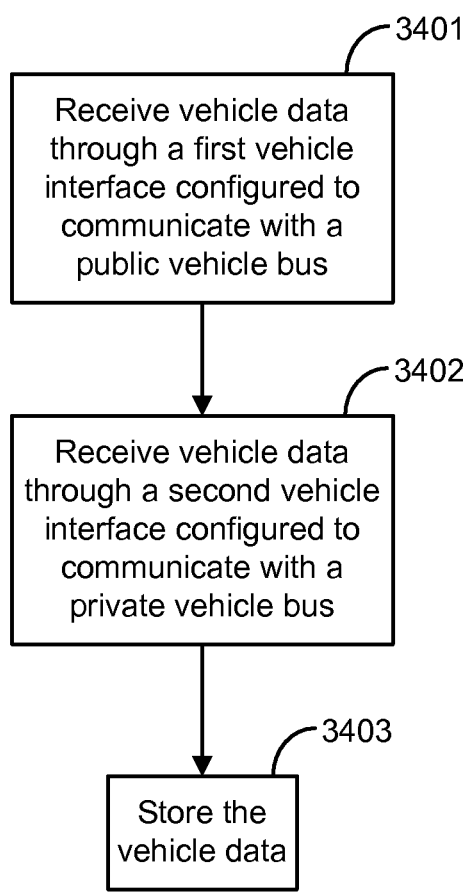
FIG. 34 illustrates an exemplary method for vehicle telematics.

In one aspect, illustrated in FIG. 34, provided are methods for vehicle telematics, comprising receiving vehicle data through a first vehicle interface configured to communicate with a public vehicle bus at 3401 and a second vehicle interface configured to communicate with a private vehicle bus at 3402 and storing the vehicle data at 3403.

Receiving vehicle data through a first vehicle interface configured to communicate with a public vehicle BUS and a second vehicle interface configured to communicate with a private vehicle BUS can comprise receiving data from a CAN-d bus and a CAN-b bus.

The methods can further comprising wirelessly transmitting the vehicle data. The methods can further comprise receiving location data from a GPS receiver. The methods can further comprise storing the location data. The methods can further comprise wirelessly transmitting the vehicle data and the location data. The methods can further comprise selecting, from a plurality of antennas, an antenna out of the plurality of antennas based on available signal strength.

In another aspect, provided is an apparatus for vehicle telematics comprising a first vehicle interface configured to communicate with a public vehicle bus, a second vehicle interface configured to communicate with a private vehicle bus, a processor coupled to the first vehicle interface and the second vehicle interface, and a memory, coupled to the processor, configured for storing data retrieved through the first vehicle interface and the second vehicle interface.

The apparatus can further comprise a wireless transceiver configured to transmit data stored on the memory. The apparatus can further comprise a GPS configured to determine a location of the apparatus. The memory can be configured to store GPS data. The apparatus can further comprise a user-serviceable back up battery.

The apparatus can further comprise an antenna interface to a plurality of antennas and an antenna selection component configured for selecting an antenna out of the plurality of antennas based on available signal strength.

The public vehicle bus can be one or more of a Controller Area Network (Diagnostic CAN-D Low Speed 250 Kbps & High Speed 500 Kbps), ISO-9141, KWP2000 (Key Word Protocol), J1850 PWM (Pulse-Width Modulation), J1850 VPWM (Variable Pulse-Width Modulation), and the like. The private vehicle bus can be one or more of a Body CAN-B, Chassis CAN-C, LIN (Local Interface network), OEM specific proprietary bus, and the like.

In another aspect, provided is an apparatus for vehicle telematics comprising a first vehicle interface configured to communicate with a public vehicle BUS, a second vehicle interface configured to communicate with a private vehicle BUS, a processor coupled to the first vehicle interface and the second vehicle interface, and a memory, coupled to the processor, configured for storing data for transmission through at least one of the first vehicle interface or the second vehicle interface.

In another aspect, provided is an apparatus for vehicle telematics comprising a public vehicle bus, a private vehicle bus, a processor coupled to public vehicle bus and the private vehicle bus, and a memory, coupled to the processor, configured for storing data for transmission through at least one of the public vehicle interface or the private vehicle interface.

In yet another aspect, provided is an apparatus for vehicle telematics comprising a public vehicle bus, a private vehicle bus, a processor coupled to public vehicle bus and the private vehicle bus, and a memory, coupled to the processor, configured for storing data retrieved through at least one of the public vehicle interface or the private vehicle interface.

Returning to FIG. 33, a crash sensor interface 3302 can comprise a discrete line or a LIN communication bus between the VIC microprocessor and a crash sensor. For example, if a discrete wire is used, the crash sensor output can be implemented as a communications interface according to ISO 9041 (diagnosis interface). In the event that the crash sensor uses LIN, crash output data can be communicated to the VIC 2705 via LIN. Crash data can also be communicated to the VIC 2705 via CAN-B or CAN I HS if the sensor is CAN capable.

A switch and indicator interface 3303 can be controlled with the VIC microcontroller and can be accomplished through discrete parts and devices with integrated diagnostic status capabilities. In one aspect, switch interface circuitry for the Emergency Call (ECall), Roadside Assistance Call (RCall), and Information Call (ICall) buttons can be implemented with discrete parts and can comprise button press detection. This interface can wake up the required elements of the PASS ECU 202 when a button is pressed while the PASS ECU 202 is in sleep mode. Another switch interface 3303 on the VIC 2705 can be an external RF switch (not shown), which can use a high-side driver controlled by digital inputs and outputs. Through the use of discrete parts, switch interfaces 3303 of the VIC 2705 can perform hardware diagnostics functions.

By way of example, E-Call, R-Call, and I-Call buttons can interface with the PASS ECU 202 via analog inputs that allow module diagnostics to detect open, shorts and stuck switch. For example, the button signals can be SPST momentary switches wired in parallel with a 1K resistor. One side of this parallel switch resistor circuit can be connected to a vehicle ground, and the other side can be wired to the PASS ECU 202 button inputs. Each switch input can be conditionally pulled up via a 1K resistor to vehicle battery and connected to a VIC 2705 analog input channel through a voltage divider to bring switch input voltage swing within A/D channel range of 0 to 3.3 volts. In one aspect, in order to meet PASS ECU Sleep Mode current levels, 1K pull-ups can be connected through a high side switch to the vehicle battery. This allows the VIC microcontroller to periodically wake-up, connect button input pull-ups to vehicle battery, and scan button A/D channels to determine if a button is pressed. If no buttons are pressed, the pull-up vehicle battery switch is switched off by VIC microcontroller and powers down to its sleep state.

An indicator interface 3304 can use a high-side driver IC with diagnostics status capabilities for LEDs. LED indicators in one or more of the buttons can provide button and function status to operator. The button indicator LEDs can be wired in common cathode configuration to vehicle ground. Button illumination can be accomplished through a Pulse Width Modulator (PWM) output of the VIC 2705 and a high-side driver. The high-side driver can be capable of driving 0.2 A of current and can have built-in hardware diagnostics capabilities for the VIC 2705 to perform required diagnostics on this I/O pin. The diagnostics status capability of the IC can allow the PASS ECU 202 to perform hardware diagnostics functions for these indicators. By way of example, button illumination can be accomplished with a high-side driver 3305. The muting of a Head Unit (HU) can be controlled by the VIC 2705 in the event an emergency phone call is placed. This mute can be accomplished through one of the VIC's digital I/O output pins and is an open-collector drive to Ground (GND). A "Phone On" function of the PASS ECU 202 is an input to the VIC 2705 indicating that an external phone is present and powered. The Phone On interface uses one of the digital I/O input pins on the VIC 2705.

An External RF Switch function of the PASS ECU 202 can be performed by the VIC 2705 through one of its digital I/O output pins that controls the single channel high-side driver. This high-side driver can be capable of driving 0.2 A of current and can have built-in hardware diagnostics capabilities for the VIC 2705 to perform required diagnostics on this I/O pin.

A PASS Engineering and Instrumentation interface 2713 can be provided through one of the UART channels on the VIC 2705. Data from the AP 2702 can be received over SPI and transmitted out on the UART. Data received by the VIC 2705 on the UART can be sent via SPI to the AP 2702. Data flow control can be handled by the AP 2702 and an external tool/program. Standard baud, parity, and bit configuration can be used so that an external terminal program can be used to monitor UART data that the PASS system is writing. For example, the UART interface can require external level shifting for interfacing to a USB, RS-232, Firewire, and the like port of a PC or wirelessly.

In one aspect, the VIC microprocessor can use an analog input channel to interface with an Angular Rate Sensor. Measurements taken from these interfaces can be provided to the AP 2702 via the AP-SPI interface.

The VIC 2705 can interface with various power supply systems through a power supply interface 3306. The VIC 2705 can measure the voltage level of the vehicle battery and control the BUB 2701. During normal mode operation the VIC 2705 can periodically test the BUB 2701 health. Wake-up processing from the vehicle CAN, CNC, and any button press can be performed on the VIC 2705. Periodic wake-ups can be performed by an internal real-time clock 2804 of the VIC microprocessor to control the CNC 2703 for sleep/polling monitoring for incoming SMS messages. The VIC 2705 can also enable and disable one or more of the following power supplies as required by the power mode though its digital I/O channels: GPS power, AP power, Audio power, GSM power, and CAN power.

The BUB 2701 circuit can comprise an interface to an external backup battery, ECU internal boost switching converter, and battery monitor interface from the VIC 2705 that can switch from the main car battery to the BUB 2701 in the event of power loss. The VIC 2705 can enables the BUB 2701 circuit, but the BUB 2701 can be configured to not be utilized until, for example, the vehicle battery voltage drops below a threshold of ~9 V. The battery can hold one or more end-user replaceable batteries that can be replaced on a predetermined schedule. In one aspect, since the batteries are easily accessible, the batteries may not be co-located with the PASS ECU 202.

Figure 35:
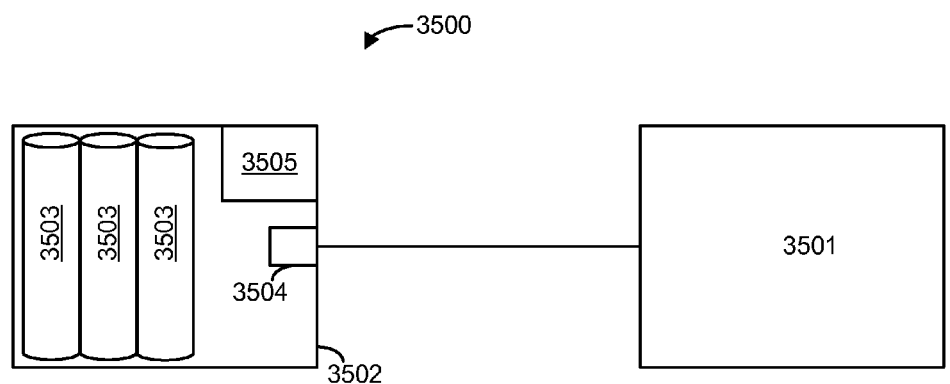
FIG. 35 illustrates an exemplary battery back-up apparatus for a vehicle telematics unit.

In one aspect, illustrated in FIG. 35, provided is a battery back-up apparatus 3500 for a vehicle telematics unit 3501 comprising a battery enclosure 3502 configured to house a user-replaceable battery 3503 wherein the battery enclosure 3502 is located in a user-accessible location and a power interface 3504 configured to couple the battery back-up apparatus 3500 to the vehicle telematics unit 3501 and transmit power to the vehicle telematics unit 3501.

The apparatus can further comprise a battery management circuit 3505 configured to enable zero current draw when the battery back-up apparatus is uncoupled from the vehicle telematics unit. The user-accessible location can comprise the fuse panel, kick plate, glove box, the center console, and the like.

The battery back-up apparatus can be configured to transmit power to the vehicle telematics unit when a main battery is no longer operational. The vehicle telematics unit can be configured to utilize the power upon receipt of a request for an emergency service. The emergency service can comprise an emergency call, an automatic crash notification, roadside assistance request, and the like.

The battery management circuit can be configured to provide a battery status to the vehicle telematics unit. The battery management circuit can be configured to determine the back-up battery status on a predetermined interval. The battery management circuit can be configured to transmit the battery status to the vehicle telematics unit. The vehicle telematics unit can be configured to wirelessly transmit the battery status.

The apparatus can further comprise a battery status indicator configured to provide a notification of the battery status to a user. Notification can comprise a visual notification or an audio notification. Notification can comprise a visual notification and/or an audio notification. For example, a visual notification can comprise one or more of a blinking light, an indicator light, a check engine light, a text message, and the like. For example, an audio notification can comprise a beep, a tone, an automated voice message, and the like.

The user-replaceable battery 3503 can comprise typical off the shelf batters such as AA, AAA, C, D, 9V, and the like. The user-replaceable battery 3503 can comprise any number of batteries, such as from about 1 to about 20 batteries. In one aspect, the user-replaceable battery 3503 comprises four AA batteries.

In another aspect, provided is a battery back-up apparatus for a vehicle telematics unit comprising a battery management circuit configured to enable zero current draw when the battery back-up apparatus is uncoupled from the vehicle telematics unit.

In another aspect, provided is battery back-up apparatus for a vehicle telematics unit comprising a battery enclosure configured to house a battery and a power interface configured to couple the battery back-up apparatus to the vehicle telematics unit and transmit power to the vehicle telematics unit.

Figure 36:
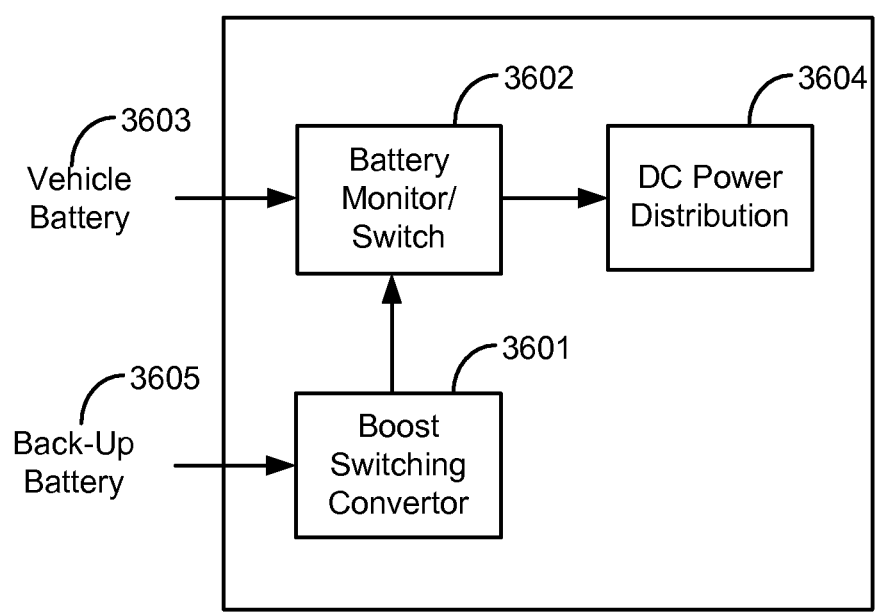
FIG. 36 illustrates an exemplary high level functional block diagram of an exemplary Back-Up Battery unit.

The PASS ECU 202 can monitor the service life of the battery pack and generate alarms at a service event, for example, visual or aural reminders at ignition on, a heads up display message, an automatic maintenance event, and the like. FIG. 36 shows a high level functional block diagram of an exemplary BUB 2701.

A Boost Switching Converter 3601 can take raw, unregulated battery voltage and increases that voltage using classical boost regulator technology to a regulated working voltage at the highest voltage rail for the design. This solves the problems of low and/or sagging battery voltages as the batteries age or are used causing any of electrical circuitry to drop below required operating voltages.

A Battery Monitor/Switch 3602 can have as inputs the BUB 3605 voltage conditioned by the Boost Switching Converter 3601 and the Vehicle Battery 3603. The output can be the voltage & current source for the DC Power Distribution 3604 of the ECU 202. The Battery Monitor/Switch 3602 can monitor the vehicle battery 3603 (preferred power source) and when that drops below a certain voltage (ex. 9 vdc) then the switch can disconnects the vehicle battery 3603 from the output and instead connects the BUB 3605 voltage conditioned by the Boost Switching Converter 3601 to the output, powering the ECU 202 from the BUB 3605.

DC Power Distribution 3604 can provide numerous working voltages to the digital & analog circuitry on the ECU 202 (ex. 3.3 vdc, 5 vdc, etc.) and requires a stable source of input power (voltage & current) to function properly. The Battery Monitor/Switch 3602 can provide this input power by selecting either the first of vehicle battery 3603 or second of BUB 3605 conditioned by the Boost Switching Converter 3601.

Upon loss of the vehicle battery, the BUB 2701 circuit can support extension of Automatic Emergency Calls, Manual Emergency Calls, and Roadside Assistance Calls on a one-time basis. A "Replace Battery" indication can be generated and can persist until the vehicle battery is restored and a positive indication that the BUB has been replaced has been detected. The specifics of the indication can vary depending on the vehicle. For example, a method of BUB replacement indication can be to require extended user pressing of one or more PASS ECU buttons after detection of an open BUB 2701 circuit (battery removed).

The BUB 2701 circuit can resist damage from vehicle and backup battery over-voltage, vehicle and backup battery reversal, short circuits to either battery voltage, short circuits to ground, vehicle battery supply voltage transients, ESD, installation of battery types with cell voltages up to 3.2 V (Lithium), and the like.

Figure 37:
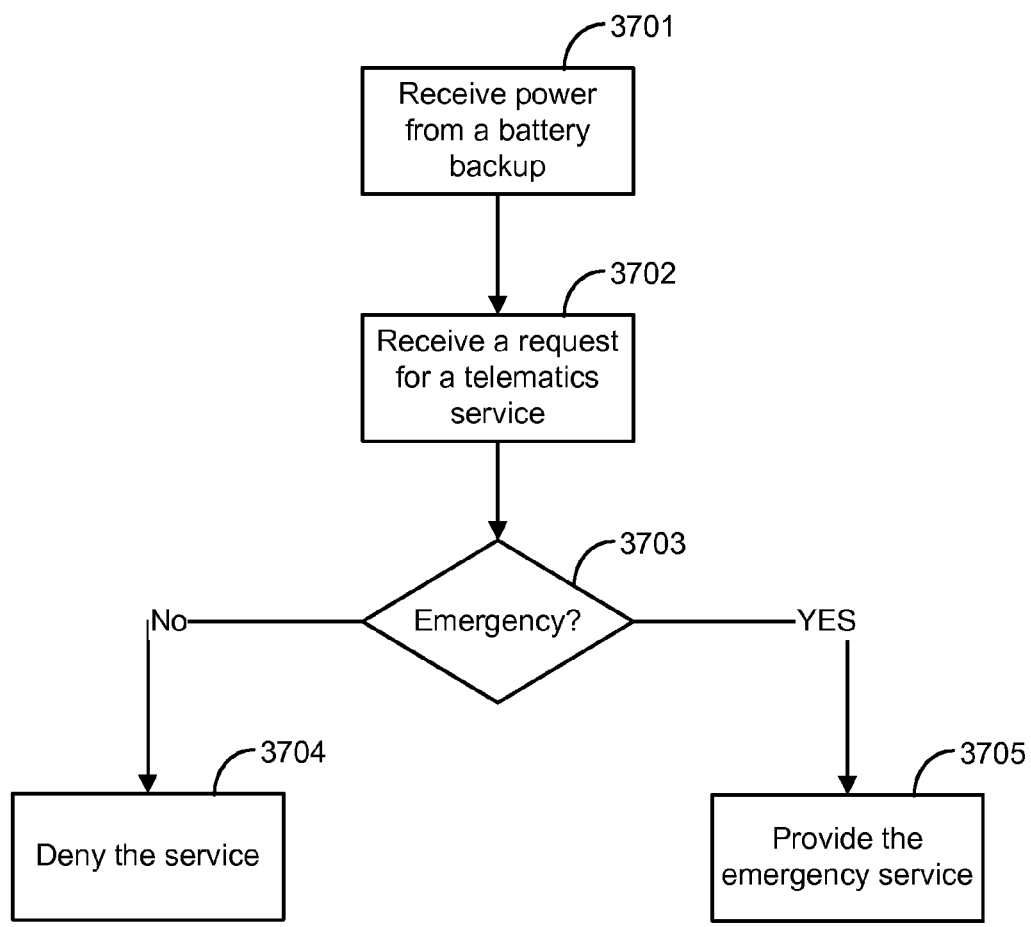
FIG. 37 illustrates an exemplary method for battery back-up operation of a vehicle telematics device.

In one aspect, illustrated in FIG. 37, provided are methods for battery back-up operation of a vehicle telematics device, comprising receiving power from a battery backup at 3701, receiving a request for a telematics service at 3702, and determining if the request is for an emergency service at 3703, wherein if the request is not for an emergency service the request is denied at 3704 and if the request is for an emergency service, providing the emergency service at 3705. Receiving power from a battery backup can comprise receiving power when a main battery is no longer operational.

The methods can further comprise wirelessly transmitting a status of the main battery to a server. The method can further comprise receiving a status of the back-up battery. The method can further comprise wirelessly transmitting the back-up battery status.

The methods can further comprise providing a notification to a user that the vehicle telematics device is using back-up battery power. Notification can comprise a visual notification and/or an audio notification. For example, a visual notification can comprise one or more of a blinking light, an indicator light, a check engine light, a text message, and the like. For example, an audio notification can comprise a beep, a tone, an automated voice message, and the like.

The methods can further comprise determining a status of the battery backup. Determining a status of the battery backup can further comprise determining the status of the battery backup on a predetermined interval.

In one aspect, provided are power management schemes to reduce unnecessary current draw during various power modes. For example, the VIC 2705 can control power modes of various functional blocks and can initiate and/or gracefully shut down each block. Table 1 shows exemplary functional blocks within the PASS ECU 202 that are available in each of the power modes.

Figure 38:
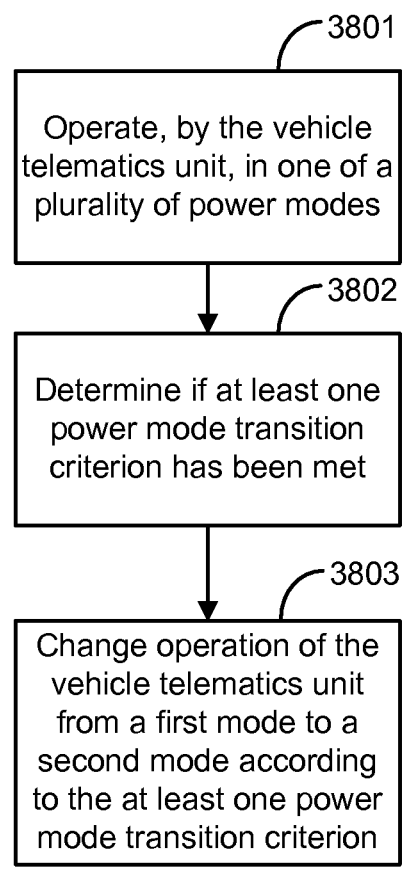
FIG. 38 illustrates an exemplary method for power management in a vehicle telematics unit.

In an aspect, illustrated in FIG. 38, provided are methods for power management in a vehicle telematics unit, comprising operating, by the vehicle telematics unit, in one of a plurality of power modes at 3801, determining if at least one power mode transition criterion has been met at 3802, and changing operation of the vehicle telematics unit from a first mode to a second mode according to the at least one power mode transition criterion at 3803.

Determining if at least one power mode transition criterion has been met can comprise determining if one of, detection of activity on a vehicle bus or receipt of a request for a telematics service is met, and the first mode is sleep mode and the second mode is normal mode.

Determining if at least one power mode transition criterion has been met can comprise determining if a polling timer is met, and the first mode is sleep mode and the second mode is polling mode.

Determining if at least one power mode transition criterion has been met can comprise determining if one of, ignition on, receipt of a request for a telematics service, receipt of data from a wireless network, or activity on a vehicle bus is met, and the first mode is polling mode and the second mode is sleep mode.

Determining if at least one power mode transition criterion has been met can comprise determining if ignition off, no active telematics services, no activity on a vehicle BUS, and a wireless transceiver registered on a wireless network are met, and the first mode is normal mode and the second mode is sleep mode. The methods can further comprise determining if inactive phone input line is met.

Determining if at least one power mode transition criterion has been met can comprise determining if ignition off, no active telematics services, no activity on a vehicle BUS, and a wireless transceiver activated and registered on a wireless network are met, and the first mode is normal mode and the second mode is low power mode. The methods can further comprise determining if inactive phone input line is met.

Determining if at least one power mode transition criterion has been met can comprise determining if one of, ignition on, receipt of a request for a telematics service, receipt of data from a wireless network, or activity on a vehicle bus is met, and the first mode is polling mode and the second mode is normal mode.

Determining if at least one power mode transition criterion has been met can comprise determining if one of, ignition on, receipt of a request for a telematics service, activation of a telematics service, receipt of data from a wireless network, or activity on a vehicle bus is met, and the first mode is low power mode and the second mode is normal mode.

TABLE 1

| Power Mode | Application Processor | GSM/GPRS Controller | GPS Subsystem | Audio Interface | Wake Event Detection (VIC) | CAN Bus | Button fault detection | Button Illumination | Comment |
|---|---|---|---|---|---|---|---|---|---|
| Normal Mode | ✓ | ✓ | ✓ | ✓ | ✓ | ✓ | ✓ | ✓ | |
| Low Power | | ✓ | | | ✓ | | | | PASS ECU is not active but the CNC is still registered in the network |
| Polling | | ✓ | | | ✓ | | | | PASS ECU is woken periodically to poll the Service Provider for incoming data |
| Sleep | | | | | ✓ | | | | PASS ECU is connected to power but not active |
| Back Up Battery Mode | | ✓ | | | ✓ | | | | PASS ECU is disconnected from main vehicle battery and VIC has enabled BUB feature. Note that GPRS is not available, and only 0.5 W output is available from the audio interface |

Determining if at least one power mode transition criterion has been met can comprise determining if ignition off, no active telematics services, no activity on a vehicle BUS, a wireless transceiver activated and registered on a wireless network are met, and the first mode is normal mode and the second mode is low power mode. The methods can further comprise determining if inactive phone input line is met.

Determining if at least one power mode transition criterion has been met can comprise determining if one of, expiration of a timer, detection of loss of a connection to a wireless network, or unauthorized telematics service request is met, and the first mode is low power mode and the second mode is sleep mode.

Determining if at least one power mode transition criterion has been met can comprise determining if loss of a main battery supply is met, and the first mode is normal mode and the second mode is back-up battery mode.

Determining if at least one power mode transition criterion has been met can comprise determining if one of, ignition on, receipt of a request for a telematics service, activation of a telematics service, receipt of data from a wireless network, or activity on a vehicle bus is met, and the first mode is back-up battery mode and the second mode is normal mode.

Figure 39:
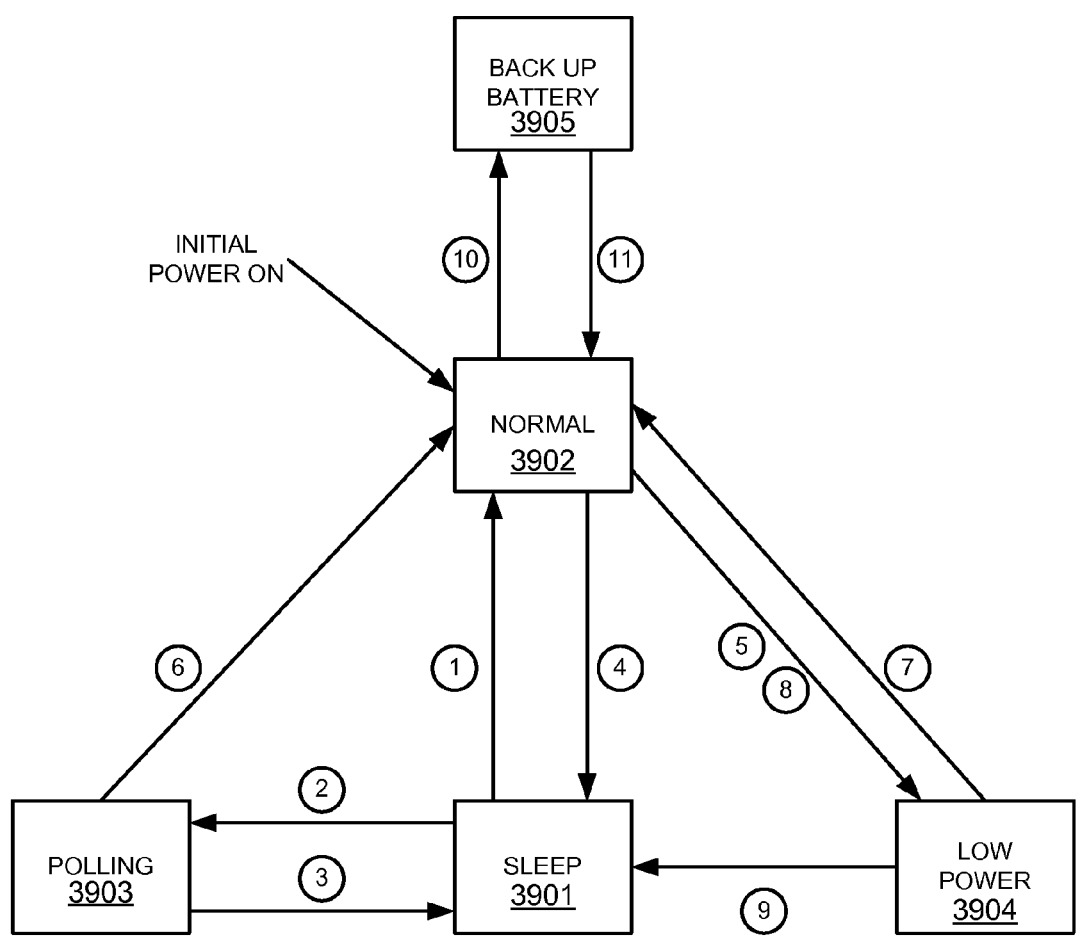
FIG. 39 illustrates an exemplary method power mode state transition diagram.

FIG. 39 shows an exemplary power mode state transition diagram. Table 2 outlines the corresponding power mode transition criteria for each of the power modes. Note that in some aspects for transitions 4 and 5 in Table 2, all the criteria must be simultaneously met for the power mode transition to occur.

TABLE 2

Power Mode Transition Criteria

| Mode Transition Number | Mode Transition FROM | Mode Transition TO | CAN Bus Activity | ECall/ RCall/ ICall Button Push | Polling Timer Expiry | Ignition ON | Phone Activity (MCG only) | Incoming data from CNC |
|---|---|---|---|---|---|---|---|---|
| 1 | Sleep | Normal | Yes | Yes | | Yes | | |
| 2 | Sleep | Polling | | | Yes | | | |
| 3 | Polling | Sleep | No | No | | No | | No |
| 4 | Normal | Sleep | No | | | No | No | |
| 5 | Normal | Low Power | No | | | No | No | |
| 6 | Polling | Normal | Yes | Yes | | Yes | | Yes |
| 7 | Low Power | Normal | Yes | Yes | | Yes | | Yes |
| 8 | Normal | Low Power | | | | No | | |
| 9 | Low Power | Sleep | | | | | | |
| 10 | Normal | Back Up Battery | | | | | | |
| 11 | Back Up Battery | Normal | Yes | Yes | | Yes | | Yes |

| | CNC Network Loss Registered | CNC_ACTIVATED Flag Detected | CNC_ACTIVATED Flag Active | Active PASS Services | Authorized PASS Services | DIGITAL_CNC_ACTIVE Timer Expiry | Main Vehicle Battery Voltage drops below 9 V | Comments |
|---|---|---|---|---|---|---|---|---|
| 1 | | | | | | | | |
| 2 | | | | | | | | |
| 3 | | | | | | | | |
| 4 | Yes | No | | No | | | | All criteria must be met simultaneously |
| 5 | Yes | Yes | | No | | | | All criteria must be met simultaneously |
| 6 | | | | | | | | |
| 7 | | | | Yes | | | | |
| 8 | Yes | | | | | | | |
| 9 | | Yes | | No | Yes | | | |
| 10 | | | | | | | Yes | BUB Mode must be enabled |

TABLE 2-continued

Power Mode Transition Criteria

| 11 | Yes | Only if vehicle battery is restored |

Sleep Mode 3901 is the lowest power mode in which the PASS ECU 202 unit can operate. All major components like the Application Processor 2702, GPS Subsystem 2704, and Cellular Network Controller 2704 can be powered off when entering Sleep Mode 3901. Any volatile memory contents are not preserved in this mode, and critical state information can be stored in nonvolatile memory prior to entering the mode.

Sleep Mode 3901 can exit to Normal Mode 3902 when CAN bus activity is detected or a service request is made via the ECall/RCall/ICall buttons. Sleep Mode 3901 can exit to Polling Mode 3903 when the polling timer in the VIC 2705 expires.

In normal mode 3902, all functional blocks in the PASS ECU 202 module can be powered and operational as shown in Table 2. Normal Mode 3902 can exit to Sleep Mode 3901 when all of the following conditions are true: the ignition is off, no services are active, no CAN bus activity, the CNC is registered on the network, and the "Phone ON" input line (if available) is inactive.

Normal Mode 3902 can exit to Low Power Mode 3904 when all of the following conditions are true: the ignition is off, no services are active, no CAN bus activity, the CNC is activated and registered on the network, and the "Phone ON" input line (if available) is inactive.

Polling Mode 3903 is a transitory mode during which the VIC 2705 temporarily wakes up from Sleep Mode 3901 when a polling timer expires to determine if there are any incoming messages via the CNC 2703. Polling Mode 3903 can exit to Normal Mode 3902 if any of the following criteria are met: the ignition is turned on, any of the ECall/RCall/ICall buttons are pressed, the PASS ECU 202 module received data from the Service Operator 204 via the CNC, or the PASS ECU 202 module detects CAN activity.

Polling Mode 3903 can exit back to Sleep Mode 3901 if none of the above criteria are met after the CNC 2703 registers with the network and determines there are no incoming messages for the PASS ECU 202.

Low Power Mode 3904 is a longer term transitory stage that is entered whenever the ignition transitions from on to off and no services are requested. The CNC 2703 is still registered to the network at this point, and all service activations are possible. Low Power Mode 3904 exits to Normal Mode 3902 if any of the following criteria are met: the ignition is turned on, any of the ECall/RCall/ICall buttons are pressed, the PASS ECU 202 module received data from the network via the CNC 2703, the PASS ECU 202 module detects CAN activity, or activation of a service (either via CAN bus, discrete button push, incoming call or received data).

Low Power Mode 3904 can exit back to Sleep Mode 3901 when a timer expires (for example, default value of 3 days in Low Power Mode 3904), the CNC 2703 detects a loss of the network, or all the services in the PASS ECU 202 are not authorized (in transit from Normal Mode 3902).

BUB Mode 3905 can facilitate an emergency call for a duration of, for example, a minimum of 5 minutes at −20° C. after a 3 year period from the date of install. This can comprise one or more of the following PASS features: Automatic Emergency Call (AEC), Manual Emergency Call, and/or Roadside Assistance.

By way of example, the following PASS features can be configured to not be supported in BUB Mode 3905: Remote Door Unlock, Vehicle Tracking, Remote Door Lock, Remote Diagnostics, Automatic Maintenance, Information Call, and/or POI Download. However, it is specifically contemplated that supported features can be expanded to include not supported features and vice versa as needs dictate.

Exemplary functional elements that are powered in BUB Mode 3905 can be the CNC 2703 for network access, the audio interface 2711 for user interaction, and the VIC 2705 for power management and monitoring.

Note that the following features can be configured to not be available when in BUB Mode 3905: button illumination, button fault detection, CAN bus, GPS, GPRS, and the like.

BUB Mode 3905 can be an exception mode that is activated when the main vehicle battery voltage drops below a predetermined threshold, such as 9 V, and the VIC 2705 has enabled the BUB 2701 feature.

The VIC 2705 can enable the BUB 2701 feature upon, for example, crash notification, ECall button press, RCall button press, and the like. The VIC 2705 can be responsible for gracefully shutting down the respective functional blocks that are not supported in BUB Mode 3905.

Restoration of the vehicle battery, in conjunction with any of the following conditions can cause the PASS ECU 202 to exit BUB Mode 3905 into Normal Mode 3902: the ignition is turned on, any of the ECall/RCall/ICall buttons are pressed, the PASS ECU 202 module received data from the network via the CNC 2703, the PASS ECU 202 module detects CAN activity, or activation of a service (either via CAN bus, discrete button push, incoming call or received data).

Figure 40:
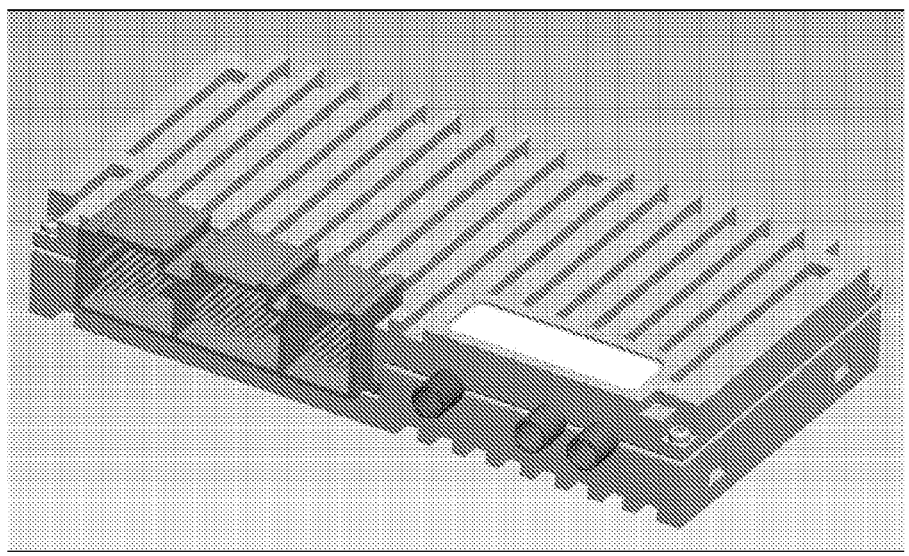
FIG. 40 illustrates an exemplary PASS ECU in an assembled state.

Provided herein are design aspects for the PASS ECU 202. An exemplary PASS ECU 202 is shown in the assembled state in FIG. 40. The PASS ECU 202 can comprise one or more circuit board assemblies contained in a die cast aluminum housing. The aluminum housing acts as both a shelter to the electronics and a thermal heatsink to dissipate chip level heat during operation out to ambient air.

Figure 41:
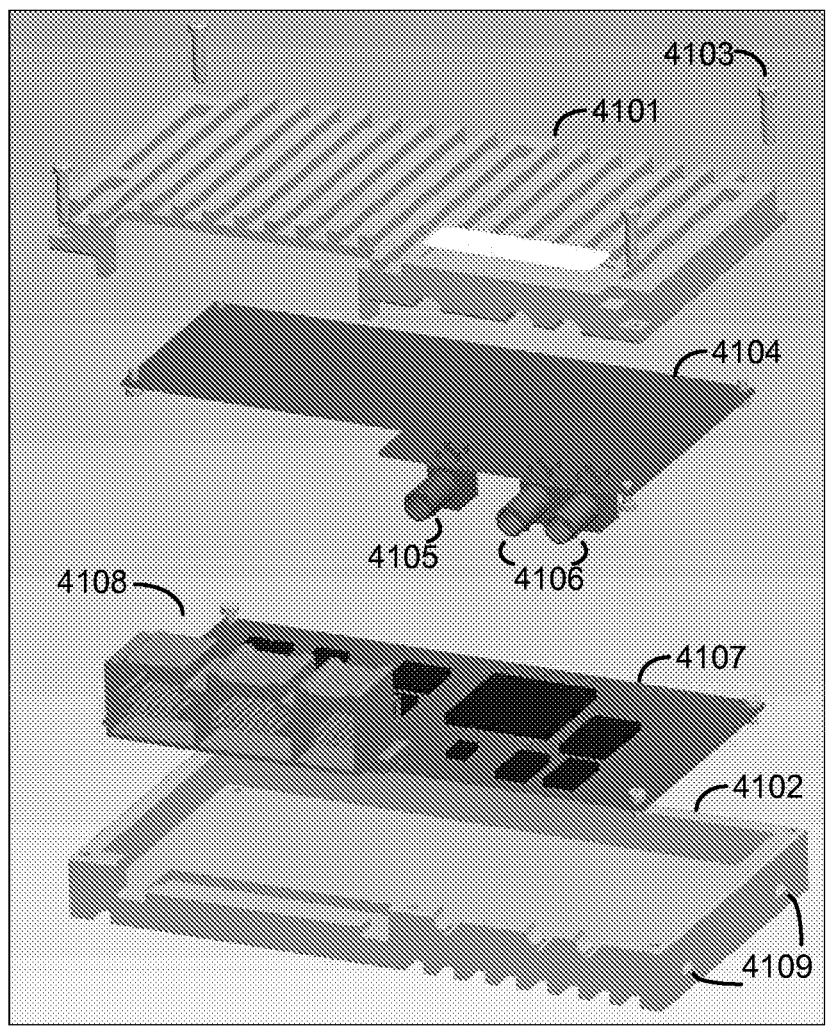
FIG. 41 illustrates exemplary components of a PASS ECU.

FIG. 41 illustrates exemplary components of the PASS ECU 202. The PASS ECU 202 module can comprise a housing. The housing can comprise a top housing 4101 and a bottom housing 4102. The top housing 4101 and the bottom housing 4102 components can be made from any suitable material, such as Aluminum A413 die casting alloy with reduced copper content for improved corrosion resistance. For example, either or both housing components can be finished with a RoHS compliant chromate conversion coating meeting ASTM B 921, for example, Metallast TCP-HF.

The PASS ECU 202 can use thread forming screws 4103 for internal board-to-housing connections and housing-to-housing connections.

PASS ECU 202 connectors can be color coded and keyed for retention of connecting cable harnesses. All PASS ECU 202 connectors exit on the same length side of the PASS ECU 202 using right angle PCB connections. The I/O connectors pass through the bottom surface (gravity down surface) of the PASS ECU 202.

The PASS ECU 202 can comprise an RF board 4104. The RF board 4104 can provide one or more of the following functions: wireless communications transceiver (cellular, PCS, WiFi, satellite, and the like), GPS chipset and receiver, backup antenna selector circuit, and the like. The RF connectors can be, for example, standard Radial 50-ohm FAKRA compliant a single port 4105 and dual port 4106 right angle connectors. For example, the single port can be colored violet (code D) and the dual port can be colored black (code A). The single port 4105 can provide a connection to a back up cellular antenna. The dual port 4106 can provide connection to a primary cellular and GPS antenna.

The PASS ECU 202 can comprise a digital board 4107. The digital board 4107 can provide one or more of the following functions: vehicle bus interface, CPU and memory, user interface, power circuitry, RF board Interface, and the like. By way of example, a digital connector 4108 can be a sealed or unsealed Sumitomo 40-pin 3-cavity right angle header with cable harness connections as known in the art. Connections can include, but are not limited to, vehicle busses (CAN-D, CAN-B. LIN), vehicle power and ground, user interface (microphone, speaker, push-buttons with associated illumination), back-up battery (BUB), and the like.

Indentions 4109 on one or more sides of the PASS ECU 202 housing can allow it to snap in place to a mounting bracket, adequate to provide spring force retention. BSR damping elements can be included on the mounting bracket to isolate the PASS ECU 202 and provide retention force. Thus the PASS ECU 202 can assemble to a vehicle platform in a fastener-less method. Alternatively, clearance holes can be provided for a fastener mounting assembly.

Figure 42:
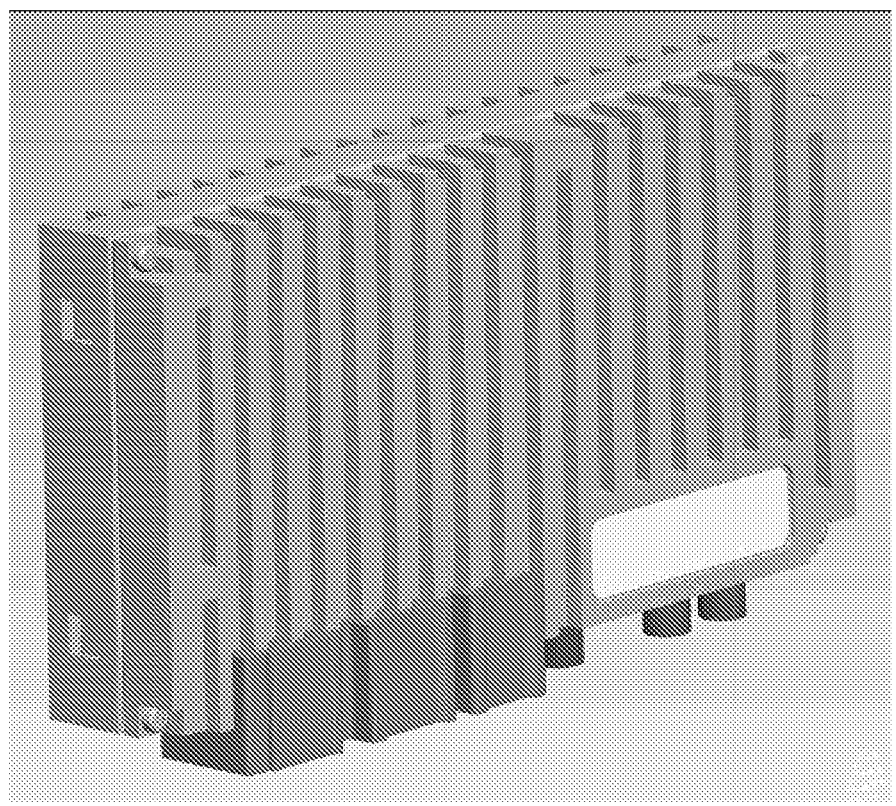
FIG. 42 shows an exemplary orientation of a PASS ECU.

In one aspect, the PASS ECU 202 can be attached to a mounting bracket using snap-in spring tabs into the left and right of the PASS ECU 202 housing shown in FIG. 42. The bracket geometry can vary based on vehicle platform constraints. The PASS ECU 202 can be oriented with the I/O connectors facing downward to prevent dust/debris intrusion. Additionally, Angular Rate Sensor (ARS) equipped units can be oriented within ±3 degrees of gravity vertical for proper Angular Rate Sensor (ARS) functioning. FIG. 42 shows an exemplary orientation. An alternative method of mounting using fasteners can be accomplished from the sides of the PASS ECU 202 by placing mounting clearance hole tabs on the Housing Bottom. The PASS ECU 202 can be located in the vehicle interior.

B. Software

Provided is a PASS ECU 202 software platform. In one aspect, software can execute on one or more of the Applications Processor Subsystem (APS) 2702, the Cellular Network Controller 2703, the GPS Controller 2704, and the Vehicle Interface Controller 2705.

In one aspect, the APS 2702 can comprise the majority of the software and functionality for the PASS ECU 202. For example, the APS 2702 software platform can utilize a Linux Real-Time Operating System (RTOS) that provides bootstrapping, operating system services for task management, interrupt handing and service routine dispatching, file system management for disk-like storage devices, and peripheral device management. On top of that platform, PASS application software can be implemented which has primary control over one or more PASS services that are provided.

The Linux RTOS kernel can supply services to manage software units including, but not limited to: scheduling, synchronization, messaging, memory management, interrupt handling, and the like. In one aspect, the PASS ECU 202 applications can be implemented as a set of kernel processes and user threads, running under Linux. Each of the application units running under the Linux environment can be independent of other units. Clean application interfaces and messaging schemes for each unit allow the units to interact and safely execute with each other.

Figure 43:
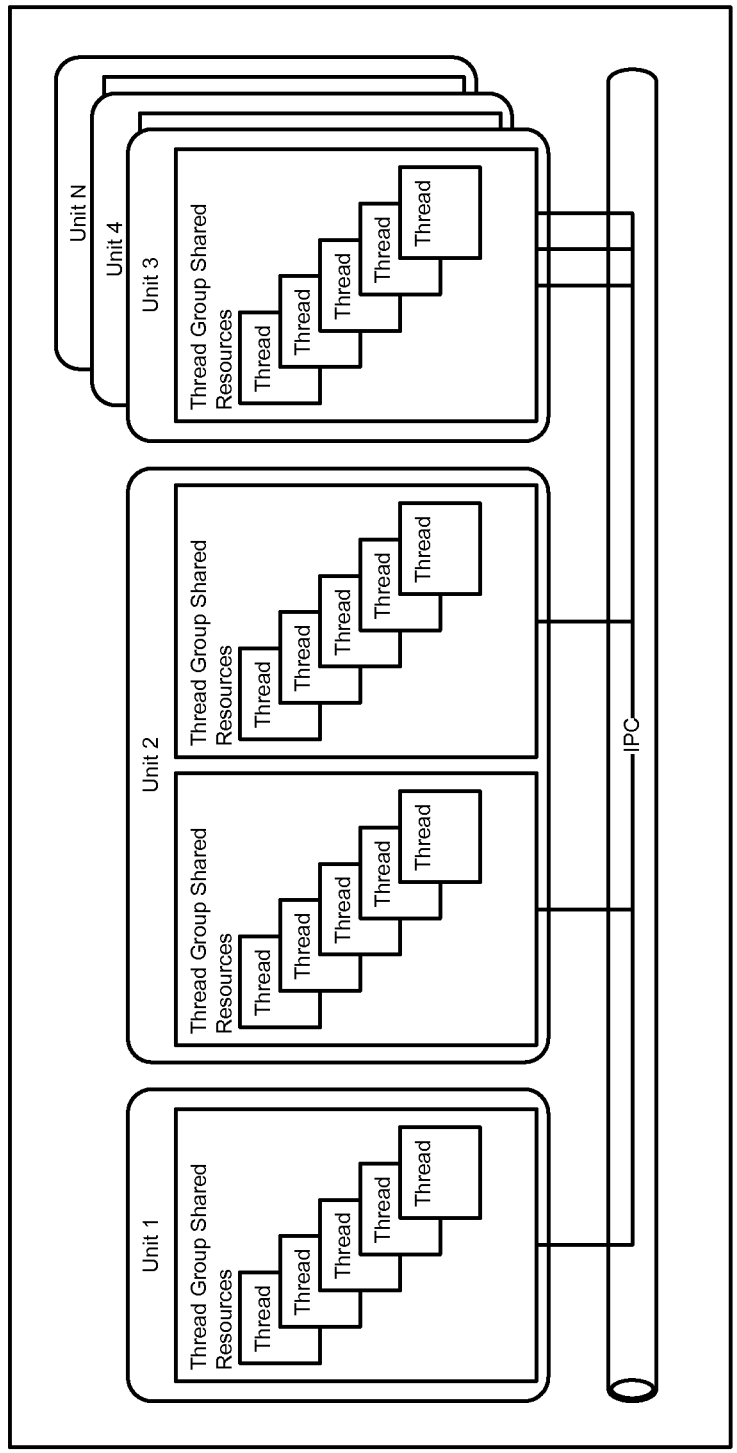
FIG. 43 illustrates a structure of an exemplary software unit.

Linux can also provide memory management to further protect the application units from each other. If one application unit tries to access the memory or code space of another, the operating system can prohibit it and the offending thread can be stopped. PASS application units can comprise multiple threads, in one or more process-like thread groups. In the case of Linux, a thread is actually implemented as a special type of process which shares it resources with other threads, so explicit processes with a set of threads is not present in Linux. In Linux the terms task and thread are used interchangeably. The structure of an exemplary software unit is illustrated in FIG. 43. The units can use Inter Process Communication (IPC) techniques to share information between thread groups within the same unit or across units. Exemplary IPC resources provided by Linux include First In First Out (FIFO) Queues, Shared Memory, Message Queues, and Pipes.

The RTOS can provide a flexible platform for PASS applications and can provide a simple method where future features and applications can easily be added. With the multi-process and multithread nature of Linux, new features and applications can be developed and added to the PASS system with minimal modification or disruption to existing code. With the system and applications designed in a modular nature with a clearly defined interface to each unit, dependencies can be minimized. This makes the system more flexible and more easily upgraded in the future.

At power on, the PASS ECU 202 processor can boot the Linux kernel and start system tasks. In one aspect, in order to make this process as quick as possible, the boot process can be broken into three parts, comprising:

1. A small Flash-based boot loader responsible for transferring execution to RAM based code.
2. A small RAM based loader responsible for programming the Flash interface for optimal speed performance and loading the Linux kernel.
3. The Linux kernel running in RAM will load and start the individual PASS application units.

By way of example, to begin the process, a boot loader located at a processor reset vector in Flash memory can execute. The boot loader at this location can perform a very basic set of tasks due to the limited access speed of the Flash interface. Exemplary basic functions the bootloader can perform can comprise:

Set up processor registers necessary at boot.
Set up address translation and memory management registers.
Turn on address translation.
Set up memory controller.
Relocate the executable code (.text, .data and .bss sections) from Flash to RAM.
Enable caches.
Set various pointers and registers to facilitate entry to RAM code.
Jump to the RAM code entry point.

Following the completion of the Flash-based boot loader, a small RAM resident loader can take over. This loader can have the ability to load the Linux kernel from a file that resides on part of the Flash device. The loader can verify the kernel using a checksum or similar method. In the case where the kernel cannot be verified, a backup kernel can be loaded and used. The kernel image is an executable binary image that can be directly loaded and executed from RAM. In addition to loading the kernel the RAM loader can be designed to handle certain events/interrupts in order to provide a quick response time when necessary for certain PASS related services. Since the kernel and applications will not yet be operational, only a simple set of responses may be available. The basic functions the RAM loader can perform can comprise:

Load vectors and handlers for critical interrupts and events.
Service any pending critical events/interrupts.
Load and verify the Linux kernel.
If verification fails, load secondary kernel image.
Jump to Linux kernel entry point.

Once the Linux kernel has been loaded, the root file system in flash can be mounted and the application units loaded and started. The Linux kernel can also load device drivers for the various peripheral devices that can provide threads and processes access to the device resources.

The PASS ECU 202 can have multiple sources of interrupt. These include, for example, the GSM/GPRS, GPS, VIC, serial interfaces, timers, other on-chip devices, and the like. All interrupts in the systems can be serviced by interrupt service routines that have been registered with the real-time Linux kernel. Certain interrupts that require a quick response at boot time can also have a service routine that is built as part of the boot sequence software executed before the kernel is loaded.

The RTOS can provide file system support for the PASS ECU 202. File system storage can be utilized by the software applications for file data both in transient and persistent file storage devices. For example, the PASS ECU 202 can utilize RAM for nonpermanent file storage and Flash for permanent file storage.

The PASS ECU 202 can use Flash memory for nonvolatile storage that is required for the PASS ECU 202. Usage of the Flash device can be divided into two partitions: the primary partition of the Flash memory can be formatted with a file system, and the other portion of the Flash can be used as raw data storage. The portion of the Flash that is formatted with a file system can allow the access to files using basic file operations. Files on the disk can be opened, closed, deleted, and searched. The location of the data on the flash can be managed by the RTOS and file system. The raw portion of the Flash can store data without any file abstraction layer. The boot code can be directly stored on the Flash in a raw format, executable by accessing memory locations mapped directly to the Flash device.

In one aspect, the file system on the Flash device can store all persistent files that are required by the PASS. The file system can be mounted each time that the PASS ECU 202 host processor is booted and the kernel and application units can be loaded from the file system. In addition to PASS software, the persistent Flash file system can store logs, configuration data, and Flash firmware images for other PASS ECU 202 devices.

The content that will be in the raw portion of the Flash can comprise the ROM and RAM executable boot code. When the processor boots the reset vector of the PPC can start code execution directly from the Flash device. Execution from Flash can be kept to a minimum due to the slow speed of this interface at boot time.

Figure 44:
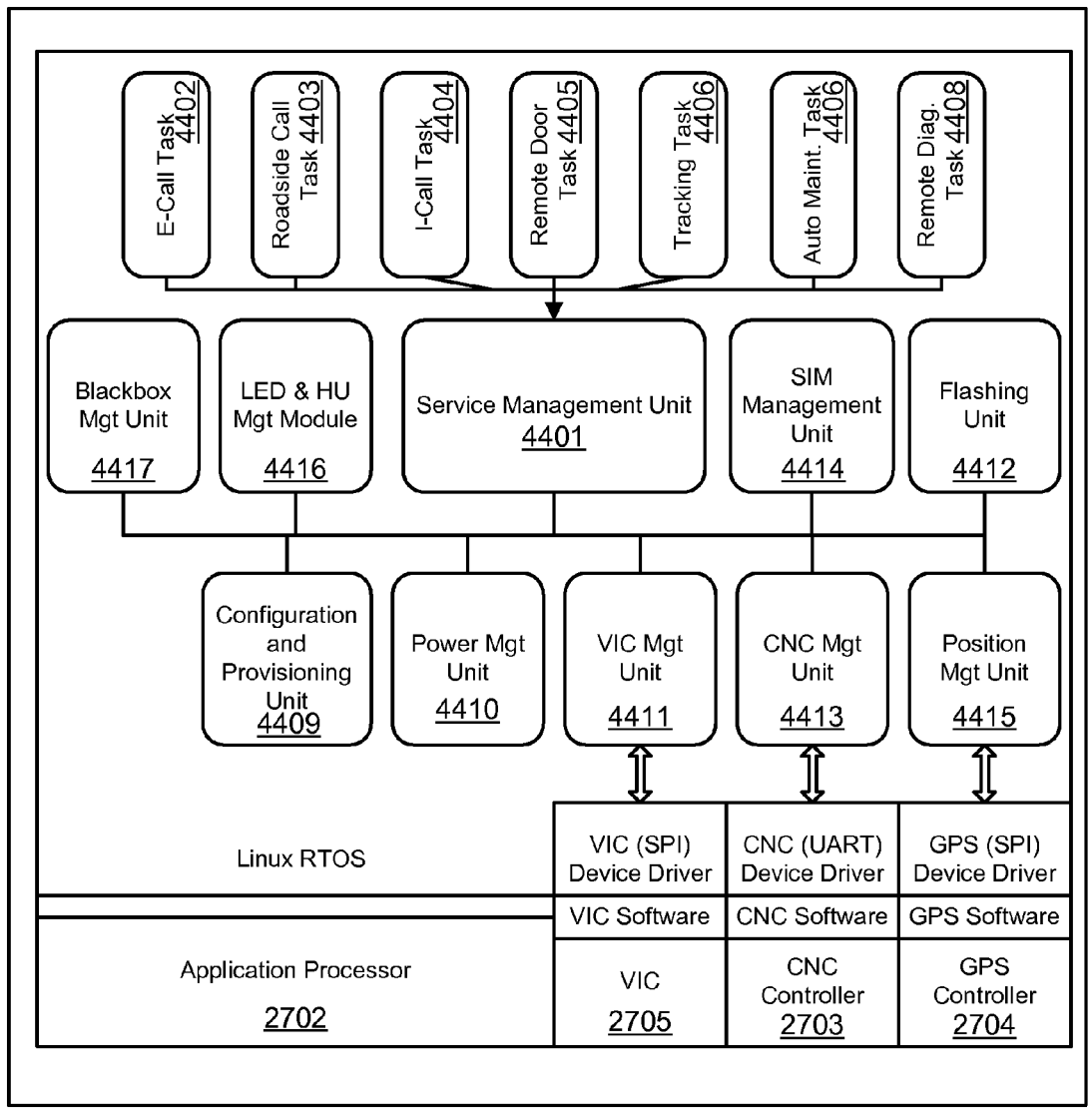
FIG. 44 is a diagram of exemplary PASS functional units.

In one aspect, the PASS system can be implemented on top of the Linux platform as a group of kernel processes and user level threads. One or more of the areas of functionality of the PASS system can comprise a software application unit. Each unit can have a clearly defined set of functions and can provide an external API or messaging interface as appropriate to other units in the system. Various Linux methods for Inter Process Communication (IPC) can be used as appropriate based on unit design. A diagram of exemplary PASS functional units is shown in FIG. 44.

In one aspect, a Service Management Unit (SMU) 4401 of the PASS ECU 202 can provide a major portion of the functionality of the PASS system. The SMU 4401 can be responsible for receiving service request messages from the VIC 2705 and CNC 2703 and appropriately dispatching service tasks based on services priorities. Additionally the SMU 4401 can be responsible validating that the service requested is authorized/configured in PASS. A Service Management Dispatcher (SMD) of the SMU 4401 can receive, parse, dispatch, and monitor service requests. The SMD can also be responsible for verifying that a given service is authorized and configured prior to dispatching the service task. Once the service configuration has been verified, it can be dispatched to the appropriate service task. If a service request made to the SMD is for a service not configured or authorized the request can be terminated.

One or more PASS services can have a defined priority level and the SMU 4401 can enforce these priorities. Exemplary service priorities are shown in Table 3. When a PASS service is active and a higher priority service request is received by the dispatcher, a notification can be sent to any service tasks active that must be suspended or terminated to allow the higher priority service to be started. If a PASS service is requested and a higher priority service is already active the lower priority service can be delayed or terminated by the dispatcher.

TABLE 3

| Priority | Service |
| --- | --- |
| 1 | Automatic Emergency Call |
| 2 | Tracking Call |
| 3 | Manual Emergency Call |
| 4 | Roadside Assistance Call |
| 5 | Information Call |

One or more of the PASS services can have a service task to execute the functionality of the service. The SMU 4401 can provide a set of common functionalities to one or more service tasks that can be used across services for functions such as call and dialing methods, blackbox logging, TOC messaging, and the like.

In an aspect, an Emergency Call Service Task 4402 can be responsible for providing and managing the Emergency call services in the PASS ECU 202. It can manage both Automatic Crash Notification (ACN) and Emergency Assistance service requests, referred to as Automatic and Manual Emergency Calls, respectively (AEC, MEC). Much of the calling and messaging notification process for both types of emergency calls are the same. The task can also allow additional automatic emergency call requests to be made when either an automatic or manual emergency call is in progress. When a call is in progress an established voice connection will not be affected, but a new data message with the new crash information can be sent to the TOC 201. For example, once the task receives a service request for an emergency call the following flow can be executed:

1. Start an E-Call black box entry for beginning of service.
2. Assemble Emergency Call Message data (location and vehicle information, including crash data if this is an ACN) and communicate to TOC via available wireless data service.

3. Mute the audio system, display "Emergency Call Connecting" status on HU and Flash the appropriate LED(s).
4. Establish a voice call according to the configuration to the TOC or 911 utilizing the PASS dialing and redialing strategies.
5. Once connected, the voice call is routed to hands free mode and the status is updated on the Head Unit and the LED(s).
6. If an ACN is received while a MEC is active, the task assembles a new Emergency Call Message with the crash data received and sends it to the TOC without interrupting an established voice call.
7. An interrupted Emergency call will be reconnected by returning to step 4.
8. When the PASS ECU 202 receives a Terminate Message from the TOC and the TOC hangs up the call, the task will complete the E-Call black box entry for end of service and discontinue the service session.
9. The hands free mode is discontinued, LED turned off, message updated on the HU, and the radio unmuted.

The service can have a called failed state if all redial attempts have failed. This state can display a call service failure message on the HU and remain in the state for a configured amount of time before returning to idle mode, and clearing the display message.

The above process for Emergency calls can apply when the PASS system is operating in Normal power mode. In the case when the unit it operating in other power modes, PASS can allow the establishment of a MEC. In order to facilitate this, the CNC 2703 can utilize an application to assist with quick call placement and data messaging. When the PASS ECU 202 boots the SMD can query the CNC 2703 to determine if a call is currently active. If it is an emergency call, the Emergency Call Service Task can determine the state of the call and take over the management of the call. When a call is assumed by the Emergency Call task 4402, processing that could not take place from the CNC 2703 can be completed, such as black box entries for the service.

In another aspect, a Roadside Assistance Call (RAC) Task 4403 can manage the roadside assistance call services of PASS. The service is requested by the user pressing the R-Call button in the vehicle. The RAC Task 4403 can monitor for activation of higher priority services and relinquish resources if other services become active that require a resource that is in use by the RAC Task 4403. If the Roadside Assistance service is not authorized the service request can be terminated.

An exemplary flow of a Roadside Assistance call can comprise:
1. Start a Service black box entry for beginning of service.
2. Assemble Call Message data (location and vehicle information) and communicate to TOC via wireless data service.
3. Mute the audio system, play audio confirmation, display "Assistance Call Connecting" status on HU and Flash the LED.
4. Establish a voice call to the TOC utilizing the PASS dialing and redialing strategies.
5. Once connected voice call is routed to hand free mode and the call status is updated on the HU and the LED.
6. The call can be terminated by either a press of the "Assistance" button or the TOC has hung up after sending a Terminate message.
7. Once the connection with the TOC ends the task completes the Service black box entry for end of service and discontinues the service session.
8. The hands free mode is discontinued and the radio unmuted.

The service can have a call failed state if all redial attempts have failed.

This state can display a call service failure message and remain in the state for a configured amount of time before returning to idle mode, and clearing the display message.

The above process for Roadside Assistance calls can apply when the PASS system is operating in Normal power mode. In the case when the unit it operating in other power modes, PASS can allow the establishment of a Roadside Assistance call. In order to facilitate this, the CNC 2703 can utilize an application to assist with quick call placement and data messaging. When the PASS ECU 202 boots, the SMD can query the CNC 2703 to determine if a call is currently active. If it is a roadside assistance call, the RAC Task can determine the state of the call and take over the management of the call. When the call is assumed by the RAC Task 4403, processing that could not take place from the CNC can be completed, such as black box entries for the service.

In one aspect, an Information Call Service (ICS) Task 4404 can manage the Information Call services of PASS. The service can be requested by the user pressing the I-Call button in the vehicle. The ICS Task can monitor for activation of higher priority services and relinquish any resources necessary for the higher priority service to become active. If the I-Call service is not authorized, the service request can be terminated.

An exemplary flow of an Information call can be as follows:
1. Start a Service black box entry for beginning of service.
2. Assemble Call Message data (location and vehicle information) and communicate to TOC via wireless data service.
3. Mute the audio system, play audio confirmation, display "Information Call Connecting" status on HU and Flash the LED.
4. Establish a voice call to the TOC utilizing the PASS dialing and redialing strategies.
5. Once connected voice call is routed to hand free mode and the call status is updated on the HU and the LED.
6. The call can be terminated by either a press of the "I-Call" button or the TOC has hung-up after sending a Terminate message.
7. Once the connection with the TOC ends the task completes the Service black box entry for end of service and discontinues the service session.
8. The hands free mode is discontinued and the radio unmuted.

The service can have a call failed state if all redial attempts have failed. This state can display a call service failure message and remain in the state for a configured amount of time before returning to idle mode, and clearing the display message.

The above process for I-Calls can apply when the PASS system is operating in Normal power mode. In the case when the unit it operating in other power modes, PASS can allow the establishment of an I-Call. In order to facilitate this, the CNC 2703 can utilize an application to assist with quick call placement and data messaging. When the PASS ECU 202 boots, the service dispatcher can query the CNC 2703 to determine if a call is currently active. If it is, the appropriate service task can determine the state of the call and take over the management of the call. When the call is handed off from the CNC 2703 back to the Information Call Task 4404, processing that could not take place form the CNC 2703 can be completed, including a black box entry.

In an aspect, a Remote Door Task 4405 can handle the Remote Unlocking, Verified Remote Unlocking, and Remote Locking service for PASS. All door services can require that the customer contact the TOC 201 via outside means, such as a landline or cellular telephone to arrange for the services.

In one aspect, the TOC 201 can send a service request to the vehicle that indicates a time to unlock the doors. The service request time can be compared to current time, and if it matches or is within a predetermined time threshold, such as the past 15 minutes, the doors can be unlocked. If the PASS ECU 202 is in Normal mode the Remote Door task 4405 can set a timer to provide indication when the service should be performed. If the PASS ECU 202 had been in, or transitions to, low-power or sleep mode, the Remote Door task 4405 can program the VIC 2705 to reawaken the processor at the appropriate time to service the request. The PASS ECU 202 can then be allowed to go into low power mode. Each subsequent time that the processor is awakened the Remote Door task 4405 can check to see if the service time has occurred, and if so unlock, otherwise confirm the wakeup request made to the VIC 2705 or set a task timer. In all cases when the unlock action is complete the vehicle directional signals can flash and/or a message can be displayed on the Instrument Cluster confirming the operation.

In another aspect, the TOC 201 can send a request to the vehicle with a timed window to allow for verified vehicle unlocking This message can be received, validated, and the Remote Door task 4405 can keep a record of the service request and time window. The Remote Door task 4405 can then be waiting for the confirmation of the trunk button signal. When the signal is detected for a predetermined threshold, such as 15 seconds, and the current time is within the timed window, the PASS system can unlock the doors, trunk, and/or tank cap. If the PASS ECU 202 transitions to low power mode, the trunk button press can reawaken the processor and the Remote Door task 4405 can perform verification of the time window when awoken and unlock the doors, trunk, and/or tank cap if successful.

Also provided is a method for remote vehicle lock. This service can lock the doors of the vehicle when received. The Remote Door task 4405 can receive the service message from the TOC 201 and can immediately lock the vehicle doors. A message confirming service completion may be sent to the TOC 201 for verification that the door lock request was successful.

In another aspect, a Tracking task 4406 can support geographical tracking of a PASS equipped vehicle. In one aspect, the Tracking task 4406 can manage two variations on the tracking service, Stolen Vehicle Tracking and Antitheft Tracking The underlying service can be the same, with the method of activation varying.

Stolen Vehicle Tracking can be initiated by a call from the customer to the TOC 201 requesting that the service be enabled to track a stolen car. The TOC 201 can then send a tracking service request to the vehicle.

To initiate Antitheft Tracking, the vehicle's built-in Theft Alarm system can send a message to the PASS ECU 202 via the VIC/CAN interface which can be sent to the Tracking task 4406. The Tracking task 4406 can send a data message to the TOC 201 with information regarding the theft alarm if it is not canceled within a configured time. The TOC 201 can then verify the vehicle's state with the customer. Once verified that the car is stolen the TOC 201 can send a tracking request back to the vehicle.

Once one of the above methods of requesting/activating the tracking service has occurred the Tracking task 4406 can begins the following exemplary functional flow:
1. Start a Service black box entry for beginning of tracking service.
2. Assemble Tracking Message data (location and vehicle information) and communicate to TOC via wireless data service.
3. If requested by the TOC, establish a voice call to the TOC for two-way voice communication with the vehicle occupants.
4. The tracking information will be continuously sent to the TOC at the interval specified in service request until the service expiration or a tracking service termination message is sent by the TOC.
5. Once the tracking service is terminated, the task completes the Service black box entry for end of tracking services and discontinues the service session.

Tracking task 4406 can be preempted by either an AEC or MEC. In the case of an AEC the tracking service can be cancelled completely, if a MEC established, tracking services can resume at the end of the call.

In one aspect, an Automatic Maintenance Status (AMS) Reporting task 4407 can be responsible for providing the Maintenance Status Report Service. The AMS Reporting task 4407 can periodically access in-vehicle remote diagnostics functions to read, for example, the vehicle's maintenance computer function and odometer reading. Using this information and configured mileage thresholds, the AMS Reporting task 4407 can determine if a vehicle maintenance service is due. If a service is due, a data message can be sent to the TOC 201 containing Vehicle Identification Number (VIN), current mileage, remaining miles, and estimated days until the next service is due. The AMS Reporting task 4407 can support updates to the configuration by means of a locally connected diagnostic tool or over-the-air by means of a PASS configuration command.

Functional flow of an Automatic Maintenance Status Reporting call can b be as follows:
1. Periodically obtain maintenance data from vehicle ECU's via CAN.
2. Determine if maintenance is needed.
3. If maintenance is needed, determine if an AMS data message has already been sent.
4. If no message has been sent assemble a AMS data message with the VIN, mileage and any other maintenance data from the vehicle.
5. Send the AMS data message to the TOC and set a flag to track that the AMS service has been activated.
6. The AMS will not be allowed to reactivate until the service is performed or the threshold reprogrammed and the tracking flag has been reset.

In an aspect, a Remote Diagnostic task 4408 can be responsible for managing a service request and making the required queries and commands on the Diagnostic-CAN and relaying information via data messages to the TOC 201. The Remote Diagnostic task 4408 can support one or more diagnostic functions. For example, Scan All Modules Test, Diagnostic Trouble Codes Deleting, Quality Data Reporting, and the like.

The Remote Diagnostic task 4408 can be responsible for running a series of diagnostic requests to various devices on the CAN network in a vehicle. The stimulus for running the test diagnostics can be, for example, a Roadside Assistance button press, a remote service request message, or when the PASS ECU 202 receives a diagnostic message from the diagnostic bus. The data that is collected when the diagnostic tests are run can be stored in the PASS ECU 202 as well as transmitted to the TOC 201. If a data connection is not available at the time of the test, it can be queued and sent when connectivity is restored.

The data collected by the Remote Diagnostic task 4408 can be used to support one or more diagnostic functions. Test data can be stored in the flash file system that is provided on the PASS ECU 202, and can be updated and managed by the Remote Diagnostic task 4408 to allow for a history of at least five data sets. When five sets have been stored, the oldest will be replaced at the time when the next data set is written.

The Remote Diagnostic task 4408 can support configuration through a Configuration and Provisioning Unit 4409. Configuration information for remote diagnostics can be updated via a wireless communication network as well as a locally connected engineering tool.

In one aspect, the PASS ECU 202 can support multiple power management and operational modes in order to conserve power while still allowing for quick wakeup and response to events and other inputs.

Exemplary modes supported by the PASS ECU 202 can comprise:

Sleep Mode: PASS ECU 202 is connected to power but is not active.

Polling Mode: PASS ECU 202 is periodically woken up to poll a Service Provider for incoming data.

Low Power Mode: PASS ECU 202 is not active but the CNC 2703 is still registered in the network.

Normal Mode: PASS ECU 202 is in normal operation, a service call might be active.

Back-Up-Battery Mode: PASS ECU 202 is extending an emergency service under BUB 2701 power.

In one aspect, from an AP 2702 software perspective, when the PASS ECU 202 is operating in Normal or Back-Up-Battery mode the AP can be powered and provide active software execution. When in Normal mode a power management software unit 4410 can be responsible for monitoring changes in the vehicle status that can require the PASS ECU 202 to shutdown and transition the PASS ECU 202 to a different power mode. In one aspect, a primary condition that must exist to leave normal mode is for the vehicle ignition to be turned off. Once this occurs the power management unit 4410 can monitor one or more of the following: service status, CAN bus activity, CNC registration, CNC configuration, Phone input line, and the like. When in normal mode, at least two mode transitions are possible: Sleep and/or Low Power.

When the ignition is turned off, the power management unit 4410 can initiate a shutdown of the software and transition to the power mode corresponding to the conditions present.

When the power management unit 4410 has detected that it is appropriate to transition the PASS ECU 202 to either Sleep or Low-Power mode it can send messages to one or more of the software units to initiate a graceful shut down of the system. When each unit has completed the shutdown process a message can be sent back to the power management unit 4410 indicating that shutdown is complete. When all units have reported back that shutdown is complete the power management unit 4410 can be responsible for final PASS ECU 202 shutdown. The final system shutdown can include preparing service messages for call service and forwarding them to the CNC 2703 memory to facilitate a quick-call feature. Once all shutdown tasks are complete the AP 2702 can command the VIC 2705 to put the PASS ECU 202 into sleep mode or low-power mode as appropriate.

If during shutdown processing the PASS ECU 202 receives a signal that a service request, CAN activity or CNC message has been received, the units can restart and return the PASS ECU 202 to normal mode without having to reboot the Linux kernel.

In one aspect, in the PASS ECU 202 the majority of vehicle generated information can be received via the VIC 2705. The VIC 2705 can provide a connection to the CAN-B, crash sensor interface, PASS ECU 202 buttons, and LEDs. For example, the VIC 2705 can be connected to the AP 2702 via a SPI bus and can have an AP 2702 host driver to manage the message protocol between the VIC 2705 and the AP 2702. The VIC 2705 can manage the wake-up of the AP 1012.

The CAN-D can utilize a built-in CAN cell in the Applications Processor 2702 and can have Vector CAN drivers and a stack running on the host processor. This interface can be utilized for diagnostic purposes and can be operational while in normal mode.

The VIC 2705 can have flash-based code storage from which the device will boot and execute form when powered-up. A Vehicle Interface Management Unit 4411 can provide a flash update interface to the VIC 2705, used when a binary image is received by a flash management unit 4412 to update the software.

In one aspect, a CNC Management Unit 4413 can be responsible for all communication and configuration of the GSM/GPRS Controller. By way of example, the CNC 2703 can be connected to the Applications Processor 2705 via a UART interface.

The CNC Management Unit 4413 can be responsible for managing data messaging and voice call requests that are made by one or more units of the PASS system. The CNC management unit 4413 can provide a messaging interface for units to make data or voice call requests. Outside units can pass message content and recipients to the CNC management unit 4413 and it can format and send the appropriate set of commands and data to the GSM/GPRS Controller to establish the voice call or data transfer.

The CNC Management Unit 4413 can provide a messaging interface to the GSM/GPRS Controller that allows the controller to manage the multiple data flows with the GSM/GPRS Controller. The GSM/GPRS Controller can be used for both data services and voice services. For example, the GSM/GPRS Controller can support the use of GSM 07.10 communication multiplexing stack. This stack can provide the interface to the GSM/GPRS Controller to allow for multiple services to be used simultaneously.

When the CNC 2703 causes a processor wake up to occur it can be the responsibility of the CNC Management unit 4413 to receive the message from the CNC 2703 and forward it to the responsible unit for processing. The possibilities include messages such as a service request message that can be forwarded to the Service Management Unit 4401, software download data that can be passed to the flashing management unit 4412, or a configuration data message that can be passed to the configuration management unit 4409.

The CNC Management Unit 4413 can also be responsible for interfacing to a GSM application that can handle a Quick-call feature when the unit is in Low-power or Sleep Mode. In one of these modes the GSM can be signaled by the VIC 2705 to establish a call. During PASS ECU 202 shutdown from Normal mode, the GSM/GPRS Controller can be loaded with preformed messages and numbers for each of the call services. When a service button is pressed the GSM/GPRS Controller can immediately begin to establish the call and send the data message. The CNC Management Unit 4413 can assist in passing off control of the voice and data connections for such calls to the appropriate service task.

In another aspect, a SIM device can be a replaceable or non-replaceable SMT device in the PASS ECU 202. It can be connected to the AP 2702 via the GSM/GPRS Controller. A SIM Management Unit 4414 can be responsible for managing configuration and data in a SIM device. The SIM Management Unit 4414 can implement a messaging protocol that can use utilize the CNC interface to the GSM/GPRS Controller to communicate with the SIM device. This SIM Management Unit 4414 can also be responsible for managing the PIN and PIN1 of the SIM device. At boot, the SIM Management Unit 4414 can enter the PIN for the SIM device to allow it to register on the network.

In one aspect, a Position Management Unit 4415 can be responsible for maintaining an accurate and current position of the vehicle at all times. All services and other software units that require position data can request such from the Position Management Unit 4415. In addition to current position, the Position Management Unit 4415 can also maintain a set of past location points for a configured number of points. Position points can be stored based on an algorithm taking into account changes in location or heading. Each time a position is determined, it can be compared to the last position in the history. If the location has changed by more than the configured number of meters, or the heading has changed by more than the configured number of degrees, an entry can be made in the position log. The log can implement a FIFO storage method.

The Position Management Unit 4415 can implement a messaging protocol with the GPS Controller over the serial peripheral interface. This protocol can allow for receiving position information, and the sending of vehicle movement metrics to implement dead reckoning. The Position Management Unit 4415 can also allow the PASS AP 2702 to configure and flash the GPS Controller.

To improve accuracy of the position points that are received from the GPS satellite the GPS Controller can augment them with an implementation of dead reckoning using the vehicle metrics that are received from the VIC/CAN interface. The vehicle metrics can comprise one or more of differential wheel speed, the reverse indicator, and the like. These metrics can be sent to the GPS Controller from the Position Management Unit 4415. If the PASS ECU 202 is interfaced to the optional Angular Rate Sensor (ARS) this information can be passed to the GPS Controller with the other vehicle metrics used for dead reckoning.

In an aspect, a LED/HU Management Unit 4416 can be responsible for aggregating and managing LED and Heads Up display messages for the PASS ECU 202. The LED/HU Management Unit 4416 can implement a periodic timing system that can allow for the LED outputs to be controlled with flashing periods and duty cycles that can indicate the service or PASS ECU 202 state on the LEDs. The LED and Management Unit 4416 can display the proper message and LED status based on the priority of each service that has made a visual display request.

The Configuration and Provisioning Management Unit 4409 can maintain and distribute configuration information for one or more functional units and services of the PASS ECU 202. The Configuration and Provisioning Management Unit 4409 can support provisioning either automatically or manually of the PASS ECU 202.

When a vehicle is manufactured and reaches the End of Line, or after the PASS ECU 202 is otherwise installed in a vehicle, the PASS ECU 202 can initiate an automatic provisioning session when power is applied and the first valid position is acquired from the GPS. This session can allow the PASS ECU 202 to be paired with the vehicle that it has been installed in and verify service configuration parameters with the TOC 201. To initiate the session the Configuration and Provisioning Management Unit 4409 can determine that the PASS ECU 202 requires provisioning and can send a status message to the TOC 201.

Manual provisioning can be initiated when the PASS ECU 202 is not currently provisioned and is being reactivated by a customer. The PASS customer can contact the TOC 201 and arrange for activation of PASS services. Once the customer has arranged for service, a unique procedure to reawaken the PASS ECU 202 can be performed. This can indicate to the PASS ECU 202 to initiate a provisioning session. If the PASS ECU 202 is able to register with the wireless data service then a status data message can be sent to the TOC 201 to attempt service provisioning.

The TOC 201 can initiate a provisioning session at any time with the unit to allow the configuration to be updated. This can be used for updates to configuration data such as service status, enabling/disabling of features, configured telephone numbers, and other service parameters.

When the PASS ECU 202 receives a provisioning service request initiated by one of the previous methods, the following exemplary flow can be used:

1. Start a Service black box entry for beginning of provisioning service.
2. Send a status message to the TOC 201 with the current status of the services and vehicle information.
3. Wait for a Provision Update message from the TOC 201.
4. If the Provision Update message is not received before the update timer expires, the task ends the session with a failure status.
5. If the Provision Update message is received, it is verified and a reply is sent back to the TOC 201, indicating if an error was found or if the message was successful.
6. The TOC 201 will then send a final acknowledgement to the PASS ECU 202, at which time the provisioning data will be store permanently.
7. If any errors are detected the task will end the provisioning session and store no data received.
8. When the provisioning session ends normally or with a failure status the task will complete the Service black box entry for the provisioning service with the appropriate information.

The Configuration and Provisioning Management Unit 4409 can also provide a unit interface and notification method for other PASS software units to obtain configuration data. This allows for a common method and single location of storage for the PASS system configuration. Data can be stored in nonvolatile memory.

In an aspect, a Blackbox Unit 4417 can be responsible for managing entries into the PASS ECU 202 blackbox logs. The Blackbox Unit 4417 can maintain one or more sets of blackbox records. For example, one se for Emergency call requests, and one set for all other service requests. For example, the Blackbox Unit 4417 can utilize a circular list of entries that will provide for twenty entries. Once the log is full the oldest entry can be replaced with the newest entry in a "first in first out" fashion. The black box logs can be stored in a file and can be downloaded via an engineering or diagnostic tool connected to the vehicle or wirelessly over a network. When requested, the log files can be sent over the VIC/CAN interface to the connected tool.

In another aspect, software flashing of the various components of the PASS ECU 202 can be managed by the Flashing Management Unit 4412. The Flashing Management Unit 4412 can maintain the status of software/firmware that is running on one or more of the PASS ECU 202 devices. By way of example, the "flashable" devices in the PASS ECU 202 can comprise one or more of, the Applications Processor 2702, VIC 2705, CNC 2703, and the GPS subsystem 2704. Software/firmware flash images can be received from the CNC 2703 or via a locally connected engineering tool over the CAN/VIC interface.

When the VIC management unit 4411 or CNC management unit 4413 identifies incoming data as software/firmware update data it can forward the data to the Flashing Management Unit 4412 for reassembly and verification prior to being loaded to the appropriate device. If the flash image does not pass verification methods, such as checksum or signature, the image can be discarded. If the image passes verification then it can be prepared for transfer to the indicated device. When a complete flash image is downloaded to the AP 2702, status can be returned to the provider, either the TOC 201 or a confirmation to the local engineering tool.

In the cases of the VIC 2705, CNC 2703, or GPS subsystem 2704, the image can be loaded to the device over the device's processor interface. For the GPS subsystem 2704 and VIC 2705, this can be a SPI bus; for the CNC 2703, a UART interface can be used. Each of these devices can have a software unit that handles management of the device including the methods for transferring the new software/firmware image into the proper flash memory for the device.

New software flash images can be loaded into the PASS ECU 202 with a defined activation method. The Flashing Management Unit 4412 can allow for images to be loaded and activated immediately, at a specific time, or on demand. If a flash image is to be activated immediately, once it has been verified it can be loaded and executed. If a timed activation is requested the flash image can be held in non-volatile storage until the time requested. In the case of the on-demand method is selected, once the flash image is received by the PASS ECU 202 it can be stored in non-volatile memory until a command is received from the TOC 201 to activate it.

When flash images are updated, a copy of the existing software/firmware that is executing can be maintained in case a failure occurs and the device must be reloaded with the original software/firmware. The Flashing Management Unit 4412 can query the device that had been updated to verify that the new image is operational, if it is not, the device can be reloaded with its original software/firmware.

In one aspect, the VIC 2705 can be an 8-bit microcontroller which is the PASS ECU 202's connection to the vehicle Body CAN network, crash sensor, and PASS input buttons. The Diagnostic CAN can be connected directly to an AP CAN interface and is not connected through the VIC 2705.

An approved Vector CAN protocol communications driver can be part of the application program which runs on the VIC 2705 microcontroller. This protocol stack and microcontroller combination can provide an interface to the vehicle bus and remove the complexities of the CAN aggressive response requirements from the AP 2702 software. The isolation of the VIC 2705 also provides the advantage that any CAN related changes (VMM changes) can be addressed locally with a software change on the VIC 2705 only rather than the entire PASS module.

For example, the VIC 2705 can be interfaced to the AP 2702 through an SPI connection. The VIC 2705 can be interfaced to the vehicle CAN bus at 83.3K baud (CAN-B) or 125K baud (CAN I HS) speeds. Additionally, the VIC 2705 can handle miscellaneous PASS ECU 202 I/O, such as button inputs (and wake-up), LEDs and illumination, CAN wake-up, crash Sensor input (discrete wire or LIN), Real Time Clock wake-up, and various analog measurements and sensors such as BUB 2701 enable, BUB 2701 load test, Angular Rate Sensor (ARS), Vbat inputs, and the like.

The VIC 2705 algorithms can decide when to enable the BUB 2701 and vice versa. The VIC 2705 software an also perform hardware diagnostics on such parts as the LEDs, buttons, illumination, and power supplies. Shorts or opens can then be stored and communicated at the appropriate time via DTCs over CAN.

The VIC 2705 can determine what configuration is required for the PASS ECU 202 based on the type of vehicle in which it is installed. This function can be performed via the CAN interface of the VIC 2705. The VIC 2705 can also control the engineering tool interface 2713 for the PASS ECU 202. For example, through one of the UART channels on the VIC 2705.

VIC 2705 can comprise software units with functions such as: Vector CAN protocol drivers (CAN, DbKom, Transport Protocol, Diagnostic, Network Management) for CAN related functions; network loss of communication Diagnostic Trouble Code (DTC) monitoring; Wake-up/Sleep monitoring; VIC-HOST SPI protocol driver; crash sensor serial protocol driver (UART/LIN); analog channels input function (button input, main battery, back-up battery, etc.); button illumination PWM output driver; engineering Interface UART channel driver; RTC wake-up function (low power sleep); discrete outputs enabling various PASS power supplies for: Applications Processor, GSM/GPRS Controller, GPS Controller, and Audio functions; and the like.

In one aspect, VIC 2705 program memory can be flash based; therefore, it can start executing application programs immediately upon exiting from power-on reset. For VIC 2705 application program updating, a protected bootloader allows the main memory to be flashed through the AP SPI interface. The bootloader can ensure a valid application exists and prevent an invalid application code from running In another aspect, the GSM/GPRS Controller can comprise a built-in microprocessor that allows PASS specific applications to be executed in the GSM/GPRS Controller. The GSM/GPRS Controller can initiate calls and messaging to the TOC 201 without the AP 2702 active to provide expeditious services when the PASS ECU 202 is in low-power or sleep mode. This application is referred to as Quick-call software. As the AP 2702 enters Low-Power or Sleep mode it can load the GSM/GPRS Controller memory with messages and phone numbers to support Emergency Calls, Roadside Assistances, and Information Calls. When the VIC 2705 detects that a service button in the car has been pressed, it can send a signal to the GSM/GPRS Controller. That can cause the GSM/GPRS Controller to execute the Quick-call software application which can send the preloaded message and call the stored TOC 201 number for the service requested. Once the AP 2702 has booted, it can determine the state of the service request/call and take over the management of the service.

In one aspect, the GPS Controller can comprise a built-in microprocessor that will allow PASS specific applications to be executed on the GPS Controller. In order to provide more accurate position points the GPS Controller can utilize Dead Reckoning (DR) Software. The DR can augment the GPS data that is received by taking, for example, differential wheel speed, and reverse indicator information that can be fed to it by the AP 2702. The AP 2702 can provide updated information to the GPS Controller.

III. Exemplary Methods of Operation

Provided herein are various aspects of exemplary operation of the PASS ECU 202 and TOC 201 to provide PASS services, making use of the communication services described previously. The following PASS services are described herein: Automatic Emergency Call, Manual Emergency Call, Roadside Assistance (Manual and Automatic), Information Call (including Point of Interest download), Remote Door Unlock (Immediate and Verified), Remote Door Lock, Stolen Vehicle Tracking, Anti-Theft Tracking, Maintenance Status Reporting, and Remote Diagnostics.

A. Automatic Emergency Call (AEC)

The Automatic Emergency Call (AEC) service can provide for emergency assistance from the PSAP 207 via an automatically initiated call. When a crash occurs, the PASS ECU 202 can detect the event via either CAN messages or discrete I/O from the crash sensor unit. Since the crash sensor unit is not active while the ignition is off, this service can be applicable while the ignition is on. This service is also known as Automatic Crash Notification (ACN).

In one aspect, the PASS ECU 202 can use two types of calls to provide emergency assistance, indirectly via the Service Center 205 and/or directly to the local PSAP 207 by dialing 911 or 112.

For example, the direct call to the PSAP 207 can be used in one or more of the following conditions, the PASS ECU 202 is configured to use a direct call for the AEC service and/or no roaming service is available (that is, the PASS ECU 202 is unable to register to the visited network). In all other cases, the PASS ECU 202 can dial the Service Center 205 to obtain emergency assistance.

Figure 45:
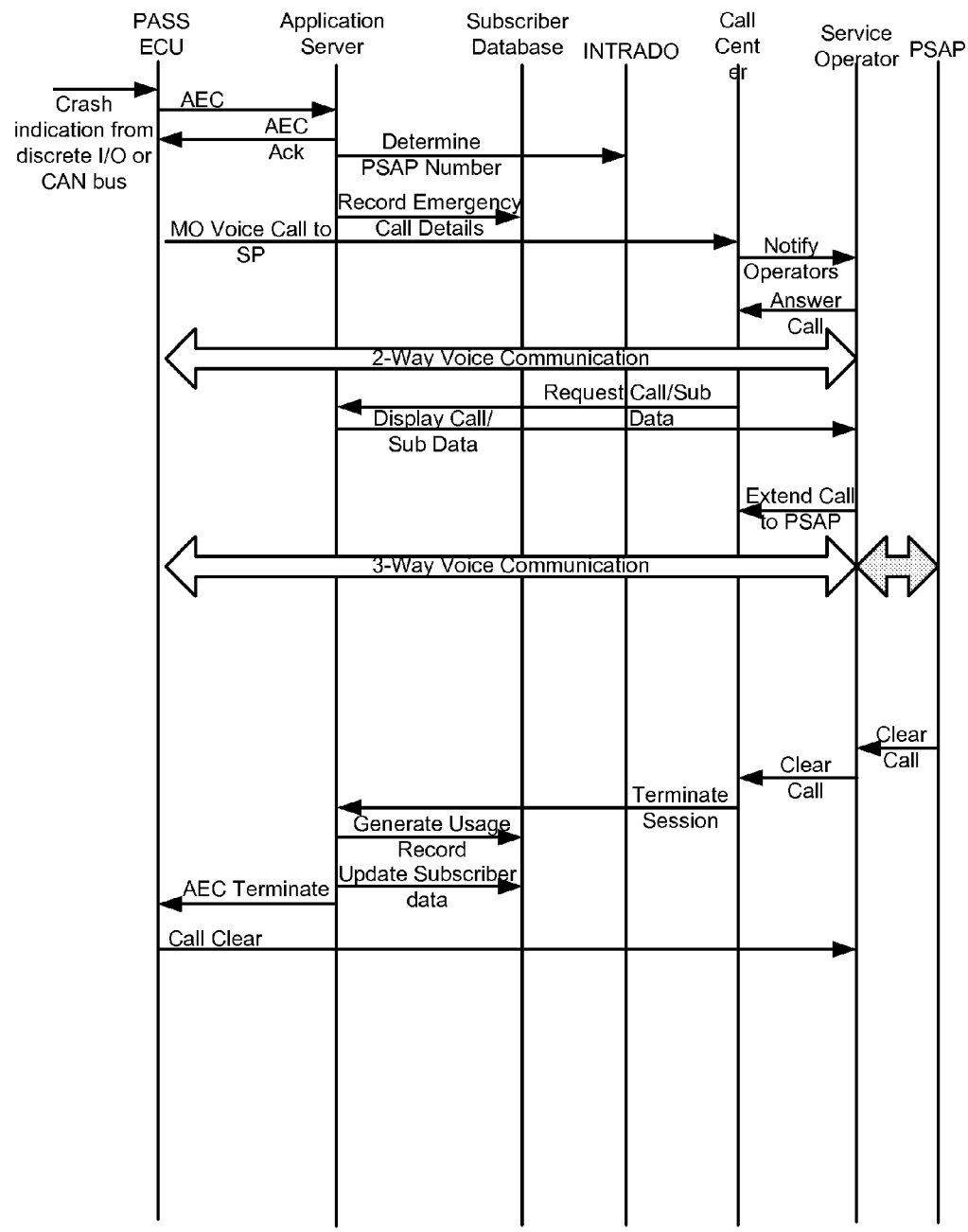
FIG. 45 illustrates an exemplary method for indirect Automatic Emergency Call (AEC) via a Service Center.

Provided in one aspect are methods for indirect AEC via a Service Center 205. FIG. 45 illustrates an exemplary method for indirect AEC via the Service Center 205 comprising:

1. When the crash sensor detects that a crash has occurred, the crash sensor notifies the PASS ECU 202 via CAN messages and/or discreet I/O.

2. When the PASS ECU 202 recognizes that a crash has occurred, the PASS ECU 202 determines the vehicle's location using the internal GPS and/or dead reckoning, determines from its current configuration and registration status whether the emergency call should be placed directly to the PSAP 207 or to the Service Center 205, and records the start of the AEC service in the Black Box. The PASS ECU 202 can display "Call Connecting" on the Head Unit and Instrument Cluster.

3. The PASS ECU 202 will ignore the Emergency Call, Roadside Assistance, and Information buttons while engaged in the AEC service. The PASS ECU 202 will continue to process the AEC if the ignition is turned off. If the PASS ECU 202 loses power during processing of an AEC, it will restart the AEC when power is restored.

4. The PASS ECU 202 sends an AEC message to the Application Server 901 and initiates a voice call to the configured number for the Service Center 205. The AEC message contains the VIN, IMSI, vehicle location, crash status, and vehicle occupancy and indicates that the PASS ECU 202 is attempting to make an emergency call to the Service Center 205.

5. If the voice call fails, the PASS ECU 202 will automatically retry the call. After all retries to the Service Center 205 are exhausted, the PASS ECU 202 will dial directly to the local PSAP 207.

6. When the Application Server 901 receives the AEC message from the PASS ECU 202, it sends an AEC Acknowledgement message to the PASS ECU 202 to acknowledge receipt of the AEC message, records the AEC data in the Subscriber Database 903, and uses the web-based service 217 to determine the local PSAP 207 number for the vehicle location.

7. When the incoming emergency call is received at the VoIP Call Server 902, it is queued for the first available Service Operator 204. The incoming call is identified as an emergency call by the destination number.

8. The Service Operator 204 answers the incoming emergency call, and the VoIP Call Server 902 notifies the Application Server 901 using the caller ID (which will be the PASS ECU 202's IMSI in this case).

9. The Application Server 901 uses the IMSI to access the corresponding subscriber data, including the vehicle location and local PSAP 207 number, for display to the Service Operator 204.

10. When the PASS ECU 202 detects call answer, it displays "Call Connected" on the Head Unit and Instrument Cluster.

11. The Service Operator 204 verifies that PSAP 207 assistance is required, extends the call to the local PSAP 207, and forwards the vehicle location and other crash information to the PSAP operator 206. The Service Operator 204 stays in the call until it is terminated by the PSAP operator 206.

12. The Service Operator 204 may request an update on the location while the AEC is in progress (not shown). The PASS ECU 202 will ignore messages from the TOC 201 for other services while engaged in the AEC.

13. After the PSAP operator 206 clears the call, the Service Operator 204 terminates the session, and the Application Server 901 sends a Terminate AEC message to the PASS ECU 202. The Application Server 901 generates a usage record for possible billing purposes and updates the subscriber status in the Subscriber Database 903.

14. When the PASS ECU 202 receives the Terminate AEC message from the Application Server 901, it clears the call, clears the "Call Connected" message on the Head Unit and Instrument Cluster, updates the Black Box, and terminates the AEC service.

15. The user cannot terminate the voice call. The PASS ECU 202 will hang up only after it receives a Terminate AEC message. If the call is cleared before the Terminate AEC message is received, the PASS ECU 202 will assume that the call was terminated prematurely and restart the AEC service.

16. Upon termination of the call, the PASS ECU 202 will remain in the normal (powered up) state for a configurable interval (nominally 5 minutes), regardless of the ignition status to allow callback from the Service Center 205 or PSAP operator 206.

If the PASS ECU 202 detects a crash while engaged in another service, it can preempt that other service in order to perform the AEC. Preempted services are not restarted. If a manual emergency call is in progress when a crash is detected, the PASS ECU 202 can maintain the call in progress, but forward an AEC message to the TOC 201 with the crash details and upgrade the ongoing service to AEC.

If the PASS ECU 202 needs to resend the AEC message after receiving crash information of a different type or with higher severity, then the PASS ECU 202 can send the higher severity crash information in the AEC message.

Figure 46:
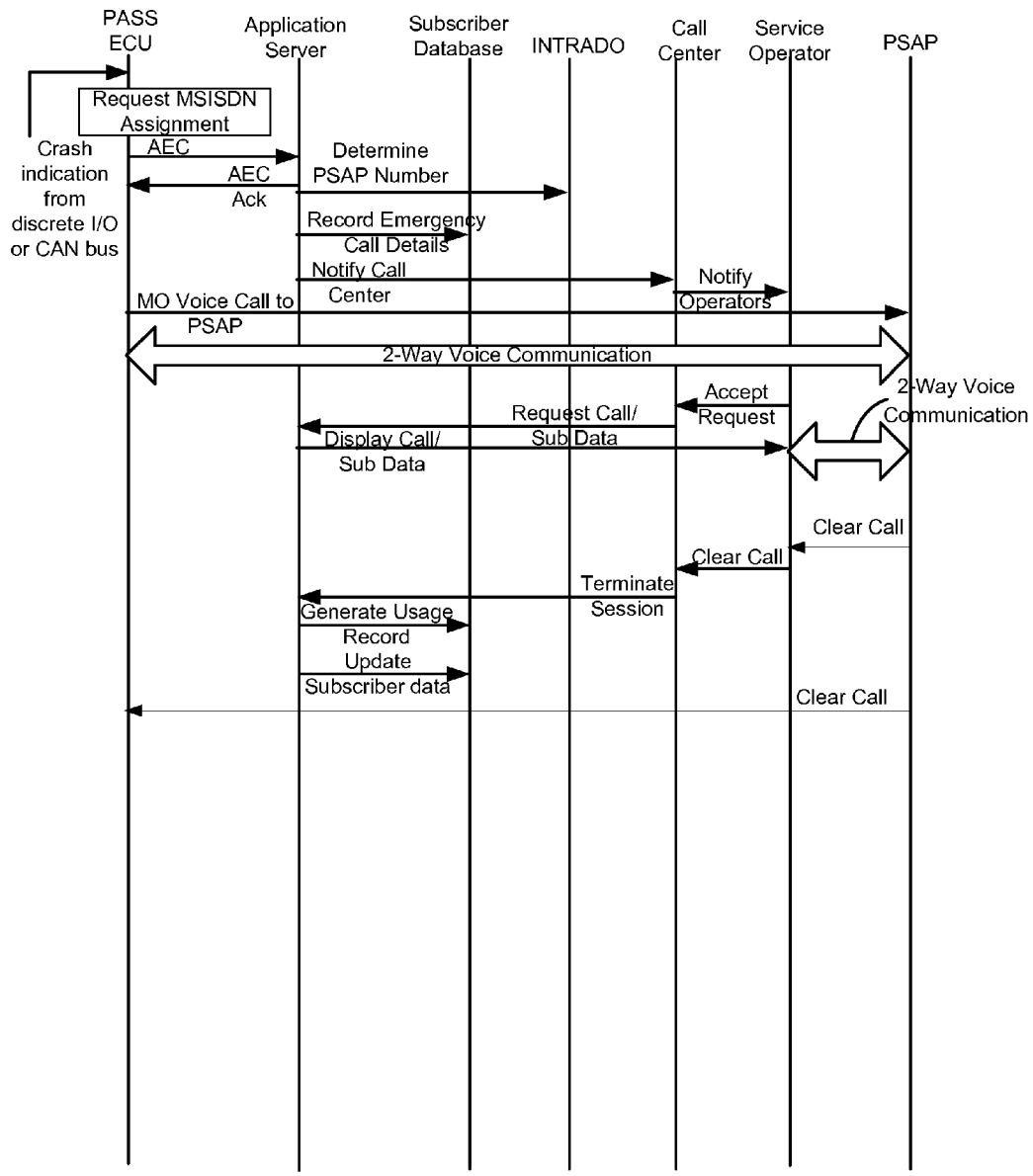
FIG. 46 illustrates an exemplary method for a direct AEC to a Public Safety Answering Point (PSAP)

FIG. 46 illustrates an exemplary method for a direct AEC to the PSAP 207, comprising:

1. The PASS ECU 202 first sends a USSD message to the TOC's HLR 302 to request an MSISDN. When the response is received from the HLR 302, the PASS ECU 202 can continue with the AEC service. Temporary assignment of MSISDN numbers to the PASS ECU 202 for calls to the local PSAP 207 can be as described previously.

2. The PASS ECU 202 then sends an AEC message to the TOC 201. The AEC message contains the VIN, IMSI, vehicle location, crash status, and vehicle occupancy and indicates that the PASS ECU 202 is attempting to make an emergency call directly to the local PSAP 207.

3. The PASS ECU 202 initiates a voice call to the local PSAP 207 using the configured number (for example, "911"). The call is automatically routed to the local PSAP 207 by the wireless network 208 based on the cell Id or other location method used by the carrier.

4. When the Application Server 901 receives the AEC message from the PASS ECU 202, it records the AEC data in the Subscriber Database 903, uses the web-based service 217 to determine the local PSAP 207 number for the vehicle location, notifies the VoIP Call Server 902 that a PASS ECU 202 is attempting to make an AEC directly to the local PSAP 207, and sends an AEC Acknowledgement message to the PASS ECU 202.

5. The local PSAP operator 206 answers the emergency call. When the PASS ECU 202 detects call answer, it displays "Call Connected" on the Head Unit and Instrument Cluster.

6. The local PSAP 207 may use the wireless network's location determination procedures, such as Uplink Time Difference of Arrival (U-TDOA), to determine the vehicle location. The PSAP operator 206 provides emergency service.

7. In parallel with the emergency call to the PSAP 207, the VoIP Call Server 902 notifies the Service Operators 204 of the direct AEC in progress.

8. The first available Service Operator 204 initiates a call to the local PSAP 207. When the PSAP operator 206 answers the call, the Service Operator 204 confirms that the emergency call from the vehicle has been received and, if necessary, forwards the vehicle location and other crash information to the PSAP operator 206.

9. The PSAP operator 206 clears the call from the Service Operator 204 and clears the call from the PASS ECU 202 after providing emergency assistance as necessary.

10. The PASS ECU 202 clears the "Call Connected" message on the Head Unit and Instrument Cluster, updates the Black Box, and terminates the AEC service.

If the PASS ECU 202 is currently on a network which does not have a roaming agreement with the PASS network, the MSISDN assignment is not possible. In this case, the PASS ECU 202's permanently assigned IMSI number can be displayed on the emergency operator's console.

B. Manual Emergency Call (MEC)

The Manual Emergency Call (MEC) service is similar to the Automatic Emergency Call (AEC) service, except that it is initiated manually, and it can be initiated in either ignition on or off states. In one aspect, the PASS ECU 202 can use two types of voice calls indirectly via the Service Center 205 or directly to the local PSAP 207 by dialing 911 or 112.

The direct call to the PSAP 207 can be used in one or more of the following conditions the PASS ECU 202 is configured to use a direct call for the MEC service and/or no roaming service is available (that is, the PASS ECU 202 is unable to register to the visited network).

In all other cases, the PASS ECU 202 can dial the Service Center 205 to obtain emergency assistance.

In one aspect, provided are methods for indirect MEC via Service Center 205. The method provided for the Manual Emergency Call via the Service Center 205 is identical to the indirect AEC via the Service Center 205 shown in FIG. 45, with the following exceptions:

1. The method can be initiated by the vehicle operator 203 pressing the Emergency Call button, instead of by the crash sensor. For example, the button can be pressed for 0.5 seconds if the ignition is on, and for 2 seconds if the ignition is off.

2. The Emergency Call button can be ignored if the PASS ECU 202 is already engaged in an AEC service.

3. An MEC message can be sent to the Application Server 901 instead of an AEC message. No collision information is included in the MEC message. The Application Server 901 responds with an MEC Acknowledgement message instead of an AEC Acknowledgement message. The Application Server 901 sends an MEC Terminate message instead of an AEC Terminate message to terminate the service.

4. The PASS ECU 202 can play an audio file through the loudspeaker to indicate that the MEC service has been initiated.

5. If the crash sensor detects a crash while an MEC service is in progress, the PASS ECU 202 can send an AEC message to the Application Server 901 and upgrade the on-going service to AEC.

6. If the PASS ECU 202 loses power, the MEC service is not automatically restarted when power is restored.

7. If the MEC service is not authorized, the Service Operator 204 can treat the incoming voice call as an acquaintance call for provisioning of the service.

8. If the PASS ECU 202 is not in normal power mode when the request is made, it can first try to register in the wireless network before proceeding with the MEC service.

In another aspect, provided are methods for direct MEC to PSAP 207. The method for the MEC service direct to the PSAP 207 is identical to the AEC service directly to the PSAP 207 shown in FIG. 46, with the following exceptions:

1. The method can be initiated by the vehicle operator 203 pressing the Emergency Call button, instead of by the crash sensor. For example, the button can be pressed for 0.5 seconds if the ignition is on, and for 2 seconds if the ignition is off.

2. An MEC message can be sent to the Application Server 901 instead of an AEC message. No collision information is included in the MEC message. The Application Server 901 can respond with an MEC Acknowledgement message instead of an AEC Acknowledgement message.

3. The PASS ECU 202 can play an audio file through the loudspeaker to indicate that the MEC service has been initiated.

4. If the crash sensor detects a crash while an MEC service is in progress, the PASS ECU 202 can send an AEC message to the Application Server 901 and upgrade the on-going service to AEC.

5. If the PASS ECU 202 loses power, the MEC service is not automatically restarted when power is restored.

6. The MEC service will not be initiated if it is not configured and authorized on the PASS ECU 202.

C. Roadside Assistance

Provided are two exemplary types of Roadside Assistance. Manual Roadside Assistance (MRA), which provides for non-emergency assistance from the Service Center 205 via a MO voice call initiated when the vehicle operator 203 presses the Roadside Assistance button. Automatic Roadside Assistance (ARA), which provides a reminder for routine maintenance from the Service Center 205 via a MO voice call triggered automatically after a specified elapsed time or distance traveled.

In both cases, the MO calls go to the Service Center 205, so no temporary MSISDN assignment is required, and the standard MO voice call procedure can be used.

Figure 47:
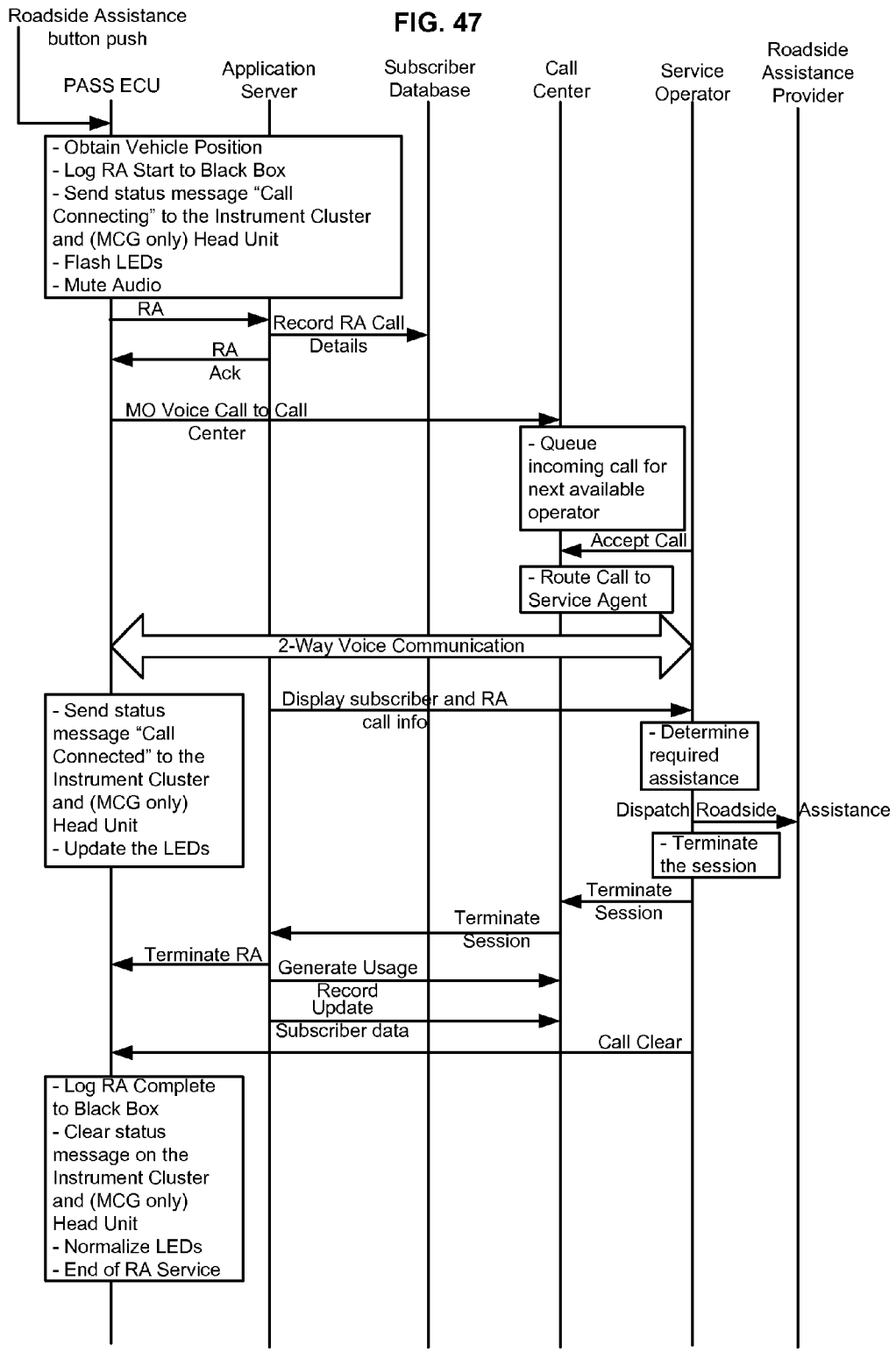
FIG. 47 illustrates an exemplary method for a Manual Roadside Assistance (MRA) service initiated by a vehicle operator.

In one aspect, provided are methods for Manual Roadside Assistance (MRA). FIG. 47 illustrates an exemplary method for a Manual Roadside Assistance (MRA) service initiated by a vehicle operator 203, comprising:

1. The vehicle operator 203 can press the Roadside Assistance button to initiate the service. For example, the button must be pressed for 0.5 seconds if the ignition is on, and for 2 seconds if the ignition is off. The PASS ECU 202 can ignore the Roadside Assistance button press if it is already engaged with a higher priority service, including AEC, MEC, Tracking, or a prior request for the manual RA service.

2. The PASS ECU 202 can determine from its current configuration whether the Roadside Assistance service is authorized and configured. If so, the PASS ECU 202 can determine the vehicle's location using the internal GPS and/or dead reckoning, and records the start of the MRA service in the Black Box. The PASS ECU 202 can display "Call Connecting" on the Head Unit and Instrument Cluster. The PASS ECU 202 can continue to process the MRA service if the ignition is turned off.

3. The PASS ECU 202 can then send an MRA Request message to the Application Server 901 and initiate a voice call to the Service Center 205 using the configured number. The MRA Request message can comprise the VIN, IMSI, and vehicle location.

4. When the Application Server 901 receives the MRA Request message, it can send a RA Acknowledgement message to the PASS ECU 202, record the request data in the Subscriber Database 903, and wait for a voice call.

5. When the incoming roadside assistance call is received at the VoIP Call Server 902, it is queued for the first available Service Operator 204. The incoming call can be identified as a roadside assistance call by the destination number.

6. An Intelligent Voice Recognition (IVR) system can be used at the VoIP Call Server 902 to collect preliminary information and/or route the call to the appropriate Service Operator 204.

7. The Service Operator 204 can answer the incoming non-emergency call, and the VoIP Call Server 902 can notify the Application Server 901 using the caller ID (which will be the PASS ECU 202's IMSI in this case).

8. The Application Server 901 can use the IMSI to access the corresponding subscriber data, including the vehicle location, for display to the Service Operator 204.

9. When the PASS ECU 202 detects call answer, it can display "Call Connected" on the Head Unit and Instrument Cluster.

10. The Service Operator 204 can verify that the subscriber is authorized to use the Roadside Assistance service, and provide the required assistance.

11. The Service Operator 204 can send a request for an update on the location, in which case the PASS ECU 202 can obtain an updated vehicle position and forward it to the Application Server 901, which can provide the updated position to the Service Operator 204. (Not shown in the figure.)

12. If necessary, the Service Operator 204 can contact the appropriate roadside assistance provider and have a vehicle dispatched to provide assistance to the stranded vehicle.

13. If necessary, the roadside assistance provider can request a Scan All Modules (SAM) Test Report.

14. If the vehicle operator 203 needs route guidance, then the VoIP Call Server 902 can forward the directions to the Application Server 901, which can send a POI/Address Download message to the PASS ECU 202 for forwarding to the on-board navigation unit.

15. The Service Operator 204 can terminate the session, and the Application Server 901 can send a Terminate RA message to the PASS ECU 202, generate a usage record for possible billing purposes, and update the subscriber status in the Subscriber Database 803. If the call is cleared before the Terminate RA message is received, the PASS ECU 202 can assume that the call was terminated prematurely and restart the MRA service.

16. When the PASS ECU 202 receives the Terminate RA message from the TOC, it can clear the call, clear the "Call Connected" message on the Head Unit and Instrument Cluster, update the Black Box, and terminate the MRA service.

The PASS ECU 202 can ignore the Roadside Assistance button press if the MRA service is not authorized and configured. The PASS ECU 202 can ignore the lower-priority Information button while engaged in the MRA service. If the voice call to the Service Center 205 fails, the PASS ECU 202 can automatically retry the call. The call failed, dialing, and redial timers can be configured independently from the timers configured for emergency calls.

The Roadside Assistance service can be preempted by a higher priority service, such as AEC or MEC. The vehicle operator 203 can use the voice call Hang-Up button to terminate the service at any time, without waiting for the RA Terminate message from the Application Server 901.

In another aspect, provided are methods for Automatic Roadside Assistance (ARA). The Automatic Roadside Assistance (ARA) methods can be identical to the manually initiated RA service shown in FIG. 47, with the following exceptions:

1. The ARA service can be initiated when the PASS ECU 202 detects that the vehicle has driven more than a configured distance or a configured time has elapsed since the service was configured.

2. The ARA service is only initiated while the ignition is on.

3. The RA message sent to the Service Operator 204 can indicate that the service has been automatically initiated.

4. An Automatic Roadside Assistance service can be upgraded to Manual Roadside Assistance if the vehicle operator 203 presses the Roadside Assistance button while the PASS ECU 202 is engaged in an Automatic Roadside Assistance service.

D. Information Call (IC)

The Information Call (IC) service provides for general information and customer assistance from the Service Center 205 via a voice call initiated when the vehicle operator 203 presses the Information button. Information calls can go to the Service Center 205, so no temporary MSISDN assignment is required, and a MO voice call procedure can be used.

An exemplary method for an Information Call service can be identical to the Manual Roadside Assistance service shown in FIG. 47 with the following exceptions:

1. The vehicle operator 203 can press the Information button instead of the Roadside Assistance button to initiate the service.

2. The PASS ECU 202 can send an IC Request message instead of an MRA Request message, and the Application Server 901 can respond with an IC Acknowledgement message instead of an MRA Acknowledgement message. Also, the Application Server 901 can send an IC Terminate message instead of a RA Terminate message to terminate the service.

3. The VoIP Call Server 902 can route the Information call to a different Service Operator 204 or IVR prompt, on the basis of the destination number.

4. The call failed, dialing, and redial timers can be configured independently from the timers configured for emergency and roadside assistance calls.

5. The Service Operator 204 can access a broader array of services in order to respond to the subscribers' request for assistance.

E. Remote Door Unlock (RDU)

The Remote Door Unlock (RDU) service can be used to unlock the vehicle from the TOC 201, for example, if the subscriber has locked his keys in the vehicle. Provided are two types of RDU services Immediate Remote Door Unlock (IRDU) and Verified Remote Door Unlock (VRDU). For IRDU, the Application Server 901 can unlock the vehicle immediately. For VRDU, the vehicle operator 203 can press the trunk button for a pre-configured number of seconds at an agreed time before the doors will be unlocked.

Figure 48:
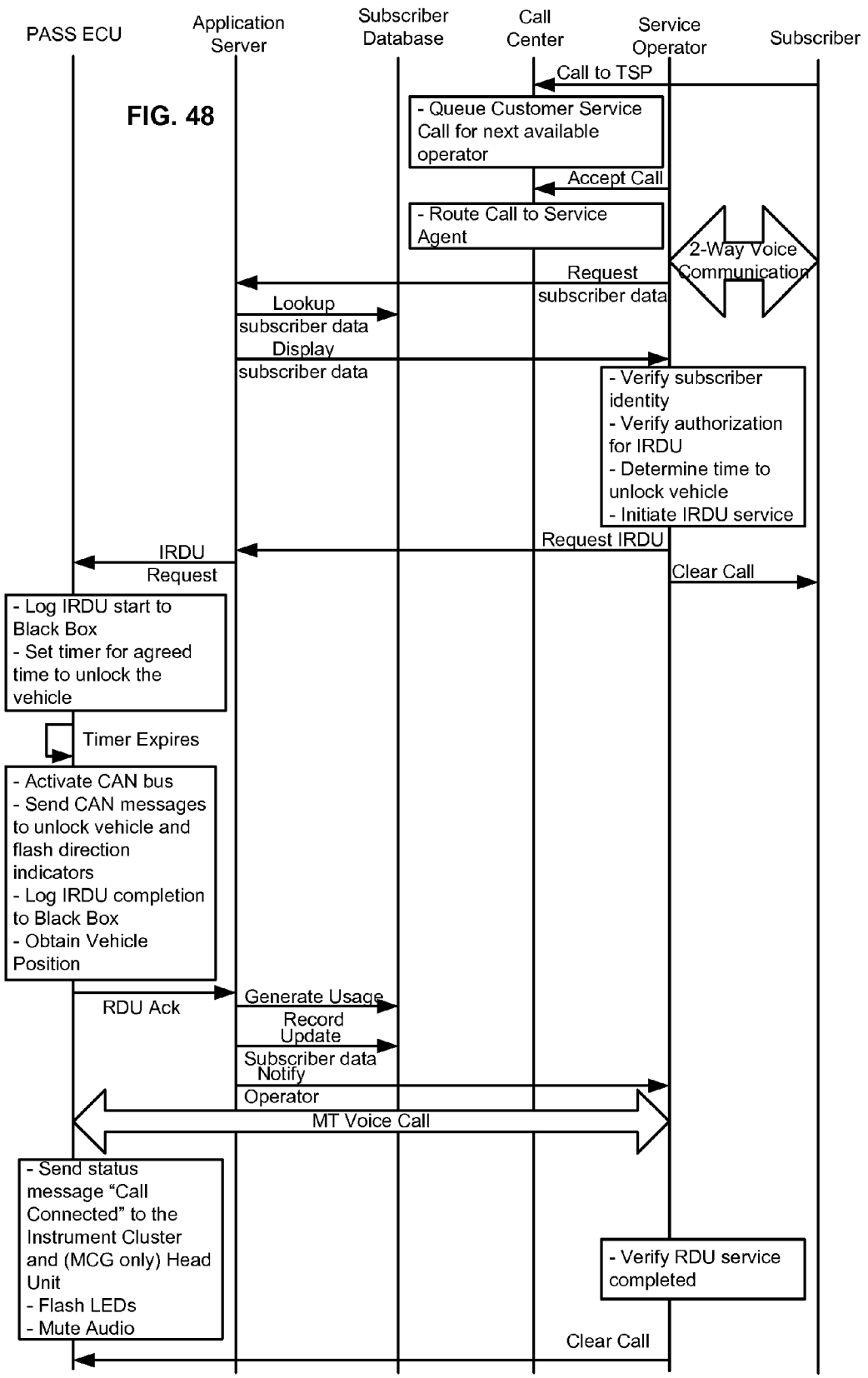
FIG. 48 illustrates an exemplary method for an Immediate Remote Door Unlock (IRDU) initiated by a phone call to a TOC.

In one aspect, provided are methods for Immediate Remote Door Unlock (IRDU). The Immediate Remote Door Unlock (IRDU) service can be initiated via either a phone call to the TOC 201 or Internet access to the TOC 201. FIG. 48 illustrates an exemplary method for an IRDU initiated by a phone call to the TOC 201, comprising:

1. The service can be initiated when the subscriber calls the TOC 201.
2. When the incoming customer service call is received at the VoIP Call Server 902, it can be enqueued for the first available Service Operator 204. The call can be routed to an Intelligent Voice Recognition (IVR) system to determine the type of service required before enqueuing it for the appropriate Service Operators 204.
3. The first available Service Operator 204 can answer the incoming call, identify the subscriber, and access his account information in the Subscriber Database 903 via the Application Server 901.
4. The Service Operator 204 can verify the subscriber's identity and authorize the IRDU service after agreeing on a time at which the vehicle should be unlocked.
5. The Application Server 901 can send an IRDU Request message to the PASS ECU 202 to unlock the vehicle at the time specified by the subscriber 213. Since the PASS ECU 202 may be in sleep power mode, the IRDU Request may not be received for up to (nominally) 15 minutes.
6. When the PASS ECU 202 receives the IRDU Request, it can verify that the IRDU service is configured and authorized, set a timer for the specified time, and record the start of the IRDU service in the Black Box. If the service is not configured and authorized, the PASS ECU 202 can ignore the IRDU Request.
7. When the timer expires, the PASS ECU 202 can send a message on the CAN bus to unlock the vehicle doors, trunk, and tank cap. The PASS ECU 202 can also send messages on the CAN bus to flash the vehicle direction indicators. If necessary (for example, ignition off), the PASS ECU 202 can first activate the CAN bus.
8. The PASS ECU 202 can then determine the vehicle's location using the internal GPS and/or dead reckoning, record the completion of the IRDU service in the Black Box, and send an RDU Acknowledgement message comprising the VIN, IMSI, and vehicle location to the TOC 201.
9. When the Application Server 901 receives the RDU Acknowledgement message, it can generate a usage record for possible billing purposes and update the subscriber status in the Subscriber Database 903.
10. If RDU callback is configured for this subscriber 213, the Application Server 901 can notify the VoIP Call Server 902 to initiate a voice call back to the vehicle to verify that the vehicle operator 203 was able to enter the vehicle.
11. The Service Operator 204 can initiate a MT voice call to the vehicle using the PASS ECU 202's permanently assigned IMSI.
12. The Service Operator 204 can attempt to verify that the vehicle operator 203 has obtained access to the vehicle.
13. The Service Operator 204 can clear the MT call to the PASS ECU 202.

If the subscriber 213 uses the Internet to initiate the IRDU service, the TOC 201 can automatically verify the subscriber's identity and authorize the service at the time specified by the subscriber 213. After that, the sequence of events matches FIG. 48. The RDU service can be initiated in either the ignition on or off condition.

If the agreed time has already passed, the PASS ECU 202 can unlock the vehicle doors, trunk, and tank cap immediately. The PASS ECU 202 can ignore the IRDU Request message if it is received while the PASS ECU 202 is engaged in a higher priority service or a prior request for RDU. The PASS ECU 202 can ignore the IRDU Request message if the IRDU service is not configured.

If the Application Server 901 does not receive the RDU Acknowledgement within a configurable time after sending the request, it can notify the Service Operator 204 and update the Subscriber Database 903. The Service Operator 204 can initiate another IRDU Request at this point.

Figure 49:
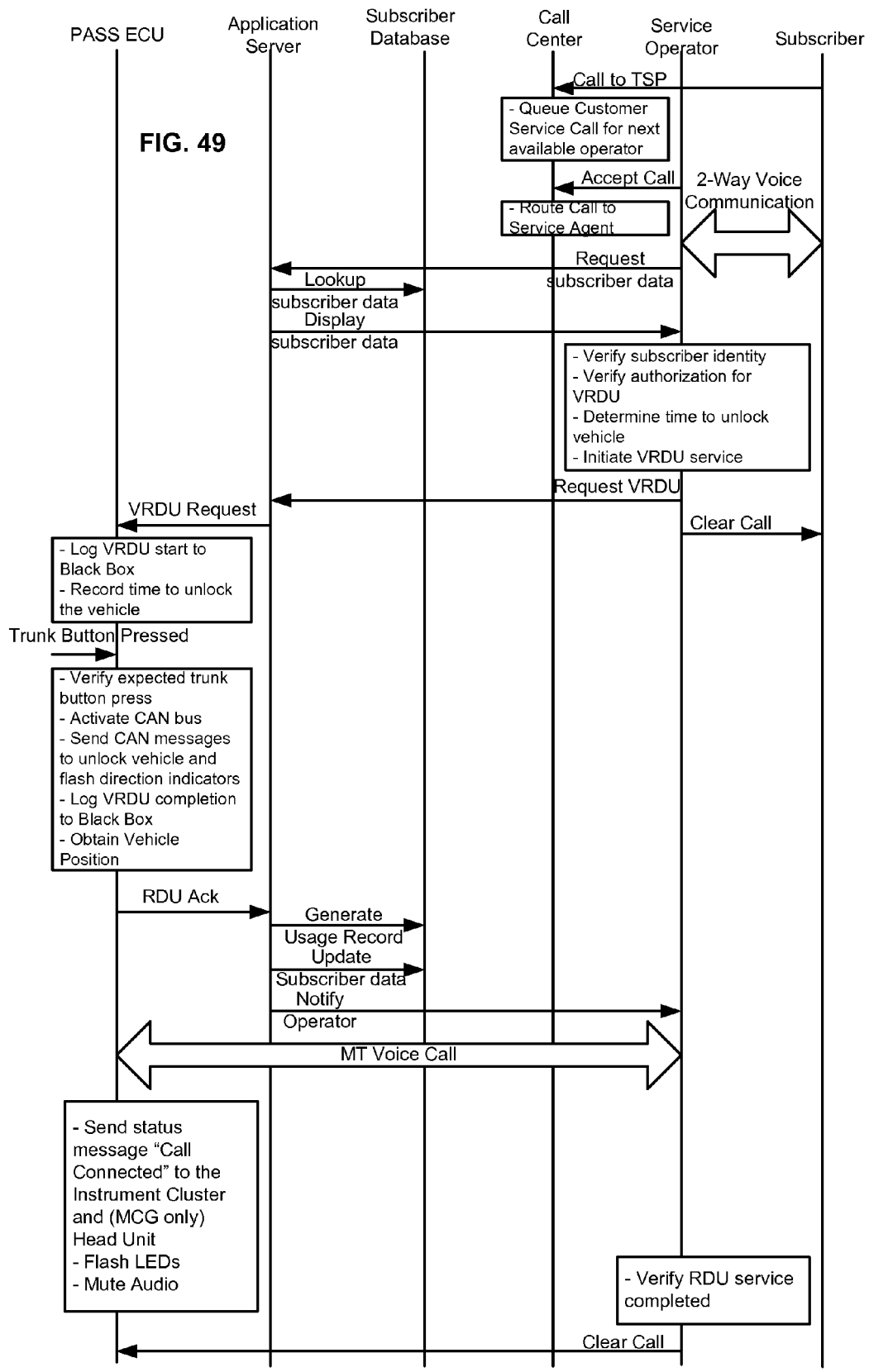
FIG. 49 illustrates an exemplary method for a Verified Remote Door Unlock (VRDU) initiated by a phone call to a TOC.

In one aspect, provided are methods for Verified Remote Door Unlock (VRDU). The Verified Remote Door Unlock (VRDU) service can be initiated via either a phone call to the TOC 201 or Internet access to the TOC 201. FIG. 49 illustrates an exemplary method for a VRDU initiated by a phone call to the TOC 201, comprising:

1. The service can be initiated when the subscriber 213 calls the TOC 201.
2. When the incoming customer service call is received at the VoIP Call Server 902, it can be enqueued for the first available Service Operator 204. The call can be routed to an Intelligent Voice Recognition (IVR) system to determine the type of service required before enqueuing it for the appropriate Service Operators 204.
3. The first available Service Operator 204 can answer the incoming call, identify the subscriber 213, and access his account information in the Subscriber Database 903 via the Application Server 901.
4. The Service Operator 204 can verify the subscriber's identity and authorize the VRDU service after agreeing on a time at which the vehicle operator 203 will be at the vehicle to verify the service by pressing the trunk button.
5. The Application Server 901 can send a VRDU Request message to the PASS ECU 202 to authorize the unlock service if the trunk button is pressed at the agreed time. Since the PASS ECU 202 can be in sleep power mode, the VRDU Request may not be received for up to (nominally) 15 minutes
6. When the PASS ECU 202 receives the VRDU Request, it can verify that the VRDU service is configured and authorized, record the time at which the vehicle operator 203 is expected to press the trunk release, and record the start of the VRDU service in the Black Box. If the service is not configured and authorized, the PASS ECU 202 can ignore the VRDU Request
7. The vehicle operator 203 can hold the trunk release button for a preconfigured number of seconds (for example, 15 seconds) at the agreed time.
8. When the PASS ECU 202 detects the trunk button press, it can verify that the button is released after the configured number of seconds and that the VRDU service has been authorized. The PASS ECU 202 can then record the activation of the VRDU service in the Black Box.
9. When the PASS ECU 202 receives the VRDU Accept message, it can send a message on the CAN bus to unlock the vehicle doors, trunk, and tank cap. The PASS ECU 202 can also send messages on the CAN bus to flash the vehicle direction indicators. If necessary (for example, ignition off), the PASS ECU 202 can first activate the CAN bus.
10. The PASS ECU 202 can then determine the vehicle's location using the internal GPS and/or dead reckoning, record the completion of the VRDU service in the Black Box, and send an RDU Acknowledgement message comprising the VIN, IMSI, and vehicle location to the TOC 201.
11. When the TOC 201 receives the RDU Acknowledgement message, it can generate a usage record for possible billing purposes and update the subscriber status in the Subscriber Database 903.

12. The TOC 201 can also notify a Service Operator 204 to initiate a voice call back to the vehicle to verify that the vehicle operator 203 was able to enter the vehicle, as shown in FIG. 49.

If the subscriber 213 uses the Internet to initiate the VRDU service, the TOC 201 can automatically verify the subscriber's identity and authorize the service at the time specified by the subscriber 213. After that, the sequence of events can be as in FIG. 49. The PASS ECU 202 can ignore the trunk button if it is engaged in a higher priority service or a prior request for RDU.

If the PASS ECU 202 can determine that the VRDU service has not been authorized when the trunk button is pressed, it can send a "Call Failed" message to the Head Unit and Instrument Cluster for display. The PASS ECU 202 can clear the message after a configurable delay (for example, 10 seconds).

F. Remote Door Lock (RDL)

The Remote Door Lock (RDL) service can be used to lock the vehicle from the TOC 201, for example, if the subscriber 213 realizes that he neglected to lock the vehicle and cannot get to it himself. The RDL service can be initiated via either a phone call to the TOC 201 or Internet access to the TOC 201.

Figure 50:
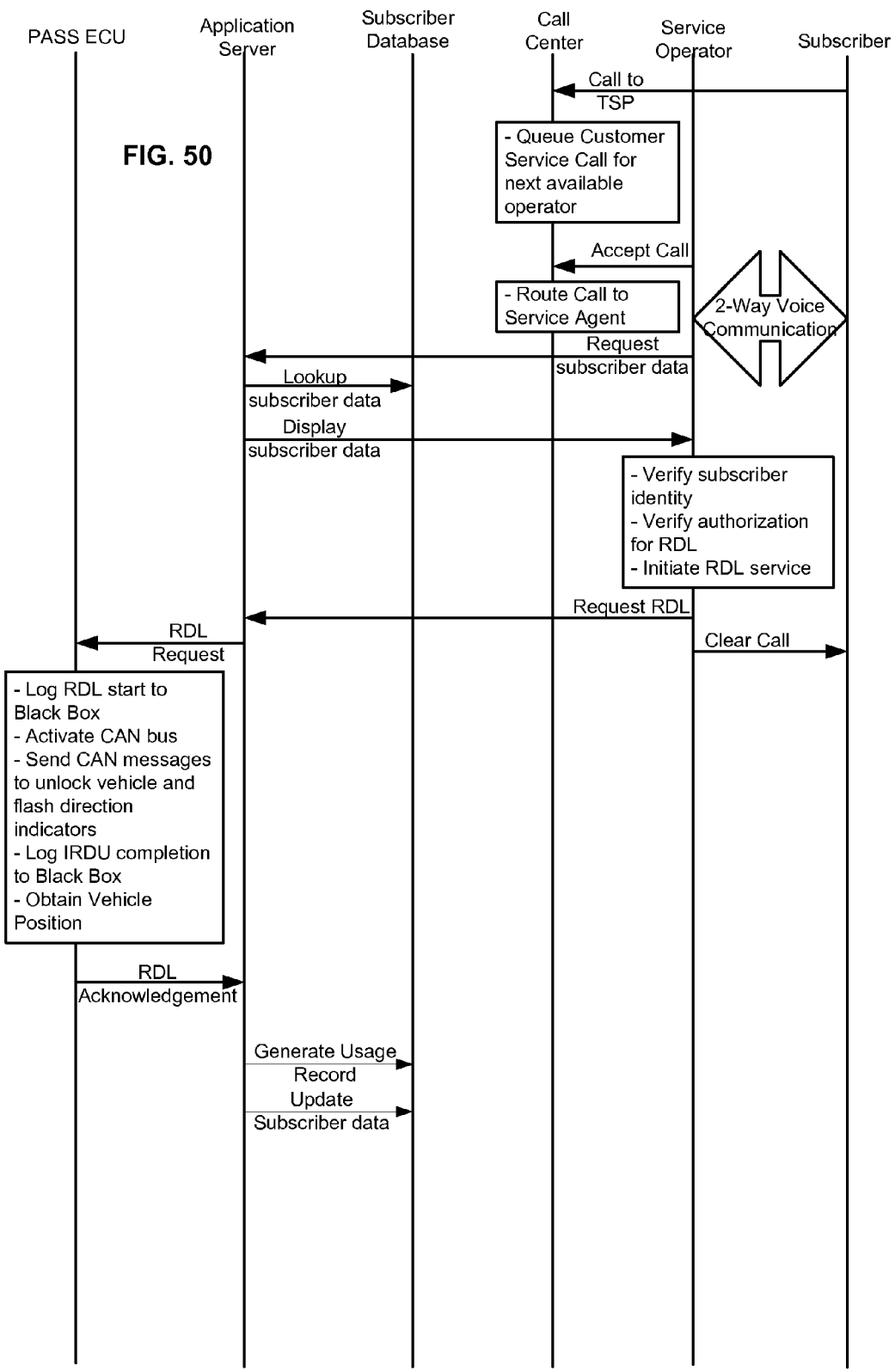
FIG. 50 illustrates an exemplary method for an Remote Door Lock (RDL) initiated by a phone call to a TOC.

In one aspect, provided are methods for Remote Door Lock (RDL). FIG. 50 illustrates an exemplary method for an RDL initiated by a phone call to the TOC 201, comprising:

1. The service can be initiated when the subscriber 213 calls the TOC 201.
2. When the incoming customer service call is received at the VoIP Call Server 902, it can be enqueued for the first available Service Operator 204. The call can be routed to an Intelligent Voice Recognition (IVR) system to determine the type of service required before enqueuing it for the appropriate Service Operators 204.
3. The first available Service Operator 204 can answer the incoming call, identify the subscriber 213, and access his account information in the Subscriber Database 903 via the Application Server 901.
4. The Service Operator 204 can verify the subscriber's identity and authorize the RDL service.
5. The Application Server 901 can send an RDL Request message to the PASS ECU 202 to lock the vehicle. Since the PASS ECU 202 can be in sleep power mode, the RDL Request may not be received for up to (nominally) 15 minutes.
6. When the PASS ECU 202 receives the RDL Request, it can verify that the ignition is off and that the RDL service is configured and authorized. If not, the PASS ECU 202 can send an RDL Reject message to the TOC 201 with the reason for rejecting the request. Otherwise, the PASS ECU 202 can record the start of the RDL service in the Black Box, activate the CAN bus, and send messages on the CAN bus to lock the vehicle doors, trunk, and tank cap and flash the vehicle direction indicators.
7. The PASS ECU 202 can then determine the vehicle's location using the internal GPS and/or dead reckoning, record the completion of the RDL service in the Black Box, and send an RDL Acknowledgement message comprising the VIN, IMSI, and vehicle location to the TOC 201.
8. When the Application Server 901 receives the RDL Acknowledgement message, it can generate a usage record for possible billing purposes and update the subscriber status in the Subscriber Database 903.
9. The next time the ignition is turned on, the PASS ECU 202 can send a message to the Head Unit and Instrument Cluster for display, indicating that the remote door lock feature had been used. The PASS ECU 202 can clear the message after a configurable delay (nominally 10 seconds).

If the subscriber 213 uses the Internet to initiate the RDL service, the TOC 201 can automatically verify the subscriber's identity and authorize the service (that is, no Service Operator 204 will be involved). The PASS ECU 202 can ignore the RDL Request message if it is received while the PASS ECU 202 is engaged in a higher priority service or a prior request for RDL.

If the TOC 201 receives an RDL Reject message from the PASS ECU 202, or if it does not receive the RDL Acknowledgement within a configurable time after sending the request, it can notify a Service Operator 204 and update the Subscriber Database 903. The Service Operator 204 can initiate another RDL Request at this point. The RDL service can be provided within a fixed period of 30 days of switching the ignition off. After that time, the service cannot be performed.

G. Stolen Vehicle Tracking (SVT)

The Stolen Vehicle Tracking (SVT) service can be initiated by a phone call to the TOC 201.

Figure 51:
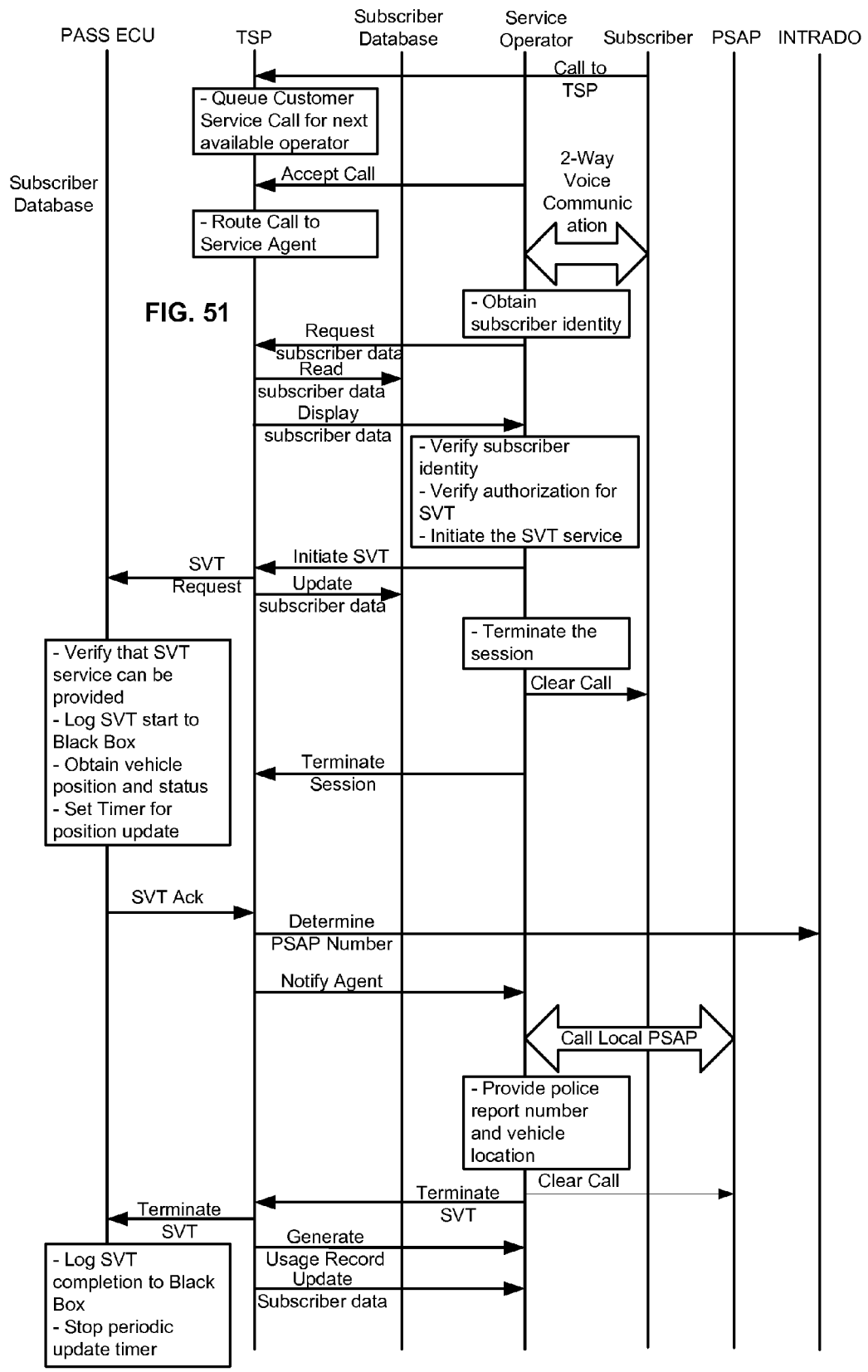
FIG. 51 illustrates exemplary method for an Stolen Vehicle Tracking (SVT) service.

In one aspect, provided are methods for Stolen Vehicle Tracking (SVT). FIG. 51 illustrates exemplary method for an SVT service, comprising:

1. The service can be initiated when the subscriber 213 calls the TOC 201.
2. The TOC 201 can queue the incoming call for RDU service, and the first available Service Operator 204 can answer. The Service Operator 204 can identify the subscriber 213 and access his account information via the TOC 201. The Service Operator 204 can then verify the subscriber's identity and authorize the service after obtaining a police report number (the subscriber 213 must report the stolen vehicle to the police before contacting the TOC 201).
3. The TOC 201 can send an SVT Request message to the PASS ECU 202 to initiate stolen vehicle tracking Since the PASS ECU 202 can be in Sleep mode, the SVT Request may not be received for up to (nominally) 15 minutes.
4. When the PASS ECU 202 receives the SVT Request, it can verify that the SVT service is configured and authorized. If not, the PASS ECU 202 can send an SVT Reject message to the TOC 201 with the reason for rejecting the request. Otherwise, the PASS ECU 202 can determine the vehicle's location using the internal GPS and/or dead reckoning, record the start of the SVT service in the Black Box, send an SVT Accept message to the TOC 201, and start a timer for periodic position updates to the TOC 201. The SVT Accept message can comprise the vehicle's position and ignition status.
5. The TOC 201 can record the initial position and ignition status from the SVT Accept message, use the web-based service 217 to determine the local PSAP 207 number for the vehicle location, and notify the Service Operator 204 that the vehicle's position has been received.
6. The Service Operator 204 can call the local PSAP 207 to report the location of the stolen vehicle, using the police report number provided by the subscriber 213 (the vehicle position is not provided to the subscriber 213).
7. When the periodic update timer expires, the PASS ECU 202 can determine the vehicle's location, and send a Tracking Position Update (TPU) message to the TOC 201. The message can comprise the vehicle's position and ignition status.
8. If the PASS ECU 202 detects a change in ignition status, it can determine the vehicle's location, send a Tracking Position Update (TPU) message to the TOC 201, and reset the position update timer for the new ignition state (for example, every 15 minutes while the ignition is off and every 7 minutes while the ignition is on). If the timer value is configured to be 0, the PASS ECU 202 will not send periodic position updates to the TOC 201 while the ignition is in the corresponding state.

9. The Service Operator 204 can request a position update at any time while SVT is in progress (not shown). The TOC 201 can send a Tracking Position Request message to the PASS ECU 202, and the PASS ECU 202 can respond with a Tracking Position Update message. If the PASS ECU 202 is in Sleep mode, the request may not be received until the PASS ECU 202 "wakes up" to send the next periodic position update.

10. The Service Operator 204 can request a change in the position update timers at any time while SVT is in progress (not shown). The TOC 201 can send a Tracking Timer Update message to the PASS ECU 202, and the PASS ECU 202 can reset the periodic timer with the new value. The new values can apply only for the duration of the current SVT session.

11. The Service Operator 204 can initiate a MT voice call to the vehicle at any time while SVT is in progress (not shown).

12. The Service Operator 204 can terminate the SVT service at any time. When the service is terminated, the TOC 201 can send a Terminate SVT message to the PASS ECU 202.

13. When the PASS ECU 202 receives the Terminate SVT message, it can record the completion of the SVT service in the Black Box and stop the periodic position update timer.

The SVT service can be initiated while the vehicle is in either the ignition on or ignition off state.

If the PASS ECU 202 loses power while engaged in the SVT service, it can restart the service (by resending the SVT Response message to the TOC 201) when power is restored. This can be accomplished by storing the service state in the flash memory.

The PASS ECU 202 can ignore the SVT Request message if it is already engaged with a higher priority service, including AEC or MEC, or a prior request for the SVT service. If an AEC is initiated by the crash sensor while the PASS ECU 202 is engaged in the SVT service, the SVT service can be terminated immediately in order to service the AEC.

If the Emergency Call button is pressed while the PASS ECU 202 is engaged in the SVT service, the SVT service can be suspended in order to provide the MEC service. Upon completion of the MEC service, the PASS ECU 202 can resume tracking.

The PASS ECU 202 can ignore the Roadside Assistance and Information buttons while engaged in the SVT service. The PASS ECU 202 can ignore messages for RDU, RDL, and configuration of the PASS ECU 202 while engaged in the SVT service.

If the PASS ECU 202 is unable to send a Tracking Position Update message to the TOC 201 (for example, because no roaming service or wireless signal available), the PASS ECU 202 can discard the message and wait for the next update.

H. Anti-Theft Tracking (SVT)

The Anti-Theft Tracking (ATT) service is very similar to the Stolen Vehicle Tracking (SVT) service, except that it can be automatically initiated by the PASS ECU 202.

Figure 52:
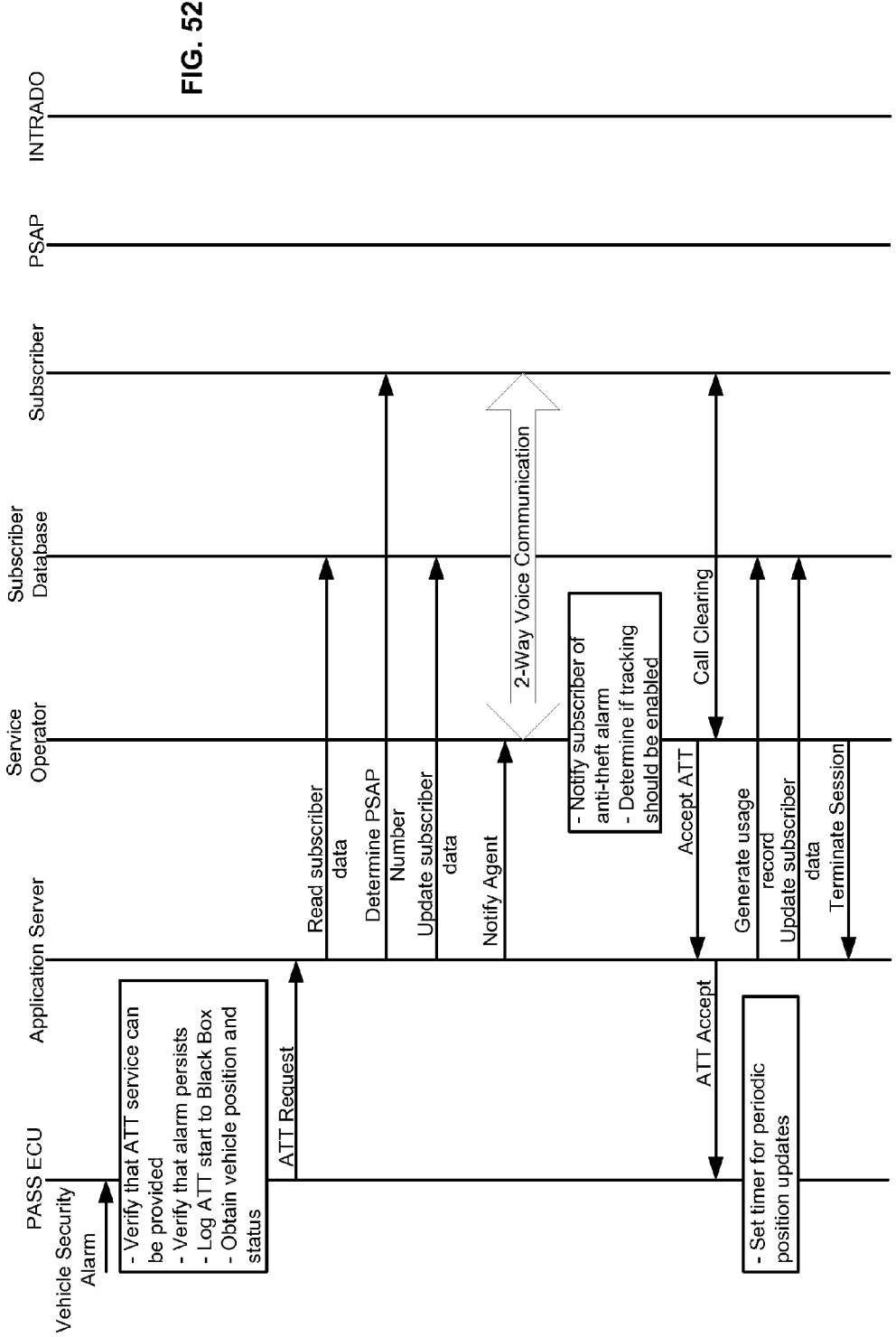
FIG. 52 illustrates an exemplary method for an Anti-Theft Tracking (ATT) service.

In one aspect, provided are methods for Anti-Theft Tracking (ATT). FIG. 52 illustrates an exemplary method for an ATT service, comprising:

1. The PASS ECU 202 can detect a vehicle security alarm via messages on the CAN bus. It can verify that the ATT service is authorized and configured and, to avoid false alarms, set a timer (for example, 30 seconds). If the alarm is not cleared before the timer expires, the PASS ECU 202 can initiate the ATT service by sending an ATT Request message to the TOC 201. The message can comprise the initial vehicle position, as well as the VIN and IMSI. The PASS ECU 202 can also record the start of the ATT service in the Black Box.

2. The TOC 201 can verify that the ATT service has been authorized for this subscriber 213 and notify the Service Operator 204 of the request.

3. The Service Operator 204 can attempt to contact the subscriber 213 to notify him that the vehicle's anti-theft alarm has been activated and to determine if tracking should be enabled.

4. The TOC 201 can send an ATT Accept message to the PASS ECU 202 to confirm that tracking should be initiated.

5. When the PASS ECU 202 receives the ATT Accept message, it can start a timer for periodic position updates to the TOC 201.

6. The Service Operator 204 can use the web-based service 217 to determine the local PSAP 207 number for the vehicle location and call the local PSAP 207 to report the location of the stolen vehicle, using the police report number provided by the subscriber 213. (The vehicle position is not provided to the subscriber 213.)

7. When the periodic update timer expires, the PASS ECU 202 can determine the vehicle's location, and sends a Tracking Position Update (TPU) message to the TOC 201. The message can comprise the vehicle's position and ignition status.

8. If the PASS ECU 202 detects a change in ignition status, it can determine the vehicle's location, send a Tracking Position Update (TPU) message to the TOC 201, and reset the position update timer for the new ignition state (for example, every 15 minutes while the ignition is off and every 7 minutes while the ignition is on). If the timer value is configured to be 0, the PASS ECU 202 will not send periodic position updates to the TOC 201 while the ignition is in the corresponding state.

9. The Service Operator 204 can request a position update at any time while ATT is in progress (not shown). The TOC 201 can send a Tracking Position Request message to the PASS ECU 202, and the PASS ECU 202 can respond with a Tracking Position Update message. If the PASS ECU 202 is in Sleep mode, the request may not be received until the PASS ECU 202 "wakes up" to send the next periodic position update.

10. The Service Operator 204 can request a change in the position update timers at any time while ATT is in progress. The TOC 201 can send a Tracking Timer Update message to the PASS ECU 202, and the PASS ECU 202 can reset the periodic timer with the new value. The new values can apply only for the duration of the current ATT session.

11. The Service Operator 204 can initiate a MT voice call to the vehicle at any time while ATT is in progress.

12. The Service Operator 204 can terminate the ATT service at any time. When the service is terminated, the TOC 201 can send a Terminate ATT message to the PASS ECU 202.

13. When the PASS ECU 202 receives the Terminate ATT message, it can record the completion of the ATT service in the Black Box and stop the periodic position update timer.

The ATT service may only be initiated while the vehicle is in the ignition off state. If the PASS ECU 202 loses power while engaged in the ATT service, it can restart the service (by resending the ATT Request message to the TOC 201) when power is restored.

The PASS ECU 202 can ignore the vehicle security alarm if it is already engaged with a higher priority service, including AEC or MEA, or if it is already engaged with an SVT or ATT service.

If the PASS ECU 202 is unable to send the ATT Request message to the TOC 201 (for example, because no roaming service or wireless signal available), or it does not receive a response from the TOC 201 after a configurable interval, it can set a timer to periodically resend the message.

If an AEC is initiated by the crash sensor while the PASS ECU 202 is engaged in the ATT service, the ATT service can be terminated immediately in order to service the AEC.

If the Emergency Call button is pressed while the PASS ECU 202 is engaged in the ATT service, the PASS ECU 202 can suspend the ATT service in order to provide the MEC service. Upon completion of the MEC service, the PASS ECU 202 can resume tracking The PASS ECU 202 can ignore the Roadside Assistance and Information buttons while engaged in the ATT service. The PASS ECU 202 can ignore messages for RDU, RDL, and configuration of the PASS ECU 202 while engaged in the ATT service.

If the PASS ECU 202 is unable to send a Tracking Position Update message to the TOC 201 (for example, because no roaming service or wireless signal available), the PASS ECU 202 can discard the message and wait for the next update.

I. Maintenance Status Reporting (MSR)

The automatic Maintenance Status Reporting (MSR) service can be used to provide maintenance status information to a manufacturer, or other interested party.

Figure 53:
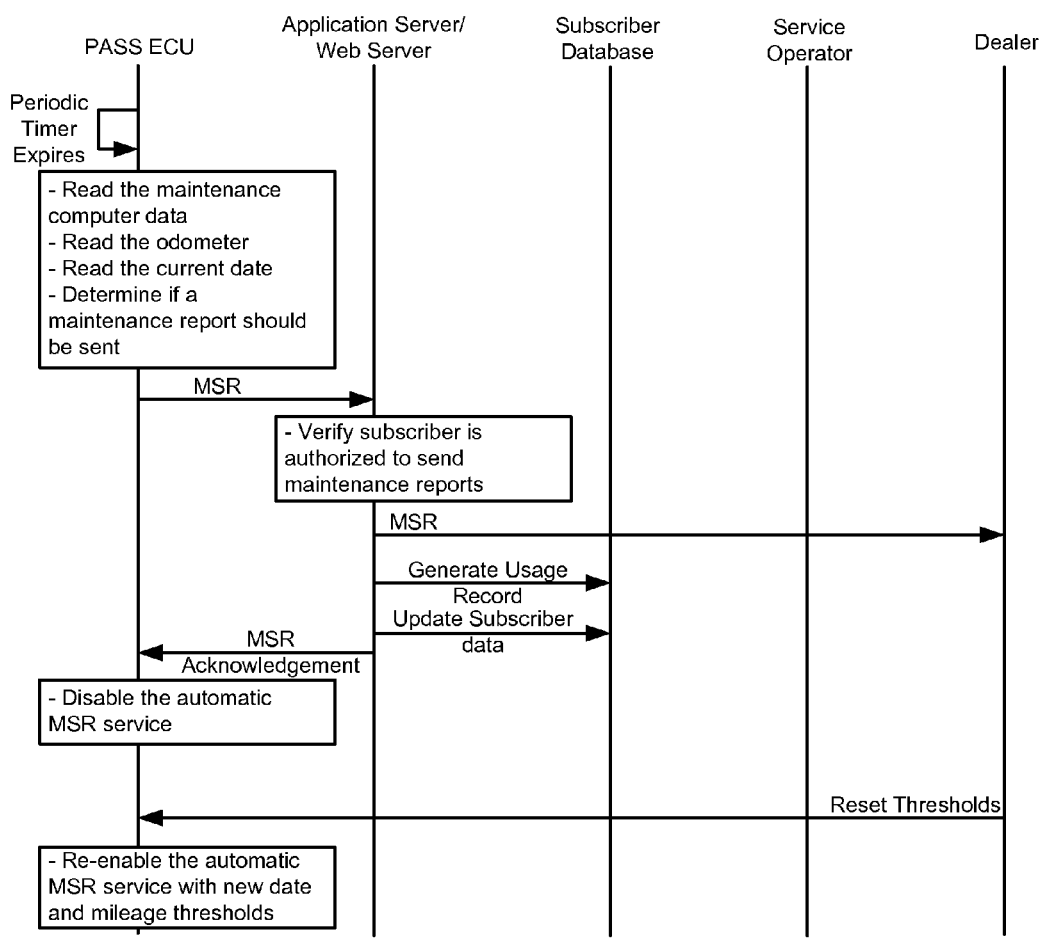
FIG. 53 illustrates an exemplary method for Maintenance Status Reporting (MSR)

In one aspect, provided are methods for Maintenance Status Reporting (MSR). FIG. 53 illustrates an exemplary method for MSR, comprising:
1. The PASS ECU 202 can periodically check the vehicle status to determine if a maintenance status report should be sent. For example, a report can be sent if any of the following are true:
   The odometer exceeds a configured threshold.
   The elapsed time (for example, in days) since the last service exceeds a configured threshold.
   The PASS ECU 202 detects CAN bus messages to activate the "Maintenance Light".
   The maintenance computer indicates that maintenance is due (for example, based on oil quality).
2. To send a report, the PASS ECU 202 can send an MSR message to the TOC 201. The message can comprise the VIN, current mileage, and number of days until the next scheduled service, maintenance computer data, and the reason for sending the report.
3. When the TOC 201 receives the MSR message from the PASS ECU 202, it can verify that the subscriber 213 is authorized to generate maintenance status reports; forward the report to the manufacturer, update the Subscriber Database 903, generate a usage record, and send an MSR Acknowledgement message to the PASS ECU 202.
4. When the PASS ECU 202 receives the MSR Acknowledgement from the TOC 201, it can disable the automatic reporting service to prevent repeated reports for a single maintenance.
5. When the dealer services the vehicle, a diagnostic tool can be used to reset the date and mileage thresholds and re-enable the automatic reporting service. Alternatively, the thresholds can be reset wirelessly.

The PASS ECU 202 will only initiate the MSR service while the ignition is on. The PASS ECU 202 can ignore the periodic MSR timer while it is engaged in a higher priority service.

J. Remote Diagnostics (RD)

The Remote Diagnostics (RD) services can collect vehicle maintenance status, diagnostics, and performance data from individual vehicles for use by roadside assistance providers, dealerships, manufacturers, and other interested parties.

In one aspect, provided are methods for performing a Scan All Modules (SAM) Test Report. The Scan All Modules (SAM) Test Report service can use the vehicle's diagnostics bus to collect Diagnostic Trouble Codes (DTCs), as well as relevant hardware and software configuration and environment data for all electronic control units in the vehicle. The PASS ECU 202 can initiate a SAM test at a configurable interval after ignition on of the vehicle and periodically thereafter as long as the ignition is on. The PASS ECU 202 can record and send the results of the SAM test based on configurable rules, for example, if a new DTC is detected. A SAM test can also be initiated by the vehicle manufacturer, dealer, or a roadside assistance provider via the TOC 201 (via either a Service Operator 204 or via Internet access). In this case, the results can be sent to the TOC 201, which can forward them to the requester.

Figure 54:
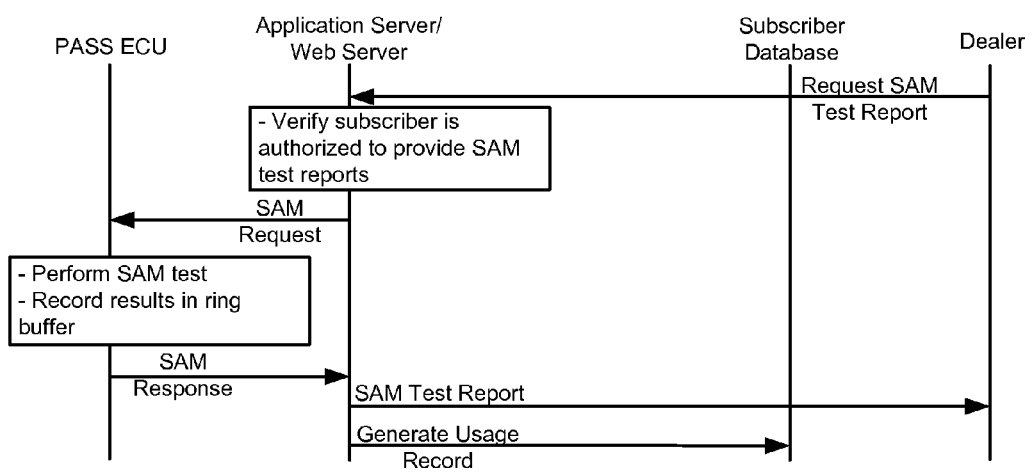
FIG. 54 illustrates an exemplary method for performing a Scan All Modules (SAM) test requested by a dealer.

FIG. 54 illustrates an exemplary method for performing a SAM test requested by a dealer, such as prior to a scheduled maintenance visit, comprising:
1. The dealer can access the TOC 201 via the Internet and request a SAM test report for a specific vehicle, identified by the subscriber name and VIN.
2. The TOC 201 can verify that the SAM service is authorized for the specified vehicle and send a SAM Request message to the PASS ECU 202.
3. When the PASS ECU 202 receives the request, it can verify that the SAM service is authorized and configured and initiate the SAM test.
4. Upon completion of the test, the PASS ECU 202 can record the results and forwards them to the TOC 201 in a SAM Results message. The PASS ECU 202 can record the results of the last five SAM tests in a ring buffer.
5. The TOC 201 can format the results in a SAM Test Report and forwards the report to the requester.

The PASS ECU 202 can ignore the SAM Request if the SAM service is not authorized and configured. The PASS ECU 202 can ignore the SAM Request if it is already engaged with a higher priority service, including AEC, MEC, Tracking, RA, or IC, or if it is already engaged in a SAM test.

The PASS ECU 202 will not perform a periodic SAM test while it is engaged with a higher priority service, including AEC, MEC, Tracking, RA, or IC, or if it is already engaged in a SAM test as a result of a request from the TOC 201.

The PASS ECU 202 can ignore the SAM Request if an external diagnostics tester is present on the bus. The PASS ECU 202 can immediately terminate a SAM test in progress if it detects an external diagnostics tester on the bus. The PASS ECU 202 can gracefully terminate a SAM test in progress if it detects ignition off.

If the PASS ECU 202 is unable to send the results of a SAM test (for example, network connectivity is not available at the time), it can automatically try to send the buffered data at a later time.

K. Quality Data Reporting (QDR)

The Quality Data Reporting (QDR) service can provide diagnostics, status, and environment and usage data to the vehicle manufacturer, or other interested party. The PASS ECU 202 can periodically query electronic control units in the vehicle at a defined frequency using diagnostics requests to collect sensor and status readings and diagnostics status information and forward the collected information to the vehicle manufacturer based on configurable rules, for example, once a week or whenever a DTC is detected.

Figure 55:
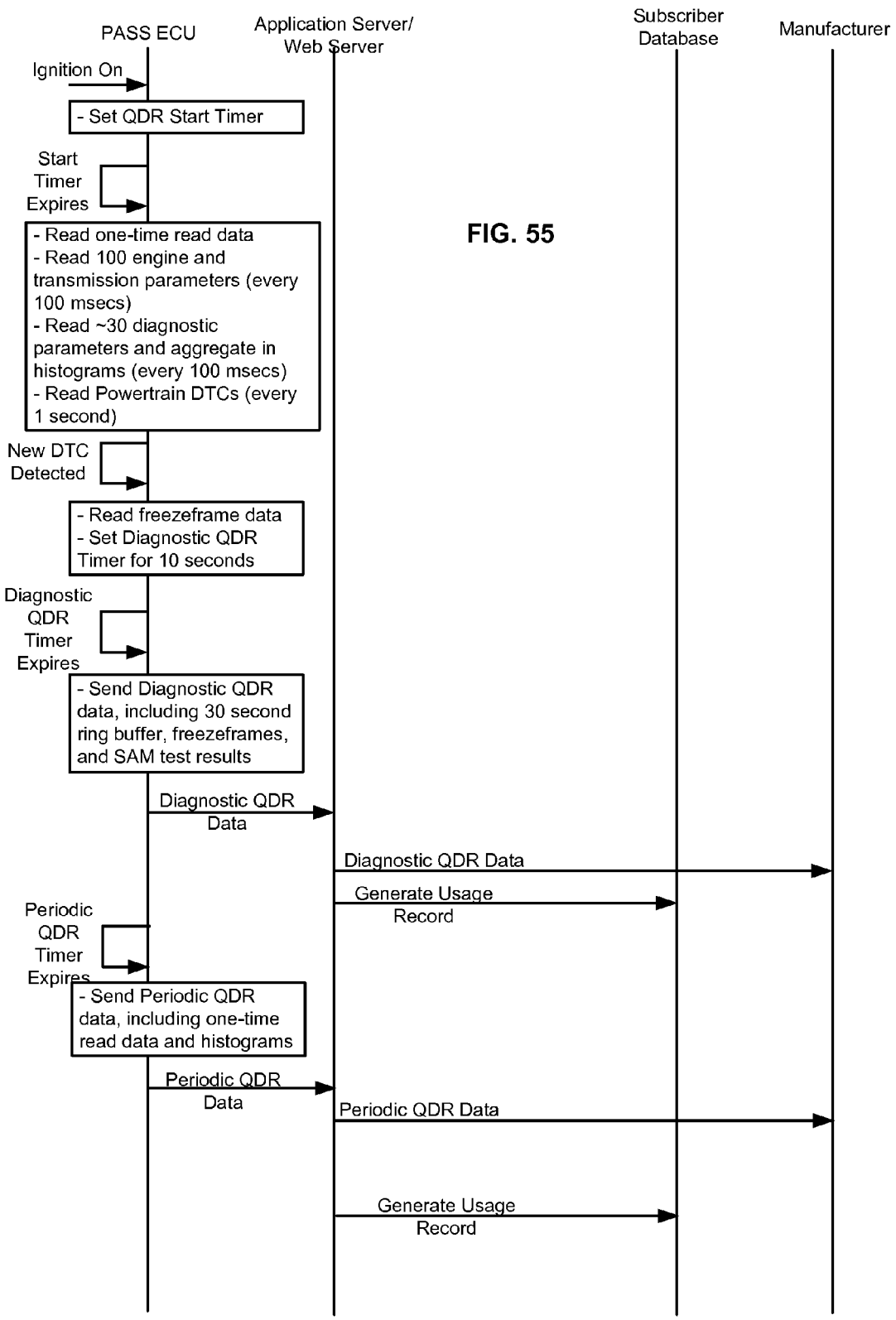
FIG. 55 illustrates an exemplary method for Quality Data Reporting (QDR)

In one aspect, provided are methods for Quality Data Reporting (QDR). FIG. 55 illustrates an exemplary method for Quality Data Reporting, starting with ignition on, comprising:
1. The PASS ECU 202 can initiate data collection at a configurable interval after ignition on (for example, 10 seconds). The PASS ECU 202 can then read and record certain fixed values, such as the VIN.

2. The PASS ECU 202 can read approximately 100 defined engine and transmission parameters every 100 msecs using a busload optimized interrogation protocol and record the values in a 30-second ring buffer.

3. The PASS ECU 202 can read approximately 30 defined diagnostic parameters every 100 msecs and aggregate the values as 1D histograms.

4. The PASS ECU 202 can read defined powertrain DTCs from the engine and transmission electronic control units every second.

5. If a new powertrain DTC is detected, the PASS ECU 202 can read and record up to 5 defined freeze frames from the engine and transmission electronic control units. After 10 seconds, the PASS ECU 202 can forward the triggering diagnostic event, the contents of the 30-second ring buffer (covering the period from 20 seconds before the DTC was detected until 10 seconds after), the collected freeze frames, and the results of the latest SAM test to the TOC 201.

6. The TOC 201 can forward the QDR data to the vehicle manufacturer.

7. The PASS ECU 202 can periodically send the one-time read data and 1D histograms to the TOC 201 at a configurable interval (nominally 1 week).

8. The TOC 201 can forward the QDR data to the vehicle manufacturer.

The PASS ECU 202 can immediately terminate quality data reporting if it detects an external diagnostics tester on the bus. The PASS ECU 202 can gracefully terminate quality data reporting if it detects ignition off If the PASS ECU 202 is unable to send a quality data report (for example, network connectivity is not available at the time), it can automatically try to send the buffered data at a later time.

Figure 56:
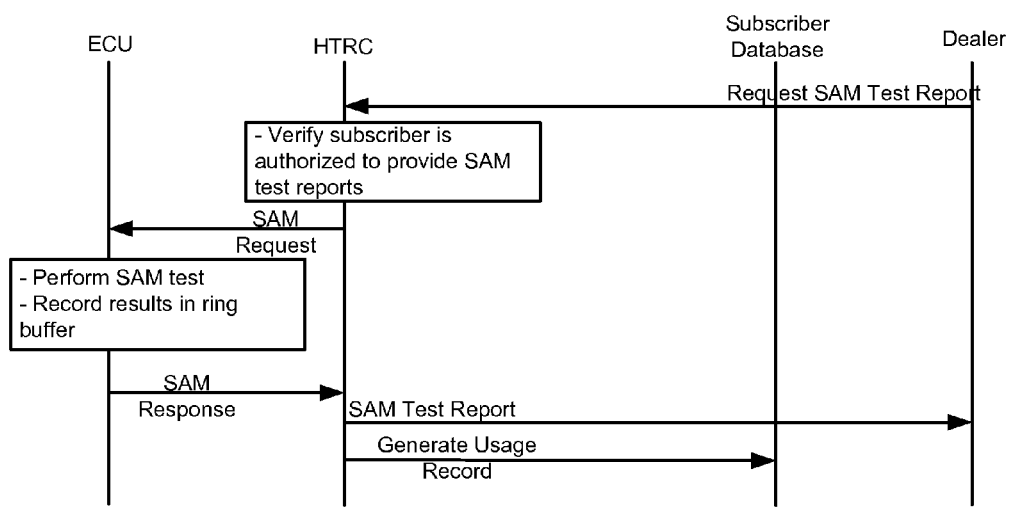
FIG. 56 illustrates exemplary method for a Delete Diagnostic Trouble Codes (DDTC) service.

In another aspect, provided are methods for performing a Delete Diagnostic Trouble Codes (DDTC) service. The Delete Diagnostic Trouble Codes (DDTC) service can allow a dealer, roadside assistance provider, or other interested party to clear the error memories of the electronic control units in the vehicle to facilitate trouble-shooting. The DDTC service can be initiated via Internet access to the TOC 201. FIG. 56 illustrates exemplary method for a DDTC service, comprising:

1. A dealer can access the TOC 201 via the Internet and request a DDTC for a specific vehicle, identified by the subscriber name and VIN.

2. The TOC 201 can send a DDTC Request message to the PASS ECU 202 to lock the vehicle. Since the PASS ECU 202 may be in Sleep mode, the DDTC Request may not be received for (nominally) 15 minutes.

3. When the PASS ECU 202 receives the DDTC Request, it can verify that the DDTC service is configured and authorized. If not, the PASS ECU 202 can send a DDTC Reject message to the TOC 201 with the reason for rejecting the request. Otherwise, the PASS ECU 202 can record the start of the DDTC service in the Black Box, activate the CAN bus (if necessary), and send messages on the CAN bus to clear the DTCs on each electronic control unit.

4. The PASS ECU 202 can then record the completion of the DDTC service in the Black Box, and send a DDTC Acknowledgement message to the TOC 201 to confirm that all DTCs have been cleared.

5. When the TOC 201 receives the DDTC Acknowledgement message, it can generate a usage record for possible billing purposes and notify the requester.

6. The TOC 201 can format the results in a SAM Test Report and forward the report to the requester.

The PASS ECU 202 can ignore the DDTC Request if the service is not authorized and configured. The PASS ECU 202 can ignore the DDTC Request if it is already engaged with a higher priority service, including AEC, MEC, Tracking, RA, or IC, or if it is already processing a prior DDTC request.

The PASS ECU 202 can ignore the DDTC Request if an external diagnostics tester is present on the bus. The PASS ECU 202 can immediately terminate a DDTC service in progress if it detects an external diagnostics tester on the bus.

The PASS ECU 202 can gracefully terminate a DDTC service in progress if it detects ignition off In another aspect, provided are methods for Remote Diagnostics Configuration (RDC). The Remote Diagnostics Configuration (RDC) service can allow a vehicle manufacturer, or other interested party, to configure the remote diagnostic functions of the PASS ECU 202. The manufacturer can request re-configuration of one or more vehicles, where the vehicles to be reconfigured can be identified, for example, by specific VINs, a VIN range, or by model line and model year. The TOC 201 can ensure that each identified PASS ECU 202 is updated.

Figure 57:
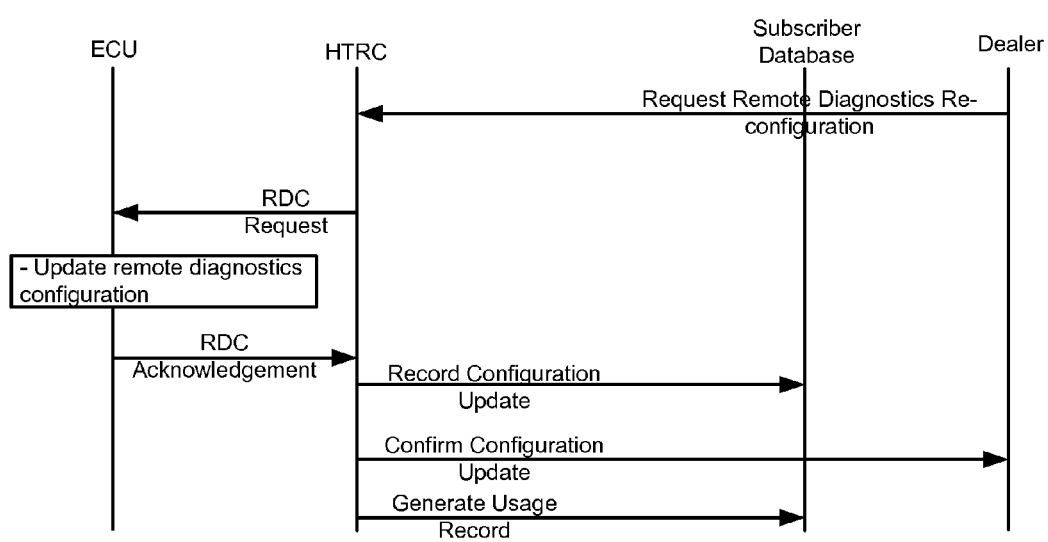
FIG. 57 illustrates an exemplary method for a Remote Diagnostics Configuration (RDC) of a single vehicle.

FIG. 57 illustrates an exemplary method for a RDC of a single vehicle, comprising:

1. The manufacturer can access the TOC 201 via the Internet and request reconfiguration of a specific vehicle, identified by the VIN. The manufacturer can specify the desired configuration.

2. The TOC 201 can send an RDC Request message to the PASS ECU 202.

3. When the PASS ECU 202 receives the request, it can update its internal configuration and send an RDC Acknowledgement message to the TOC 201 to confirm the configuration update.

4. The TOC 201 can send an acknowledgement to the manufacturer.

The PASS ECU 202 can ignore the RDC Request if it is already engaged with a higher priority service, including AEC, MEC, Tracking, RA, or IC. In this case, the TOC 201 can retry the request.

If the manufacturer identifies multiple vehicles for reconfiguration, the TOC 201 can wait until it gets responses from all of the vehicles before passing the results of the re-configuration to the manufacturer.

While the methods and systems have been described in connection with preferred embodiments and specific examples, it is not intended that the scope of the methods and systems be limited to the particular embodiments set forth, as the embodiments herein are intended in all respects to be illustrative rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

It will be apparent to those skilled in the art that various modifications and variations can be made in the methods and systems without departing from the scope or spirit of the methods and systems. Other embodiments of the methods and systems will be apparent to those skilled in the art from consideration of the specification and practice of the methods and systems disclosed herein. It is intended that the specification and examples be considered as exemplary only, with a true scope and spirit of the methods and systems being indicated by the following claims.

The invention claimed is:

1. A method for one-way authentication of a first communication device with a second communication device comprising:
   a. receiving at the first communication device a real-time time based value from a device remote from the first and second communication devices;
   b. combining into a composite message the time based value and message content;
   c. applying a cryptographic algorithm to the composite message to produce a message signature of the message content and the time based value;
   d. transmitting the message content, the time based value, and the message signature with the first communication device;
   wherein the time based value indicates an approximate time the first communication device transmits the message content and also ensures that the message signature is unique for separate transmissions of the same message content;
   wherein the cryptographic algorithm is one of a Message-Digest 5 (MD5) algorithm, a secure hash algorithm (SHA), a RACE Integrity Primitives Evaluation Message Digest (RIPEMD) algorithm, Cellular Authentication, Voice Privacy and Encryption (CAVE) algorithm, or a Whirlpool algorithm; and
   wherein the time based value is to be used by the second communication device for determining whether the time-based value precedes a current time of the second communication device more than a predetermined increment of time and wherein the second communication device is intended to discard the received message if the first communication device transmitted the message more than the predetermined increment of time before the current time of the second communication device.

2. The method of claim 1 wherein generating a time based value comprises determining the time based value at a predetermined time interval.

3. The method of claim 2, wherein the predetermined time interval is fifteen minutes.

4. The method of claim 1, wherein the time based value is obtained from a GPS signal.

5. The method of claim 1, wherein the time based value is rounded to a predetermined increment of time.

6. The method of claim 5, further comprising repeating steps a once per predetermined increment of time.

7. The method claim 5, wherein the predetermined increment of time is fifteen minutes.

8. An apparatus for communication authentication comprising:
   a clock source;
   a processor, coupled to the clock source, configured for:
   a. generating a real-time time based value from the clock source,
   b. combining into a composite message the time based value and message content;
   c. applying a cryptographic algorithm to the composite message to produce a message signature of the message content and the time based value;
   d. transmitting the message content, the time based value, and the message signature with the apparatus;
   wherein the time based value indicates an approximate time the first apparatus transmits the message content and also ensures that the message signature is unique for separate transmissions of the same message content;
   a wireless transceiver, coupled to the processor, configured for transmitting a message that includes the message content, message signature, and the time based value;
   wherein the cryptographic algorithm is one of a Message-Digest 5 (MD5) algorithm, a secure hash algorithm (SHA), a RACE Integrity Primitives Evaluation Message Digest (RIPEMD) algorithm, Cellular Authentication, Voice Privacy and Encryption (CAVE) algorithm, or a Whirlpool algorithm; and
   wherein the time based value is to be used by the second communication device for determining whether the time-based value precedes a current time of the second communication device more than a predetermined increment of time and wherein the second communication device is intended to discard the received message if the first communication device transmitted the message more than the predetermined increment of time before the current time of the second communication device.

9. The apparatus of claim 8, wherein the processor is configured to determine the time based value at a predetermined time interval.

10. The apparatus of claim 9, wherein the predetermined time interval is fifteen minutes.

11. The apparatus of claim 8, wherein the clock source comprises a GPS signal generated by a device remote from the apparatus.

12. The apparatus of claim 8, wherein the time based value is rounded to a predetermined increment of time.

13. The apparatus of claim 12, the processor is configured to repeat a-b once per predetermined increment of time.

14. The apparatus of claim 12, wherein the predetermined increment of time is fifteen minutes.

15. The apparatus of claim 12, wherein the wireless transceiver is configured for transmitting a SMS message with the signature.

16. A method for one-way authentication of a first communication device with a second communication device comprising:
   receiving a message with a second communication device, wherein a first communication device;
   a. generated a real-time time based value from a signal generated by a device remote from the first and second communication devices;
   b. combined into a composite message the time based value and message content;
   c. applied a cryptographic algorithm to the composite message to produce a message signature of the message content and the time based value;
   d. transmitted the message content, message signature, and the time-based value in the message; and
   wherein the time based value indicates an approximate time the first communication device transmitted the message content and also ensures that the message signature is unique for separate transmissions of the same message content
   comparing, with the second communication device, the time-based value from the message with a current time of the second communication device;
   determining, with the second communication device, whether the time-based value extracted from the message precedes the current time of the second communication device more than a predetermined increment of time; and
   discarding, with the second communication device, the message if the first communication device transmitted the message more than the predetermined increment of time before the current time of the second communication device;

applying the cryptographic algorithm to the composite message;

comparing a result of the cryptographic algorithm to the message signature, discarding the message if the result of the cryptographic algorithm does not match the message signature; and wherein the cryptographic algorithm is one of a Message-Digest 5 (MD5) algorithm, a secure hash algorithm (SHA), a RACE Integrity Primitives Evaluation Message Digest (RIPEMD) algorithm, Cellular Authentication, Voice Privacy and Encryption (CAVE) algorithm, or a Whirlpool algorithm.

17. The method of claim 16 further comprising:

performing a cryptographic algorithm on a portion of the message that does not include the message signature;

comparing a result of the step of performing the cryptographic algorithm with the message signature of the message; and authenticating the message received from the first communication device if the result of the step of performing the cryptographic algorithm matches the message signature of the message.

\* \* \* \* \*